US011105959B2

(12) United States Patent
Takeda et al.

(10) Patent No.: US 11,105,959 B2
(45) Date of Patent: Aug. 31, 2021

(54) ELECTROCONDUCTIVE PARTICLE, VISIBLE LIGHT TRANSMITTING PARTICLE-DISPERSED ELECTRICAL CONDUCTOR AND MANUFACTURING METHOD THEREOF, TRANSPARENT ELECTROCONDUCTIVE THIN FILM AND MANUFACTURING METHOD THEREOF, TRANSPARENT ELECTROCONDUCTIVE ARTICLE THAT USES THE SAME, AND INFRARED-SHIELDING ARTICLE

(71) Applicant: SUMITOMO METAL MINING CO., LTD., Tokyo (JP)

(72) Inventors: Hiromitsu Takeda, Ichikawa (JP); Kenji Adachi, Ichikawa (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 642 days.

(21) Appl. No.: 15/903,990

(22) Filed: Feb. 23, 2018

(65) Prior Publication Data
US 2018/0188419 A1  Jul. 5, 2018

Related U.S. Application Data

(62) Division of application No. 14/615,261, filed on Feb. 5, 2015, now abandoned, which is a division of
(Continued)

(30) Foreign Application Priority Data

Aug. 31, 2004 (JP) .................. 2004-251956
Nov. 29, 2004 (JP) .................. 2004-344775
Apr. 20, 2005 (JP) .................. 2005-122668

(51) Int. Cl.
*G02B 1/02* (2006.01)
*G02B 5/20* (2006.01)
(Continued)

(52) U.S. Cl.
CPC ............... *G02B 1/02* (2013.01); *C01G 39/00* (2013.01); *C01G 41/00* (2013.01); *C01G 41/006* (2013.01);
(Continued)

(58) Field of Classification Search
CPC .......... G02B 1/02; G02B 5/208; C01G 39/00; C01G 41/00; C01G 41/006; C01G 41/02;
(Continued)

(56) References Cited

U.S. PATENT DOCUMENTS 3,505,108 A   4/1970  Mochel
4,325,611 A   4/1982  Huggins et al.
(Continued)

FOREIGN PATENT DOCUMENTS

JP   S61-21919    1/1986
JP   H03-65503    3/1991
(Continued)

OTHER PUBLICATIONS

Reis et al., "Rietveld Analysis of NaxWO3+x/2 H2O, Which as the Hexagonal Tungsten Bronze Structure," Chem. Mater., 1992, 3, pp. 307-312 (Year: 1992).*

(Continued)

*Primary Examiner* — John A Hevey
(74) *Attorney, Agent, or Firm* — Oliff PLC

(57) ABSTRACT

An infrared-shielding nanoparticle dispersion has a property whereby visible light is adequately transmitted, and light in the near-infrared region is adequately shielded. The infrared-shielding nanoparticles include a plural aggregate of electroconductive particles composed of a tungsten oxide expressed by the general formula WyOz (where W is tungsten, O is oxygen, and $2.2 \leq z/y \leq 2.999$), and/or a composite tungsten oxide expressed by the general formula MxWyOz (where M is one or more elements selected from H, alkali
(Continued)

metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1.1$; and $2.2 \leq z/y \leq 3.0$).

10 Claims, 17 Drawing Sheets

Related U.S. Application Data application No. 11/659,720, filed as application No. PCT/JP2005/015948 on Aug. 31, 2005, now Pat. No. 8,980,135.

(51) Int. Cl.
- C03C 17/00 (2006.01)
- C01G 41/02 (2006.01)
- H01B 1/08 (2006.01)
- H01B 1/20 (2006.01)
- C01G 39/00 (2006.01)
- C01G 41/00 (2006.01)

(52) U.S. Cl.
CPC ............ *C01G 41/02* (2013.01); *C03C 17/00* (2013.01); *C03C 17/008* (2013.01); *G02B 5/208* (2013.01); *H01B 1/08* (2013.01); *H01B 1/20* (2013.01); *C01P 2002/77* (2013.01); *C01P 2002/84* (2013.01); *C01P 2004/03* (2013.01); *C01P 2004/54* (2013.01); *C03C 2217/219* (2013.01); *C03C 2217/24* (2013.01); *C03C 2217/29* (2013.01); *C03C 2217/445* (2013.01); *C03C 2217/475* (2013.01); *C03C 2218/11* (2013.01); *Y10T 428/26* (2015.01); *Y10T 428/2982* (2015.01)

(58) Field of Classification Search
CPC .. H01B 1/20; H01B 1/08; C03C 17/00; C01P 2004/03; C01P 2004/54; C01P 2002/84; C01P 2002/77; Y10T 428/2982; Y10T 428/26

See application file for complete search history.

(56) References Cited

U.S. PATENT DOCUMENTS

| | | | |
|---|---|---|---|
| 7,655,301 | B2 | 2/2010 | Chonan et al. |
| 8,083,847 | B2 | 12/2011 | Takeda et al. |
| 8,318,051 | B2 | 11/2012 | Adachi |
| 2005/0064154 | A1 | 3/2005 | Aylward et al. |
| 2005/0271566 | A1* | 12/2005 | Yadav .................... B82Y 30/00 423/1 |

FOREIGN PATENT DOCUMENTS

| | | |
|---|---|---|
| JP | H0812378 A | 1/1996 |
| JP | H0859300 A | 3/1996 |
| JP | H0873223 A | 3/1996 |
| JP | H08-151233 A | 6/1996 |
| JP | H08283044 A | 10/1996 |
| JP | H09-107815 A | 4/1997 |
| JP | H09127559 A | 5/1997 |
| JP | H09-278445 A | 10/1997 |
| JP | H11-302017 A | 11/1999 |
| JP | H11-322333 A | 11/1999 |
| JP | 2000-090737 A | 3/2000 |
| JP | 2000-119045 A | 4/2000 |
| JP | 2000-281346 A | 10/2000 |
| JP | 2001-279137 A | 10/2001 |
| JP | 2001-328197 A | 11/2001 |
| JP | 2003-029314 A | 1/2003 |
| JP | 2003-121844 A | 4/2003 |
| JP | 2003-138222 A | 5/2003 |
| JP | 2003-249125 A | 9/2003 |
| JP | 2004-026554 A | 1/2004 |
| JP | 2004-043851 A | 2/2004 |
| JP | 2004-106512 A | 4/2004 |
| JP | 2004-241296 A | 8/2004 |
| WO | 2005/037932 A1 | 4/2005 |

OTHER PUBLICATIONS

Zhu et al., "Tungsten oxide tree-like structures," Chemical Physical Letters, 309 (1999), pp. 327-334.
Jimenez et al., "Crystalline structure defects and gas sensor response to NO2 and H2S of tungsten trioxide nanopowders," Sensors and Actuators, B 93 (2003), pp. 475-485.
Reis et al., "Rietveld Analysis of NaxWO3+x/2 H20, Which as the Hexagonal Tungsten Bronze Structure," Chem Mater., 1992, 3, pp. 307-312.

* cited by examiner

ELECTROCONDUCTIVE PARTICLE, VISIBLE LIGHT TRANSMITTING PARTICLE-DISPERSED ELECTRICAL CONDUCTOR AND MANUFACTURING METHOD THEREOF, TRANSPARENT ELECTROCONDUCTIVE THIN FILM AND MANUFACTURING METHOD THEREOF, TRANSPARENT ELECTROCONDUCTIVE ARTICLE THAT USES THE SAME, AND INFRARED-SHIELDING ARTICLE

RELATED APPLICATIONS

The present application is a divisional application of application Ser. No. 14/615,261 filed Feb. 5, 2015, which in turn is a divisional application of U.S. patent application Ser. No. 11/659,720 filed Apr. 18, 2007, which in turn is a U.S. national stage application of PCT/JP2005/15948 filed Aug. 31, 2005, claiming priority to Japanese Application No. 2005-122668 filed Apr. 20, 2005, Japanese Application No. 2004-344775 filed Nov. 29, 2004 and Japanese Application No. 2004-251956 filed Aug. 31, 2004. Each of these prior applications is incorporated herein by reference in its entirety.

TECHNICAL FIELD

The present invention relates to an infrared-shielding nanoparticle dispersion having dispersed infrared-shielding nanoparticles that contain composite oxide nanoparticles having characteristics in which light in the visible region is transmitted and light in the near infrared region is absorbed, to an infrared-shielding body manufactured using the infrared-shielding nanoparticle dispersion, to a method for manufacturing infrared-shielding nanoparticles for manufacturing infrared-shielding nanoparticles that are used in the infrared-shielding nanoparticle dispersion, and to infrared-shielding nanoparticles manufactured using the method for manufacturing the infrared-shielding nanoparticles.

The present invention also relates to a visible light transmitting particle-dispersed electrical conductor that uses the electroconductive particles composed of tungsten oxide and/or a composite tungsten oxide, a visible-light-transmitting electroconductive article formed from the visible light transmitting particle-dispersed electrical conductor, electroconductive particles used in the visible light transmitting particle-dispersed electrical conductor and the visible-light-transmitting electroconductive article, and a method for manufacturing the above.

The present invention further relates to a transparent electroconductive film that transmits visible light and a method for manufacturing the film; to a transparent electroconductive article that uses the transparent electroconductive film; and to a visible-light-transmitting infrared-shielding article that uses the transparent electroconductive film.

BACKGROUND ART

Patent document 1 proposes, as a light-blocking material used in window materials and the like, a black-pigment-containing light-blocking film, which includes carbon black, titanium black, and other inorganic pigments having light-absorbing characteristics that range from the visible light region to the near infrared region; and aniline black and other organic pigments having strong light-absorbing characteristics for light solely in the visible light region. Patent document 2 proposes a half-mirror light-blocking material on which aluminum or another metal has been deposited.

In patent document 3, a heat-blocking glass is proposed in which a composite tungsten oxide film is disposed as a first layer on a transparent glass substrate, with the film containing at least one type of metal ion selected from the group consisting of Group IIIa, Group IVa, Group Vb, Group VIb, and Group VIIb in the periodic table of the elements; a transparent dielectric film as a second layer is disposed on the first layer; a composite tungsten oxide film is disposed as a third layer on the second layer, with the film containing at least one type of metal ion selected from the group consisting of Group IIIa, Group IVa, Group Vb, Group VIb, and Group VIIb in the periodic table of the elements; and the index of refraction of the transparent dielectric film of the second layer is less than the index of refraction of the composite tungsten oxide film of the first and third layers. The heat-blocking glass can therefore be advantageously used in locations that require high visible-light transmittance and good heat-blocking performance.

In patent document 4, a heat-blocking glass is proposed in which a first dielectric film is disposed as a first layer on a transparent glass substrate, a tungsten oxide film as second layer is disposed on the first layer, and a second dielectric film as a third layer is disposed on the second layer, using the same method as that in patent document 3.

In patent document 5, a heat-blocking glass is proposed in which a composite tungsten oxide containing the same metal element as that in patent document 3 is disposed as a first layer on a transparent glass substrate, and a transparent dielectric film as second layer is disposed on the first layer, using the same method as that in patent document 3.

In patent document 6, a sunlight-controlling glass sheet having sunlight-shielding characteristics is proposed in which a metal oxide film is formed by CVD or spraying, and the film is thermally decomposed at about 250° C. The metal oxide film has one more components selected from the group consisting of tungsten trioxide ($WO_3$), molybdenum trioxide ($MoO_3$), niobium pentoxide ($Nb_2O_5$), tantalum pentoxide ($Ta_2O_5$), vanadium pentoxide ($V_2O_5$), and vanadium dioxide ($VO_2$), and contains hydrogen, lithium, sodium, potassium, or other additive materials.

In Patent document 7, a solar light-varying/dimming, heat-blocking material is proposed that can undergo rapid coloration/decoloration reactions when exposed to the solar light and that, when colored, has an absorption peak at 1250 nm in the near-infrared region, resulting in the ability to block solar light in the near-infrared region. This material uses a tungsten oxide obtained by hydrolysis of tungstic acid. An organic polymer having a specific structure and referred to as polyvinylpyrrolidone is added to the tungsten oxide. When the material is exposed to the solar light, UV rays in the solar light are absorbed by the tungsten oxide, and excited electrons and holes are generated. A small dose of UV irradiation can markedly increase the amount of pentavalent tungsten that is generated, which accelerates the coloring reaction, and the material shields light as the color density of increases. The pentavalent tungsten is thereby extremely rapidly oxidized to hexavalent tungsten and the discoloring reaction is accelerated.

In patent document 8, the inventors have proposed a way to obtain a powder composed of tungsten trioxide, a hydrate of tungsten trioxide, or a mixture of tungsten trioxide and a hydrate of tungsten trioxide by dissolving tungsten hexachloride in an alcohol and directly evaporating the solvent, or by heating and refluxing the mixture and then evaporating the solvent, and thereafter heating [the residue] at 100° C. to 500° C. The inventors have also proposed that nanoparticles of such a tungsten oxide can be used to obtain an electrochromic element, and that a multilayered laminate can be formed. When protons are introduced into the film, the optical characteristics of the film can be changed.

In recent years, the need for transparent electrodes has increased in association with the development of various types of display elements. Since numerous free electrons are retained in the material of transparent electrodes and the electrical conductivity is high, ITO (Indium-Tin-Oxide) obtained by doping indium oxide with several molar percent of tin is mainly used (see patent document 9). $In_2O_3$, which is an ITO matrix, is an oxide semiconductor, and carrier electrons are supplied from oxygen defects contained in the crystals.

The substance is therefore a transparent electroconductive substance. It is believed that when Sn is added to $In_2O_3$, the amount of carrier electrons is greatly increased and high electrical conductivity is exhibited. The transparent electroconductive film related to the particle dispersion of the present invention is currently used in the transparent electrodes of display elements, plasma display elements, solar cells, and the like, as well as in infrared-absorbing and reflecting films, defogging films, electromagnetism-shielding films, and other films.

Recent display apparatuses are in a downward trend in relation to costs. There is need to improve the performance of transparent electrodes, particularly to reduce the sheet resistance and improve the visible-light transmittance in order to obtain a high quality display element that is devoid of display defects, and it is extremely important to reduce the cost of the transparent electrode itself. Improvements are being made in ITO deposition technology, sputtering targets, and other aspects. Therefore, improvements are being made in the physical properties of transparent electroconductive films, and progress is being made in reducing costs. However, there is a limit to reducing the costs of ITO, and it has become difficult to respond to the recent wider range of needs.

On the other hand, known as a particle-dispersed transparent electroconductive film is a fine particle film (see patent document 10) in which an aqueous solution (A) containing silver bromide and palladium salt, and an aqueous solution (B) containing citric acid ions and ferrous ions are mixed in an atmosphere essentially devoid of oxygen to precipitate Ag—Pd fine particles, and a coating solution containing the Ag—Pd fine particles in water and/or an organic solvent are applied to a base material. Also known is a transparent electroconductive film (see patent document 11) in which secondary particles having an average secondary particle diameter of 120 to 200 nm are formed from ITO particles having an average primary particle diameter of 10 to 60 nm, and an ink composition in which the secondary particles are dispersed is used to form the film.

In patent document 12, a method is proposed for producing various tungsten bronzes expressed by the formula $M_xWO_3$ (where M is an alkali metal, an alkaline-earth metal, a rare earth element, or another metal element, and 0<x<1). The method uses an ammonium meta tungstate and various water-soluble metal salts as starting materials and involves heating the dry solids obtained from a mixed aqueous solution of the starting materials at about 300 to 700° C., and supplying a gaseous hydrogen containing an inert gas (added amount: about 50 vol % or greater) or water vapor (added amount 15 vol % or less) to the solid material. Also proposed is a method in which the same operation is performed on the carrier to manufacture various compound materials coated with tungsten bronze. However, the tungsten bronzes are intended as solid materials to be used in the electrode catalyst material of fuel cells and the like, and no consideration is given to transparency and electrical conductivity.

On the other hand, transparent electroconductive films are used in the transparent electrodes of liquid crystal display elements, plasma display elements, solar cells, and the like, as well as in infrared-absorbing and reflecting films, defogging films, electromagnetism-shielding films, and other films.

Liquid crystal display apparatuses in particular are actively being adopted in recent years in personal computers, word processors, and other OA equipment, leading to greater demand for transparent electrodes. Transparent electrodes for liquid crystal display elements have numerous conduction electrons (free electrons) in the material, electrical conductivity is high, and patterning by etching is relatively simple. Therefore, ITO (Indium-Tin-Oxide) obtained by doping indium oxide with several molar percent of tin is mainly used (see patent documents 13 and 14). $In_2O_3$, which is an ITO matrix, is an oxide semiconductor, and carrier electrons are supplied from oxygen defects contained in the crystals. It is believed that when Sn is added to $In_2O_3$, the amount of carrier electrons is greatly increased and high electrical conductivity is exhibited.

In patent document 14, a high-transmittance transparent electroconductive film is proposed in which an In oxide is used as the main component, Ge is added, and the visible-light transmittance is 90% or greater.

In patent document 16, a transparent electroconductive film is proposed that exhibits good resistivity and greater visible-light transmittance than ITO. The film is composed of a composite oxide which has a defect-fluorite crystal structure and whose three main constituent elements are indium (In), antimony (Sb), and oxygen (O). The film is a transparent electroconductive film expressed by the general formula $In_3Sb_{1-x}O_{7-\delta}$ (which satisfies the ranges $-0.2 \le X \le 0.2$ and $-0.5 \le \delta \le 0.5$) and doped, in a ratio of 0.1 to 20 at %, with at least one element selected from the high-valence metal elements Sn, Si, Ge, Ti, Zr, Pb, Cr, Mo, W, Te, V, Nb, Ta, Bi, As, and Ce, and from the halogen elements F, Br, and I. The film is subjected to reduction annealing to generate oxygen holes, and carrier ions are thereby injected.

[Patent Document 1] JP-A 2003-29314
[Patent Document 2] JP-A 9-107815
[Patent Document 3] JP-A 8-59300
[Patent Document 4] JP-A 8-12378
[Patent Document 5] JP-A 8-283044
[Patent Document 6] JP-A 2000-119045
[Patent Document 7] JP-A 9-127559
[Patent Document 8] JP-A 2003-121884
[Patent Document 9] JP-A 2003-249125
[Patent Document 10] JP-A 2000-90737
[Patent Document 11] JP-A 2001-279137
[Patent Document 12] JP-A 2004-026554
[Patent Document 13] JP-A 2003-249125
[Patent Document 14] JP-A 11-322333
[Patent Document 15] JP-A 11-302017
[Patent Document 16] JP-A 8-73223

DISCLOSURE OF THE INVENTION

Prior-Art Problems

The black pigment described in patent document 1 has considerable light absorbing characteristics in the visible region, and when the pigment is used in a window material or the like, the window material tends to have dark colors, and therefore the application is limited.

A window material or the like to which the metal-deposited film described in patent document 2 has been applied has a half-mirror appearance, and such a half-mirror tends to reflect brightly, which is a problem from the standpoint of aesthetics.

The heat-blocking materials described in patent documents 3 to 5 are mainly manufactured using sputtering, vapor deposition, ion-plating, chemical vapor deposition (CVD), and other dry vacuum deposition methods. For this reason, large manufacturing apparatuses are required and costs are increased.

Also, the base materials used for these heat-blocking materials are exposed to high-temperature plasma and require heating after film deposition. Thus, when films and other resin materials are used as base materials, facilities and film deposition conditions must be separately considered.

In the case of the sunlight-controlling glass sheet described in patent document 6, the starting materials are formed as a coating on glass by the joint use of thermal decomposition and CVD or spraying, but since the starting material precursors are costly, thermally decompose at high temperature, and have other drawbacks, the film deposition conditions must be separately considered when a film or another resin is used as the base material.

The solar light-varying/dimming, heat-blocking material and electrochromic element proposed in patent documents 7 and 8 have a complicated film structure because the color tone of the material is varied using UV rays or electrical potential difference, and application to fields in which color tone changes are not desired is difficult.

The ITO electroconductive film described in patent document 9 is an expensive film because iridium is used, and there is a commercial demand for an inexpensive transparent electroconductive thin film.

The noble metal particles described in patent document 10, and the ITO particles described in patent document 11 can be deposited by coating, and a bulky apparatus is therefore not required. Deposition costs can be reduced, but the particles themselves are expensive and lack wide applicability.

The present invention was contrived in order to solve such problems, and an object of this invention is to provide an infrared-shielding nanoparticle dispersion that sufficiently transmits light in the visible region, has light-shielding characteristics in the near-infrared region, and does not require the use of a bulky manufacturing apparatus when the film is formed on the base material; to provide an infrared-shielding body manufactured using the infrared-shielding nanoparticle dispersion; to provide a method for manufacturing infrared-shielding nanoparticles used in the infrared-shielding nanoparticle dispersion; and to provide infrared-shielding nanoparticles manufactured using the method for manufacturing the infrared-shielding nanoparticles.

Another object is to provide an infrared-shielding body of high visible transmittance using a transparent and electroconductive body.

The ITO electroconductive film described in patent documents 9 and 12 are expensive films because iridium is used, and there is a commercial demand for an inexpensive transparent electroconductive thin film.

The noble metal particles described in patent document 10 and the ITO particles described in patent document 11 can be deposited by coating, and a bulky apparatus is therefore not required. Deposition costs can be reduced, but the particles themselves are expensive and lack wide applicability.

The present invention was contrived in view of the above-described situation, and an object of the present invention is to provide an inexpensive visible light transmitting particle-dispersed electrical conductor that has excellent electrical conductivity and visible light-transmission characteristics.

Another object of the present invention is to provide electroconductive particles used in the visible light transmitting particle-dispersed electrical conductor described above.

Yet another object of the present invention is to provide a visible-light-transmitting electroconductive article that uses an inexpensive visible light transmitting particle-dispersed electrical conductor having excellent electrical conductivity and visible light-transmission characteristics.

Still another object of the present invention is to provide an electroconductive particle manufacturing method wherein a simple technique can be used to manufacture electroconductive particles that are used to obtain an inexpensive visible light transmitting particle-dispersed electrical conductor that has excellent electrical conductivity and visible light-transmission characteristics.

The ITO electroconductive film described in patent documents 12 and 13, and the electroconductive film described in patent documents 14 and 15, in which In oxide is the primary component, have excellent visible-light transmittance and film surface resistance (sheet resistance), but these are expensive films because iridium is used, and there is a commercial demand for an inexpensive transparent electroconductive film.

The present invention was contrived in view of the above-described situation, and an object of this invention is to provide an inexpensive transparent electroconductive film that has excellent electrical conductivity and visible light-transmission characteristics.

Another object of the present invention is to provide a transparent electroconductive film manufacturing method for manufacturing in a simple manner an inexpensive transparent electroconductive film having excellent electrical conductivity and visible light-transmission characteristics.

Yet another object of the present invention is to provide a transparent electroconductive article that uses an inexpensive transparent electroconductive film having excellent electrical conductivity and visible light-transmission characteristics.

Still another object of the present invention is to provide a visible-light-transmitting infrared-shielding article that uses an inexpensive transparent electroconductive film having excellent electrical conductivity and visible light-transmission characteristics.

Means of Solving the Problems

Tungsten trioxide is a wide-bandgap oxide, absorbs very little visible light, does not contain free electrons (conduction electrons) in the structure, and therefore does not exhibit electrical conductivity. Tungsten trioxide having somewhat reduced oxygen, and so-called tungsten bronze obtained by adding Na or other electropositive elements to tungsten trioxide, are known to generate free electrons and to have electrical conductivity. It is acknowledged that tungsten trioxide having somewhat reduced oxygen, and tungsten bronze obtained by adding Na or other electropositive elements to tungsten trioxide, absorb visible light. Therefore, these products are not used as particle-dispersed transparent electroconductive materials.

The inventors discovered that it is possible to form a visible-light-transmitting transparent electroconductive film because the above-described tungsten trioxide having somewhat reduced oxygen, and tungsten bronze obtained by adding Na or other electropositive elements to tungsten trioxide, have strong absorbency of light having a wavelength of about 800 nm or greater, but the light absorption of these compounds in the wavelength region of about 380 nm to 780 nm (visible light region), which can be perceived by humans, is weak in comparison with the former (light having a wavelength of about 800 nm or greater).

The inventors, based on the wide bandgap of tungsten trioxide, used the backbone structure of tungsten trioxide, reduced the oxygen content of the tungsten trioxide or added positive ions to generate conduction electrons (free electrons), controlled the particle diameter and shape of the tungsten oxide particles and the composite tungsten oxide particles, manufactured particles that had electrical conductivity while allowing light in the visible region to pass, and used the manufactured particles to obtain a visible light transmitting particle-dispersed electrical conductor.

DISCLOSURE OF THE INVENTION

Specifically, in order to solve the aforementioned problems, a first aspect of the present invention provides a visible light transmitting particle-dispersed electrical conductor, which is a plural aggregate of electroconductive particles composed of a tungsten oxide expressed by the general formula $W_yO_z$ (where W is tungsten, O is oxygen, and $2.2 \leq z/y \leq 2.999$), and/or a composite tungsten oxide expressed by the general formula $M_xW_yO_z$ (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1$, and $2.2 \leq z/y \leq 3.0$), wherein the particle diameter is 1 nm or greater, the particles have visible light transmitting characteristics, and the pressed powder resistance of the particles measured under a pressure of 9.8 MPa is 1.0 Ω·cm or less.

A second aspect provides the visible light transmitting particle-dispersed electrical conductor of the first aspect, wherein the electroconductive particles contain acicular crystals or are entirely composed of acicular crystals, the ratio of the major and minor axes (major axis/minor axis) in the acicular crystals is 5 or greater, and the length of the major axis ranges from 5 nm or greater to 10,000 μm or less.

A third aspect provides the visible light transmitting particle-dispersed electrical conductor of the first aspect, wherein the electroconductive particles contain tabular crystals or are entirely composed of tabular crystals, the thickness of the tabular crystals ranges from 1 nm or greater to 100 μm or less, the maximum diagonal length of the tabular surfaces in the tabular crystals ranges from 5 nm or greater to 500 μm or less, and the ratio of the maximum diagonal length and the thickness of the tabular crystals (maximum diagonal length/thickness) is 5 or greater.

A fourth aspect provides the visible light transmitting particle-dispersed electrical conductor of any of the first to third aspects, wherein the electroconductive particles of the tungsten oxide include a Magneli phase having a composition ratio expressed by the general formula $W_yO_z$ (where W is tungsten, O is oxygen, and $2.45 \leq z/y \leq 2.999$).

A fifth aspect provides the visible light transmitting particle-dispersed electrical conductor of any of the first to fourth aspects, wherein the crystal structure of the electroconductive particles of the composite tungsten oxide expressed by the formula $M_xW_yO_z$ has an amorphous structure, or a cubic, tetragonal, or hexagonal tungsten bronze structure.

A sixth aspect provides the visible light transmitting particle-dispersed electrical conductor of the fifth aspect, wherein the added element M in the electroconductive particles of the composite tungsten oxide expressed by the formula $M_xW_yO_z$ is one or more elements selected from Cs, Rb, K, Tl, Ba, In, Li, Ca, Sr, Fe, and Sn.

A seventh aspect provides the visible light transmitting particle-dispersed electrical conductor of any of the first to sixth aspects, wherein the shape of the electroconductive particles is one or more shapes selected from granular, acicular, or tabular.

An eighth aspect provides the visible light transmitting particle-dispersed electrical conductor of any of the first to seventh aspects, wherein the visible light transmitting particle-dispersed electrical conductor is film-shaped.

A ninth aspect provides the visible light transmitting particle-dispersed electrical conductor of any of the first to eighth aspects, wherein the visible light transmitting particle-dispersed electrical conductor contains a binder.

A tenth aspect provides the visible light transmitting particle-dispersed electrical conductor of the ninth aspect, wherein the binder is a transparent resin or a transparent dielectric.

An eleventh aspect provides electroconductive particles that are used in the visible light transmitting particle-dispersed electrical conductor of any of the first to tenth aspects.

A twelfth aspect provides a visible-light-transmitting electroconductive article, wherein the visible light transmitting particle-dispersed electrical conductor of any of the first to tenth aspects is formed on a base material.

A thirteenth aspect provides a method for manufacturing electroconductive particles that contain a composite tungsten oxide expressed by the general formula $W_yO_z$ (where W is tungsten, O is oxygen, and $2.2 \leq z/y \leq 2.999$), and/or a composite tungsten oxide expressed by the general formula $M_xW_yO_z$ (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1.1$; and $2.2 \leq z/y \leq 3.0$), wherein the tungsten compound as a starting material of the electroconductive particles is heat treated in a reducing gas and/or an inert gas atmosphere to manufacture the electroconductive particles.

A fourteenth aspect provides the method for manufacturing electroconductive particles of the thirteenth aspect, wherein the heat treatment includes heat treating a tungsten compound, which is a starting material of the electroconductive particles, at 100° C. or greater and 850° C. or less in an atmosphere of a reducing gas, and subsequently heat treating the tungsten compound as required at a temperature of 550° C. or greater and 1,200° C. or less in an atmosphere of an inert gas.

A fifteenth aspect provides the method for manufacturing electroconductive particles of the thirteenth or fourteenth aspects, wherein a tungsten compound as a starting material of the electroconductive particles is one or more materials selected from tungsten trioxide; tungsten dioxide; a hydrate of tungsten oxide; tungsten hexachloride; ammonium tungstate; tungstic acid; a hydrate of tungsten oxide obtained by dissolving tungsten hexachloride in an alcohol and then drying the solution; a hydrate of tungsten oxide obtained by dissolving tungsten hexachloride in an alcohol, adding water to the solution to form a precipitate, and drying the precipitate; a tungsten compound obtained by drying an aqueous solution of ammonium tungstate; and a metal tungsten powder.

A sixteenth aspect provides the method for manufacturing electroconductive particles of the thirteenth to fifteenth aspects, wherein one or more powders selected from a powder in which a tungsten compound, which is a starting material of the electroconductive particles of the fifteenth aspect, and an element or compound containing an element M (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I) are mixed; and a powder, obtained by mixing a solution or liquid dispersion of the tungsten compound and a solution or liquid dispersion of the compound containing the element M and drying the solution, is used as the tungsten compound that is the starting material of the electroconductive particles.

Tungsten trioxide is a wide band gap material that transmits visible light, but the material is not electroconductive. The inventors used the backbone structure of tungsten trioxide, reduced the oxygen content of the tungsten trioxide or added positive ions to generate conduction electrons (free electrons), and manufactured a transparent electroconductive film that retains electrical conductivity while still allowing visible light to pass.

Also, Mo, Nb, Ta, Mn, V, Re, Pt, Pd, and Ti are elements that have the same properties as the above-described tungsten (these elements may hereinafter be abbreviated as "element A"). Similar to tungsten oxide, oxides of element A have the same structure as so-called tungsten bronze, which contains electropositive elements in the crystal. In view of this fact, the inventors arrived at the idea of combining element A and tungsten oxide, or employing an electroconductive film based on a so-called tungsten bronze structure in which an element A is used, and manufactured electroconductive films.

In order to solve the aforementioned problems, a seventeenth aspect provides a transparent electroconductive film composed of a tungsten oxide expressed by the general formula WyOz (where W is tungsten, O is oxygen, and $2.2 \leq z/y \leq 2.999$), and/or a composite tungsten oxide expressed by the general formula MxWyOz (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1.1$; and $2.2 \leq z/y \leq 3.0$), wherein the maximum transmittance in the region of 400 nm or greater to 780 nm or less ranges from 10% or greater to less than 92%, and the surface resistance of the film is $1.0 \times 10^{10}$ Ω/square or less.

An eighteenth aspect provides the transparent electroconductive film of the seventeenth aspect, wherein the element M includes one or more elements selected from Cs, Rb, K, Tl, In, Ba, Li, Ca, Sr, Fe, and Sn; and the composite oxide expressed by the general formula MxWyOz has a hexagonal crystal structure.

A nineteenth aspect provides the transparent electroconductive film of the seventeenth or eighteenth aspects, wherein the tungsten oxide has a Magneli phase having a composition ratio expressed by the general formula WyOz (where W is tungsten, O is oxygen, and $2.45 \leq z/y \leq 2.999$).

A twentieth aspect provides the transparent electroconductive of the seventeenth to nineteenth aspects, wherein the composite tungsten oxide expressed by the general formula MxWyOz has an amorphous structure, or one or more structures selected from cubic, tetragonal, and hexagonal tungsten bronze structures.

A twenty-first aspect provides the transparent electroconductive of the twentieth aspect, wherein the added element M in the hexagonal composite tungsten oxide expressed by the formula MxWyOz is one or more elements selected from Cs, Rb, K, Tl, Ba, In, Li, Ca, Sr, Fe, and Sn.

A twenty-second aspect provides a transparent electroconductive film composed of a composite oxide expressed by the general formula $M_E A_G W_{(1-G)} O_J$ (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; A is one or more elements selected from Mo, Nb, Ta, Mn, V, Re, Pt, Pd, and Ti; W is tungsten; O is oxygen; $0 < E \leq 1.2$; $0 < G \leq 1$; and $2 \leq J \leq 3$), wherein the maximum transmittance in the region of 400 nm or greater to 780 nm or less ranges from 10% or greater to less than 92%, and the surface resistance of the film is $1.0 \times 10^{10}$ Ω/square or less.

A twenty-third aspect provides the transparent electroconductive film of the twenty-second aspect, wherein the composite oxide expressed by the general formula $M_E A_G W_{(1-G)} O_J$ has an amorphous structure, or one or more structures selected from cubic, tetragonal, and hexagonal tungsten bronze structures.

A twenty-fourth aspect provides the transparent electroconductive film of the twenty-second or twenty-third aspect, wherein the element M includes one or more elements selected from Cs, Rb, K, Tl, In, Ba, Li, Ca, Sr, Fe, and Sn; and the composite oxide expressed by the general formula $M_E A_G W_{(1-G)} O_J$ has a hexagonal crystal structure.

A twenty-fifth aspect provides a transparent electroconductive article, wherein the transparent electroconductive film of any of the seventeenth to twenty-fourth aspects is formed on a base material.

A twenty-sixth aspect provides the transparent electroconductive article of the twenty-fifth aspect, wherein the thickness of the transparent electroconductive film ranges from 1 nm or greater to 5,000 nm or less.

A twenty-seventh aspect provides an infrared-shielding article, wherein the transparent electroconductive film of any of the seventeenth to twenty-sixth aspects is formed on a base material and has an infrared-shielding function.

A twenty-eighth aspect provides a method for manufacturing a transparent electroconductive film composed of a tungsten oxide expressed by the general formula WyOz (where W is tungsten, O is oxygen, and $2.2 \leq z/y \leq 2.999$), and/or a composite tungsten oxide expressed by the general formula MxWyOz (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1.1$; and $2.2 \leq z/y \leq 3.0$), and/or a composite oxide expressed by the general formula $M_E A_G W_{(1-G)} O_J$ (where the element A is one or more elements selected from Mo, Nb, Ta, Mn, V, Re, Pt, Pd, and Ti; $0 < E \leq 1.2$; $0 < G \leq 1$; and $2 \leq J \leq 3$), wherein a solution composed of the tungsten oxide, and/or the composite tungsten oxide, and/or the starting material compound of the composite oxide is applied to a base material and heat treated in an atmosphere of a reducing gas and/or an inert gas to manufacture the transparent electroconductive film.

A twenty-ninth aspect provides the method for manufacturing a transparent electroconductive film of the twenty-eighth aspect, wherein a surfactant is added to the solution composed of the tungsten oxide, and/or the composite tungsten oxide, and/or the starting material compound of the composite oxide; and the solution is then applied to a base material.

A thirtieth aspect provides the method for manufacturing a transparent electroconductive film of the twenty-eighth or twenty-nine aspects, wherein the solution composed of the tungsten oxide, and/or the composite tungsten oxide, and/or the starting material compound of the composite oxide is a solution obtained by dissolving tungsten hexachloride in an alcohol when tungsten is added, and/or is an aqueous solution of ammonium tungstate.

A thirty-first aspect provides the method for manufacturing a transparent electroconductive film of the twenty-eighth to thirtieth aspects, wherein a solution, obtained by dissolving and mixing an aqueous solution of ammonium tungstate and/or a solution obtained by dissolving tungsten hexachloride in alcohol according to the thirtieth aspect, and a compound having the element M (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I), is applied to a base material directly or after a surfactant has been added.

A thirty-second aspect provides the method for manufacturing a transparent electroconductive film of any of the twenty-eighth to thirty-first aspects, wherein the heat treatment is performed at a temperature ranging from 100° C. or greater to 800° C. or less in an atmosphere of a reducing gas, and is subsequently performed as required at a temperature ranging from 550° C. or greater to 1,200° C. or less in an atmosphere of an inert gas.

A material containing free electrons is commonly known to reflect/absorb electromagnetic waves in the vicinity of the region of solar light having a wavelength of 200 nm 2,600 nm produced by plasma vibrations. It is known that when a powder of such a material is formed into nanoparticles that are smaller than the wavelength of light, geometrical scattering in the visible light region (wavelengths from 380 nm to 780 nm) is reduced and transparency in the visible light region can be obtained. In the present specification, "transparency" is used in the sense that scattering of visible light is low and transmission characteristics are high.

On the other hand, so-called tungsten bronze, which is obtained by adding Na or another electropositive element to tungsten trioxide, is an electroconductive material and is known to be a material that has free electrons. Also, Mo, Nb, Ta, Mn, V, Re, Pt, Pd, and Ti (hereinafter referred to as "element A") are known, in addition to tungsten, as elements having the same properties as those described above. Similar to tungsten oxide, oxides of element A are known to have a so-called tungsten bronze structure that contains electropositive elements in the crystal. An analysis of a single crystal or the like of these materials suggests that electroconductive characteristics are present and that free electrons respond to visible light.

The inventors arrived at the present invention upon discovering that it is possible to manufacture an effective visible-light-transmitting near-infrared-shielding body and a visible-light-transmitting electroconductive infrared-shielding body by increasing the amount of free electrons contained in composite oxide nanoparticles that contain tungsten or an element A.

The inventors have also discovered that a film obtained by dispersing composite oxide nanoparticles in a suitable medium can more effectively absorb solar light, particularly in a near-infrared region, and can at the same time transmit visible light without the use light interference, and that these properties are superior to those of a film fabricated by spraying or a film fabricated by sputtering, vapor deposition, or ion-plating, as well as chemical vapor deposition (CVD) or another dry vacuum deposition method. These findings ultimately led to the present invention. The inventors also discovered that this dispersion itself exhibits electrical conductivity when these nanoparticles make contact with each other in the dispersion, because the composite oxide nanoparticles are electroconductive.

In order to solve the aforementioned problems, a thirty-third aspect provides an infrared-shielding nanoparticle dispersion obtained by dispersing infrared-shielding nanoparticles in a medium, wherein the infrared-shielding nanoparticles include composite tungsten oxide nanoparticles expressed by the general formula $M_E A_G W_{(1-G)} O_J$ (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; A is one or more elements selected from Mo, Nb, Ta, Mn, V, Re, Pt, Pd, and Ti; W is tungsten; O is oxygen; $0<E\leq1.2$; $0<G\leq1$; and $2\leq J\leq3$).

A thirty-fourth aspect provides the infrared-shielding nanoparticle dispersion of the thirty-third aspect, wherein the composite oxide nanoparticles expressed by the general formula $M_E A_G W_{(1-G)} O_J$ include one or more nanoparticles selected from composite oxide nanoparticles having a hexagonal crystal structure, composite oxide nanoparticles having a tetragonal crystal structure, and composite oxide nanoparticles having a cubic crystal structure.

A thirty-fifth aspect provides the infrared-shielding nanoparticle dispersion of the thirty-third or thirty-fourth aspects, wherein the element M includes one or more elements selected from Cs, Rb, K, Tl, In, Ba, Li, Ca, Sr, Fe, and Sn; and the composite oxide expressed by the general formula $M_E A_G W_{(1-G)} O_J$ has a hexagonal structure.

A thirty-sixth aspect provides the infrared-shielding nanoparticle dispersion of any of the thirty-third to thirty-fifth aspects, wherein the surfaces of the infrared-shielding nanoparticle dispersion are covered by an oxide composed of one or more elements selected from Si, Ti, Zr, and Al.

A thirty-seventh aspect provides the infrared-shielding nanoparticle dispersion of any of the thirty-third to thirty-sixth aspects, wherein the medium is resin or glass.

A thirty-eighth aspect provides the infrared-shielding nanoparticle dispersion of the thirty-seventh aspect, wherein the resin is one or more resins selected from polyethylene resin, polyvinyl chloride resin, polyvinylidene chloride resin, polyvinyl alcohol resin, polystyrene resin, polypropylene resin, ethylene-vinyl acetate copolymer, polyester resin, polyethylene terephthalate resin, fluorine resin, polycarbonate resin, acrylic resin, and polyvinyl butyral resin.

A thirty-ninth aspect provides an infrared-shielding body, wherein the infrared-shielding nanoparticle dispersion of any of the thirty-third to thirty-eighth aspects is formed in a plate shape, film shape, or thin film shape.

A fortieth aspect provides the infrared-shielding body of the thirty-ninth aspect, wherein V is 10% or greater, where V is the maximum transmittance of all light rays in the wavelength region of 400 nm to 700 nm; and the minimum transmittance of all light rays in the wavelength region of 700 nm to 2,600 nm is equal to or less than the value V, and is 65% or less.

A forty-first aspect provides the infrared-shielding body of the thirty-ninth aspect, wherein V is 10% or greater, where V is the maximum transmittance of all light rays in the wavelength region of 400 nm to 700 nm; and the surface resistance of the film is $1.0 \times 10^{10}$ Ω/square or less.

A forty-second aspect provides a method for manufacturing infrared-shielding nanoparticles composed of composite oxide nanoparticles expressed by the general formula $M_E A_G W_{(1-G)} O_J$ (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; A is one or more elements selected from Mo, Nb, Ta, Mn, V, Re, Pt, Pd, and Ti; W is tungsten; O is oxygen; $0 < E \leq 1.2$; $0 < G \leq 1$; and $2 \leq J \leq 3$), wherein the starting material of the composite oxide nanoparticles is heat treated in an atmosphere of a reducing gas and/or an inert gas at 250° C. or greater to manufacture the composite oxide nanoparticles.

A forty-third aspect provides the method for manufacturing infrared-shielding nanoparticles of the forty-second aspect, wherein the starting material of the composite oxide nanoparticles is a tungsten compound, an element A compound, and an element M compound, and is one or more compounds selected from oxides, hydrated oxides, chlorides, ammonium salts, carbonates, nitrates, sulfates, oxalates, hydroxides, peroxides, and simple metals of the corresponding element.

A forty-fourth aspect provides the method for manufacturing infrared-shielding nanoparticles of the forty-second aspect, wherein the starting material of the composite oxide nanoparticles is a powder obtained by mixing a solution composed of a tungsten compound, an element A compound, and an element M compound, and then drying the solution.

A forty-fifth aspect provides infrared-shielding nanoparticles manufactured using the method for manufacturing infrared-shielding nanoparticles of any of the forty-second to forty-fourth aspects, wherein the nanoparticles include composite oxide nanoparticles expressed by the general formula $M_E A_G W_{(1-G)} O_J$ (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; A is one or more elements selected from Mo, Nb, Ta, Mn, V, Re, Pt, Pd, and Ti; W is tungsten; O is oxygen; $0 < E \leq 1.2$; $0 < G \leq 1$; and $2 \leq J \leq 3$).

KEY

Figure 1A:
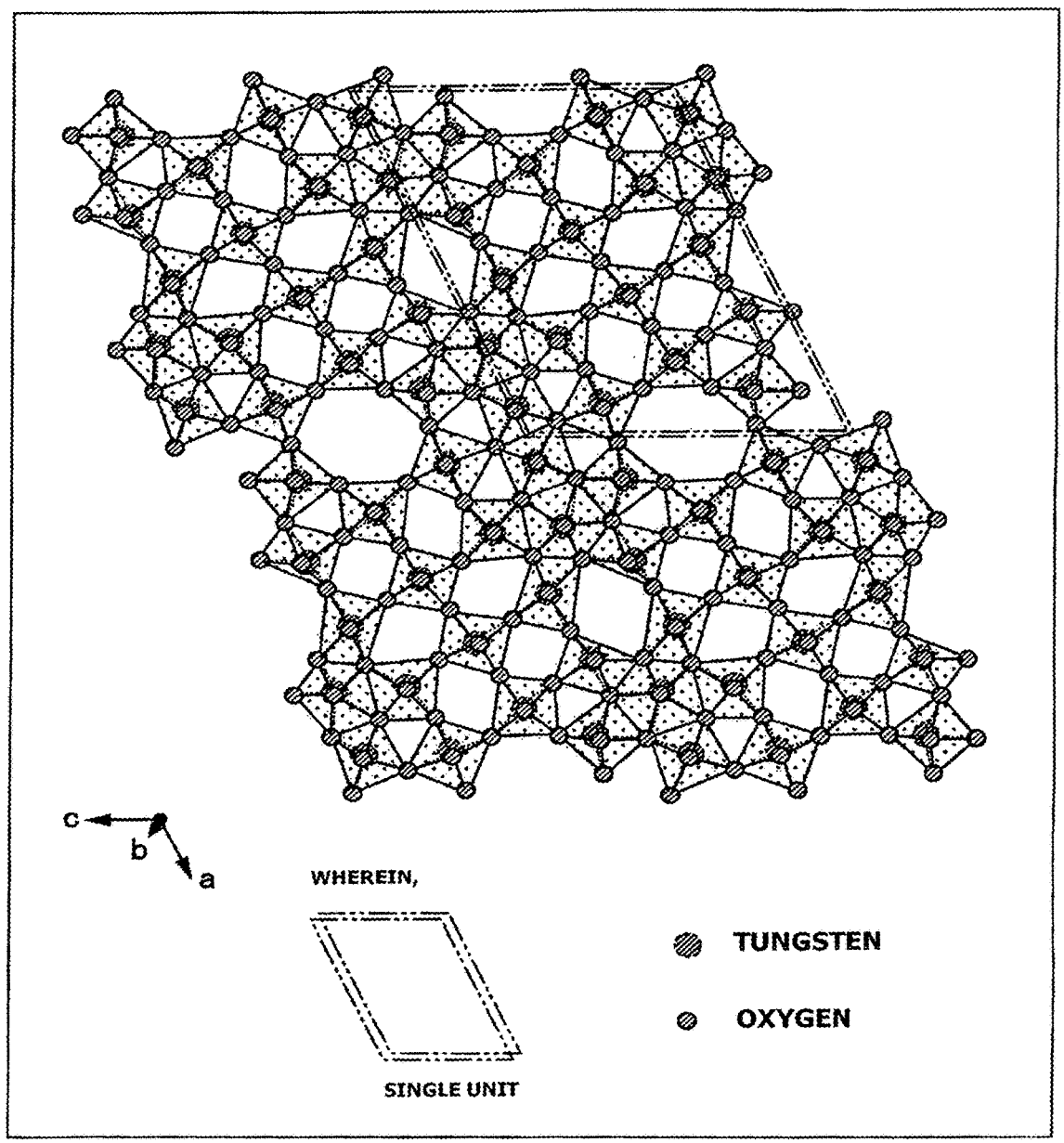
FIG. 1A is a schematic drawing showing the crystal structure of a tungsten oxide, and is the crystal structure of $W_{18}O_{49}$ ((010) projection)

1 $WO_6$ unit
2 element M

Effects of the Invention

The visible light transmitting particle-dispersed electrical conductor of the first to tenth aspects has excellent transmittance of light in the visible region and excellent electrical conductivity because the electrical conductor has electroconductive particles in which the oxygen content of tungsten trioxide is reduced to cause conduction electrons to be generated, and/or electroconductive particles that include a composite tungsten oxide that is made to generate conduction electrons by adding positive ions to tungsten trioxide.

The electroconductive particles of the eleventh aspect have excellent electrical conductivity and excellent transmittance of visible light, and can therefore be advantageously applied to the visible light transmitting particle-dispersed electrical conductor of the first to tenth aspects.

The visible-light-transmitting particle-dispersed electroconductive article of the twelfth aspect has excellent electrical conductivity and excellent transmittance of visible light.

In accordance with the method for manufacturing electroconductive particles of the thirteenth to sixteenth aspects, the electroconductive particles can be manufactured at low cost by using a simple method because the particles can be obtained by heat treating a tungsten compound, which is a starting material of the electroconductive particles, in an atmosphere of a reducing gas and/or inert gas.

In accordance with the seventeenth to twenty-seventh aspects, the backbone structure of a tungsten trioxide that transmits light in the visible range but does not have electrical conductivity, or a composite oxide of tungsten and an element A is used, and since conduction electrons are generated in the tungsten trioxide or composite oxide of tungsten and an element A, an inexpensive transparent electroconductive film that has excellent electrical conductivity and transmittance to visible light can be obtained. The film has a tungsten oxide in which the oxygen content is reduced or a composite tungsten oxide in which conduction electrons are generated by adding positive ions. Also, a transparent electroconductive article that uses the transparent electroconductive film can be provided with electrical conductivity via the conduction electrons, and can transmit light in the visible range at the same time.

In accordance with the twenty-eighth to thirty-second aspect, the transparent electroconductive film can be obtained by a simple method in which a starting tungsten material solution is applied to a base material and then heat treated in an atmosphere of a reducing gas and/or inert gas.

Therefore, the method is useful because the film can be easily manufactured using inexpensive materials in comparison with a conventional indium compound.

The infrared-shielding nanoparticle dispersion of the thirty-third to forty-first aspects is an infrared-shielding nanoparticle dispersion obtained by dispersing infrared-shielding nanoparticles in a medium, wherein the infrared-shielding nanoparticles include composite oxide nanoparticles expressed by the general formula $M_E A_G W_{(1-G)} O_J$ (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; A is one or more elements selected from Mo, Nb, Ta, Mn, V, Re, Pt, Pd, and Ti; W is tungsten; O is oxygen; $0<E\leq1.2$; $0<G\leq1$; and $2\leq J\leq3$), the amount of free electrons in these composite oxides is increased, and this film can more effectively absorb and shield solar light, particularly in a near-infrared region, and can simultaneously retain transmittance in the visible light region in comparison with a film fabricated by spraying, or a film fabricated by sputtering, vapor deposition, or ion-plating, as well as chemical vapor deposition (CVD) or another dry method vacuum deposition method.

Since these infrared-shielding nanoparticles have electrical conductivity, the dispersion itself can function as an electroconductive material by causing the particles to make contact with each other in the infrared-shielding nanoparticle dispersion. The dispersion can also be used as an infrared-shielding body that transmits visible-light and has electrical conductivity.

The infrared-shielding nanoparticle dispersion has industrial utility in that the body can be manufactured at low cost without the use of a vacuum apparatus or other bulky equipment.

BEST MODE FOR CARRYING OUT THE INVENTION

Embodiments of the present invention are described below in the following order: [1] visible light transmitting particle-dispersed electrical conductor, electroconductive particles, visible-light-transmitting electroconductive article, and method for manufacturing the same; [2] transparent electroconductive film and method for manufacturing the same, transparent electroconductive article, and infrared-shielding article; and [3] infrared-shielding nanoparticle dispersion, infrared-shielding body, method for manufacturing infrared-shielding nanoparticles, and infrared-shielding nanoparticles.

[1] Visible Light Transmitting Particle-Dispersed Electrical Conductor, Electroconductive Particles, Visible-Light-Transmitting Electroconductive Article, and Method for Manufacturing the Same The visible light transmitting particle-dispersed electrical conductor of the present invention has a tungsten oxide expressed by the general formula WyOz (where W is tungsten, O is oxygen, and $2.2\leq z/y\leq2.999$), and/or a composite tungsten oxide expressed by the general formula MxWyOz (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001\leq x/y\leq1.1$; and $2.2\leq z/y\leq3.0$), wherein the particle diameter is 1 nm or greater, the particles have visible light transmitting characteristics, and the pressed powder resistance of the particles measured under a pressure of 9.8 MPa is 1.0 Ω·cm or less. The resulting electroconductive particles are aggregated to bring the particles into contact with each other and to form an electroconductive body.

When the electroconductive particles include acicular crystals or are entirely composed of acicular crystals, the ratio of the major and minor axes (major axis/minor axis) in the acicular crystals is 5 or greater, and the length of the major axis ranges from 5 nm or greater to 10,000 m. When the electroconductive particles include tabular crystals or are entirely composed of tabular crystals, the thickness of the tabular crystals ranges from 1 nm or greater to 100 μm or less, the maximum diagonal length of the tabular surfaces in the tabular crystals ranges from 5 nm or greater to 500 μm or less, and the ratio of the maximum diagonal length and the thickness of the tabular crystals (maximum diagonal length/thickness) is 5 or greater.

The visible light transmitting particle-dispersed electrical conductor and the electroconductive particles used in the electrical conductor are described in detail below.

1. Electroconductive Particles

Tungsten trioxide ($WO_3$) generally has excellent visible-light transmittance, but since effective conduction electrons are not present, tungsten trioxide is not an effective electroconductive material. It is known that free electrons can be generated in $WO_3$ by reducing the ratio of oxygen to tungsten in the $WO_3$ to less than 3. The inventors discovered that, in specific areas of the tungsten/oxygen composition range, there is a uniquely effective range in which the composition acts as an electroconductive material.

In the tungsten oxide described above, the tungsten/oxygen composition range is one in which the composition ratio of oxygen to tungsten is less than 3, and the range $2.2 \leq z/y \leq 2.999$ is preferred when the electroconductive particles have the formula $W_yO_z$. When the value of z/y is 2.2 or greater, formation of an unwanted $WO_2$ crystal phase in the electroconductive material can be avoided and the material can be provided with chemical stability, and can therefore be used as an effective electroconductive material. When the value of z/y is 2.999 or less, the required amount of free electrons can be generated to produce an electroconductive material.

In the above-described composite tungsten oxide, conduction electrons (free electrons) are generated in the $WO_3$ and an effective electroconductive material is obtained by adding an element M (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I) to tungsten trioxide ($WO_3$).

In other words, the electroconductive material must be a composite tungsten oxide expressed by the general formula $M_xW_yO_z$ (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1.1$; and $2.2 \leq z/y \leq 3.0$). From the standpoint of stability, the element M is preferably one or more elements selected from alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I.

In relation to the oxygen content and the added amount of the element M, the material is preferably one in which the ranges $0.001 \leq x/y \leq 1.1$, and $2.2 \leq z/y \leq 3.0$ are satisfied when the electroconductive particles have the formula $M_xW_yO_z$ (where M is as described above, W is tungsten, and O is oxygen). As the addition amount of the element M is increased, the supply amount of conduction electrons tends to increase as well. This is due to the fact that, as noted above, $M_xW_yO_z$ has the crystal structure of so-called tungsten bronze. In stoichiometric terms, the addition amount of the element M per mole of tungsten, for example, is preferably no more than about 0.33 mol in the case of a hexagonal tungsten bronze crystal structure, preferably no more than about 0.5 mol in the case of a tetragonal tungsten bronze crystal structure, and preferably no more than about 1 mol in the case of a cubic tungsten bronze crystal structure. However, since the above-described crystal structures can occur in various modes, the addition amount of the element M is not necessarily limited to the addition amounts described above.

Next, the value of z/y, which is used to control the oxygen content, in the composite tungsten oxide expressed by $M_xW_yO_z$, is described below. In addition to the fact that conduction electrons (free electrons) are produced in the same range ($2.2 \leq z/y \leq 2.999$) as the tungsten oxide $W_yO_z$ described above, the value of z/y preferably satisfies the range $2.2 \leq z/y \leq 3.0$, and more preferably satisfies the range $2.72 \leq z/y \leq 3.0$, because conduction electrons are supplied by the addition of the above-described element M even when z/y=3.0.

Also, the electroconductive particles of the present embodiment preferably have a particle size of 1 nm or greater. The electroconductive particles absorb a considerable amount of light in the vicinity of the wavelength 1,000 nm, and the transmission color tone is often between a blue color and a green color. The size of the particles can be selected based on the intended use. First, when the particles are to be used in applications in which transparency is to be retained, the particle diameter is preferably 800 nm or less. This is due to the fact that particles having a diameter of less than 800 nm do not perfectly shield light by scattering the light, visibility is retained in the visible light region, and transparency can be retained at the same time with good efficiency. In the particular case that importance in placed on transparency in the visible light region, the scattering produced by the particles is preferably given further consideration.

When importance is placed on reducing scattering produced by the particles, the particle diameter is 200 nm or less, and more preferably 100 nm or less. The reason for this is that if the particle diameter is too small, the scattering of light in the visible light wavelength region of 380 nm to 780 nm is reduced due to geometrical scattering or Mie scattering. Therefore, it is possible to avoid a situation in which the film becomes similar to clouded glass and clear transparency cannot be obtained. In other words, when the particle diameter is 200 nm or less, the geometrical scattering or Mie scattering is reduced and a Rayleigh scattering region is formed. This is due to the fact that the scattered light is reduced in an inverse proportion to the particle diameter by a factor of 6 in this Rayleigh scattering region, and the scattering is reduced as the particles are made smaller and the transparency is enhanced. When the particle diameter is 100 nm or less, the amount of scattered light is very low, and such a situation is not preferred. From the standpoint of avoiding the scattering of light, the particle diameter is preferably small. Also, if the particle diameter is 1 nm or greater, the particles are easy to handle and manufacture on a commercial scale.

To improve the electrical conductivity of the electroconductive particles, the shape of the electroconductive particles used in the present invention is preferably acicular or tabular. This is because the electrical conductivity of the electroconductive body is reduced due to the contact resistance between the particles, the number of contact points between the particles can therefore be reduced as long as the particle dispersion is composed of acicular or tabular electroconductive particles, and an electroconductive body that has higher electrical conductivity can be obtained.

Therefore, when the electroconductive particles used in the present invention include tabular crystals or are entirely composed of tabular crystals, the thickness of the tabular crystal particles ranges from 1 nm or greater to 100 or less, the maximum diagonal length of the tabular surfaces in the tabular crystals ranges from 5 nm or greater to 500 μm or less, and the ratio of the maximum diagonal length and the thickness of the tabular crystals in the tabular plane is 5 or greater.

When measured under a pressure of 9.8 MPa, the pressed powder resistance of the electroconductive particles used in the present invention and obtained in this manner is 1.0 Ω·cm or less. If the pressed powder resistance is 1.0 Ω·cm or less, an effective electrical conductor film can be obtained and the range of application can be expanded, resulting in an advantageous situation.

The tungsten oxide particles constituting the electroconductive particles of the present embodiment preferably has a Magneli phase having a composition ratio expressed by the general formula $W_yO_z$ (where W is tungsten, O is oxygen, $2.45 \leq z/y \leq 2.999$). A Magneli phase is chemically stable and is advantageous as an electroconductive material.

Figure 1B:
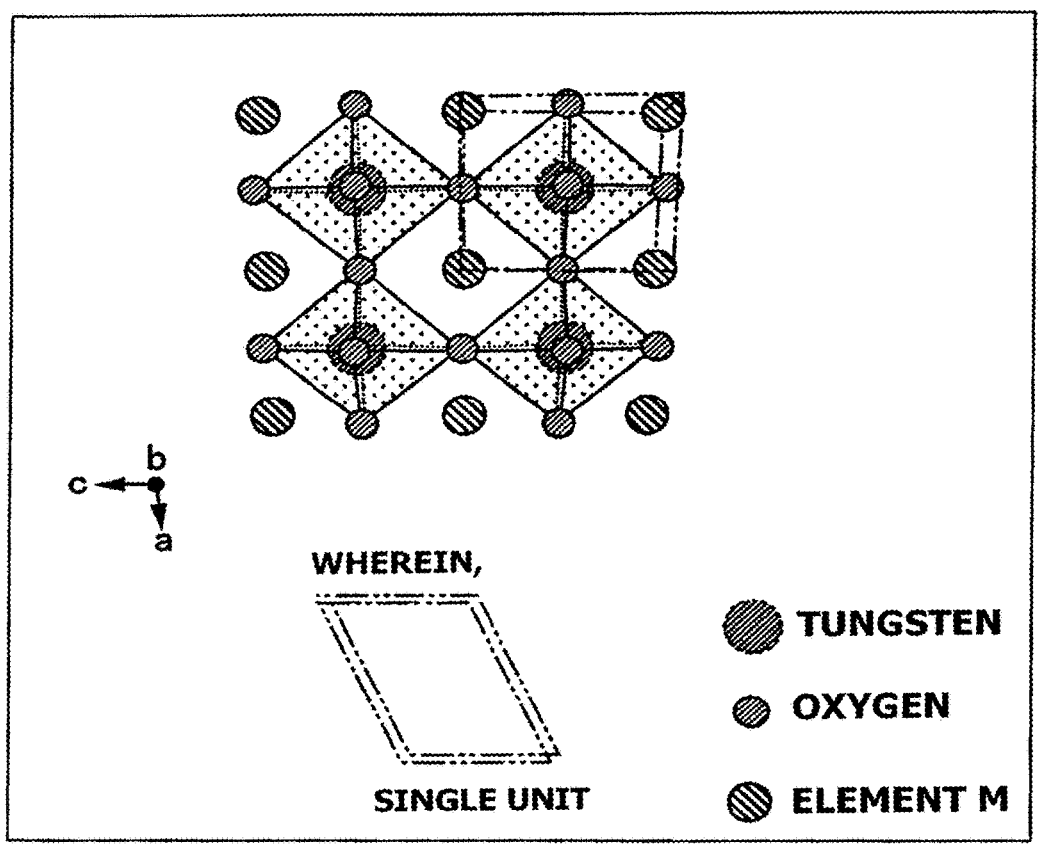
FIG. 1B is a schematic drawing showing the crystal structure of a tungsten oxide, and is the crystal structure of cubic tungsten bronze ((010) projection)
Figure 1C:
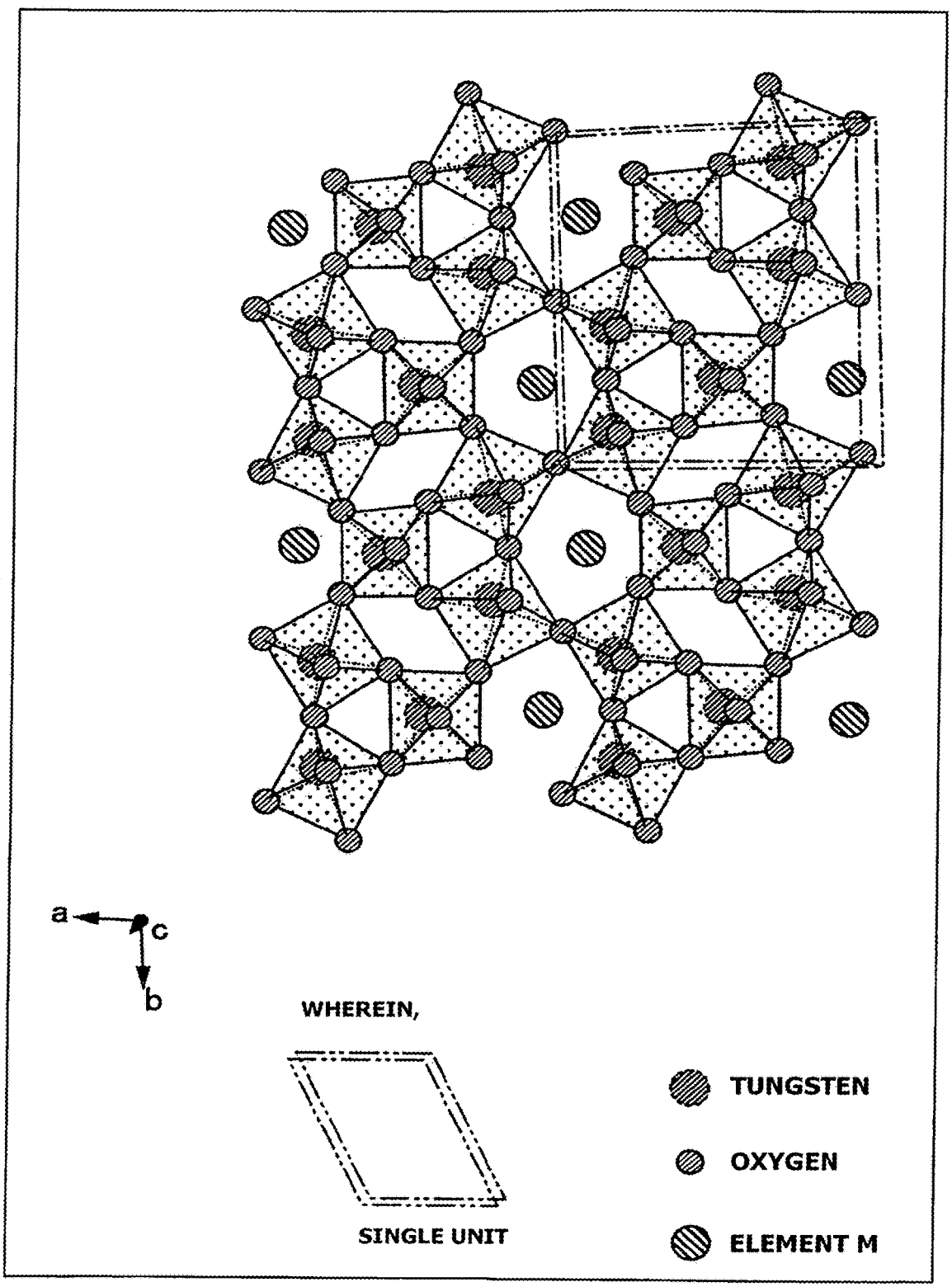
FIG. 1C is a schematic drawing showing the crystal structure of a tungsten oxide, and is the crystal structure of tetragonal tungsten bronze ((001) projection)
Figure 1D:
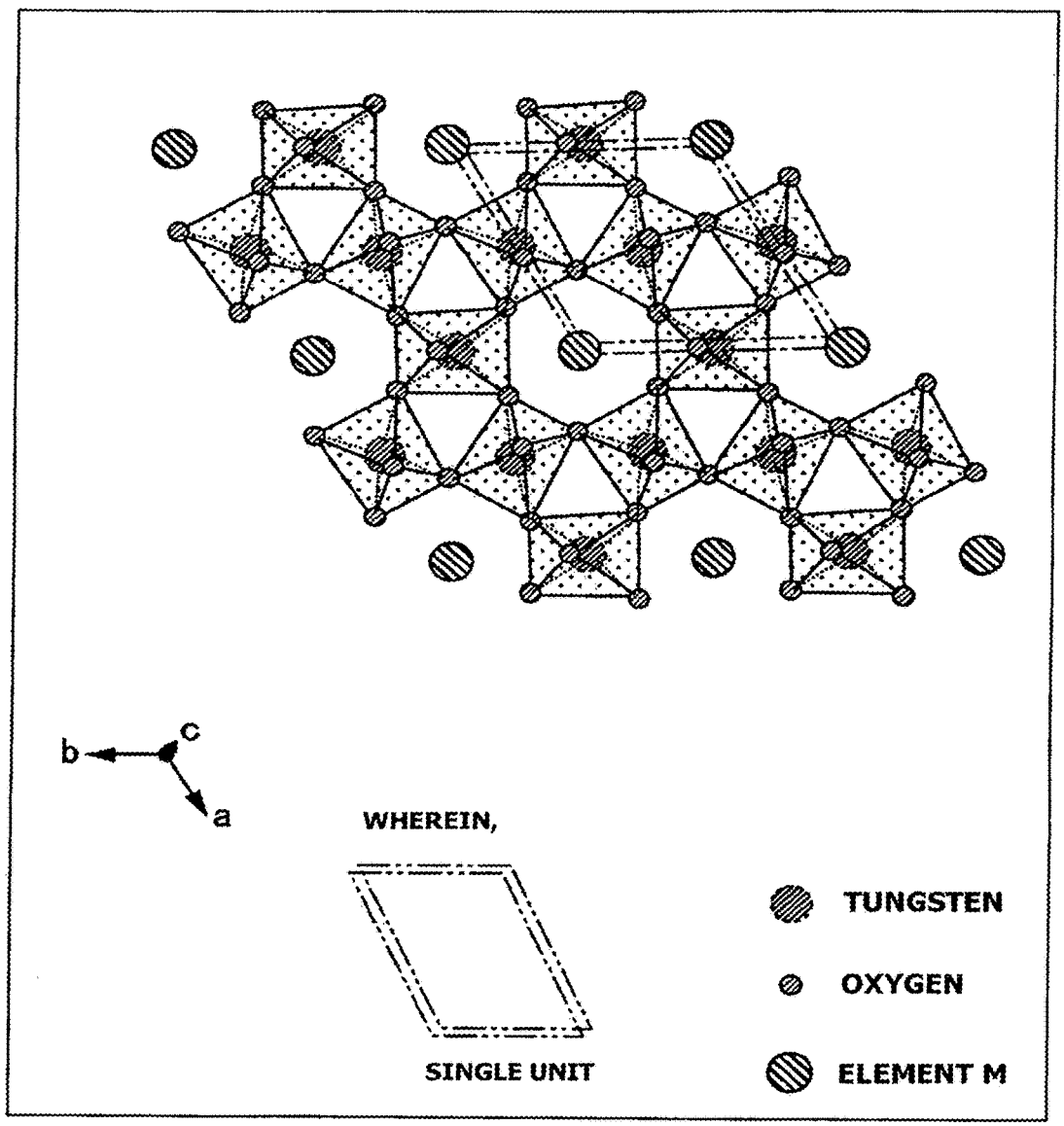
FIG. 1D is a schematic drawing showing the crystal structure of a tungsten oxide, and is the crystal structure of hexagonal tungsten bronze ((001) projection)

Here, the electrical conduction mechanism of the transparent electroconductive film of the present invention is briefly described with reference to the drawings. FIGS. 1A to 1D are schematic drawings showing the crystal structure of tungsten oxide and a composite tungsten oxide, wherein FIG. 1A is the crystal structure of $W_{18}O_{49}$ ((010) projection); FIG. 1B is the crystal structure of cubic tungsten bronze ((010) projection); FIG. 1C is the crystal structure of tetragonal tungsten bronze ((001) projection); and FIG. 1D is the crystal structure of hexagonal tungsten bronze ((001) projection).

The structure of tungsten trioxide has an octahedral structure composed of $WO_6$, and may be regarded as a single unit. W atoms are positioned in the octahedral structure, and oxygen is positioned at the apexes of the octahedral structure. In all octahedral structures, the apexes are shared with an adjacent octahedral structure. In this case, conduction electrons are not present in the structure. On the other hand, the Magneli phase expressed by $WO_{2.9}$ or another composition ratio is a structure in which the octahedral structure of $WO_6$ shares edges and apexes in an orderly fashion. $W_{18}O_{49}$ ($WO_{2.72}$) having the structure shown in FIG. 1(A) has an orderly structure in which the octahedral structure of $WO_6$ and the decahedral structure of $WO_{10}$ as a single unit share edges and apexes. Tungsten oxide having such a structure is believed to be provided with electrical conductivity via the contribution of electrons released by oxygen as conduction electrons.

The above-described structure of tungsten trioxide produces conduction electrons in a completely uniform, non-uniform, or amorphous structure, and electroconductive characteristics can be obtained.

The composite tungsten oxide expressed by the formula MxWyOz preferably has an amorphous structure or a cubic, tetragonal, or hexagonal tungsten bronze structure.

With this composite tungsten oxide, the element M is positioned in gaps resulting from the sharing of apexes by an octahedral structure, as shown in FIGS. 1B to 1D. It is believed that conduction electrons are generated by adding such elements M. The structure of a composite tungsten oxide is typically cubic, tetragonal, or hexagonal, and a structural example of each is shown in FIGS. 1B, 1C, and 1D. These composite tungsten oxides have a structure-based upper limit to the amount of addition element, and the maximum addition amount of the element M per mole of W is as follows: 1 mol in the case of a cubic system, about 0.5 mol in the case of a tetragonal system (this varies depending on the addition amount, but 0.5 mol can be easily produced on a commercial scale), and 0.33 mol in the case of a hexagonal system. However, these structures are difficult to define in a simple manner, and the range of maximum addition amounts of the addition element M described above is an example that particularly shows a basic preferred range. This invention is not limited to this range. Several types of structures may be adopted in the crystal structure by compositing materials. The above-described structure is a representative structure, and no limitation is imposed by the structure.

In a composite tungsten oxide, the optical characteristics vary depending on the above-described structure. Hexagonal systems in particular tend to have a light absorption region based on conduction electrons in the near-infrared region having longer wavelengths, and absorption in the visible light region is also low. Next, tetragonal systems and cubic systems tend to absorb light having shorter wavelengths by means of conduction electrons, and absorption in the visible light region is also high. Accordingly, a composite tungsten oxide, which has a hexagonal structure, is preferred for the above-stated reasons as the transparent electroconductive film capable of transmitting more visible light.

It is commonly known that a hexagonal system is formed when an element M having a large ion radius is added to a composite tungsten oxide. Specifically, when any of the elements Cs, K, Rb, Ti, Ba, In, Li, Ca, Sr, Fe, and Sn are added, a hexagonal system is readily formed, and such a situation is preferred. However, as long as the added element M is present in the gaps of the hexagonal structure, as shown in FIG. 1D, for example, a $WO_6$ unit can be formed using an element other than those noted above, and no limitation is imposed by these elements. Also, a composite tungsten oxide having these hexagonal structures may be a uniform crystal structure or an irregular crystal structure.

In this case, it is possible to use both methods, i.e., to limit the above-described oxygen content and to add an element M for generating conduction electrons to the tungsten trioxide ($WO_3$). Also, when the transparent electroconductive film described above is used as an infrared-shielding film, a material that is suitable for the desired purpose, e.g., an element M, may be selected at an appropriate time.

When electroconductive particles of a composite tungsten oxide having a hexagonal structure are formed in a uniform structure, the addition amount of the element M is preferably 0.1 or more and 0.4 or less, and is more preferably 0.33.

This is because the value theoretically calculated from the crystal structure is 0.33, and desirable electroconductive characteristics can be obtained using similar addition amounts.

Figure 4A:
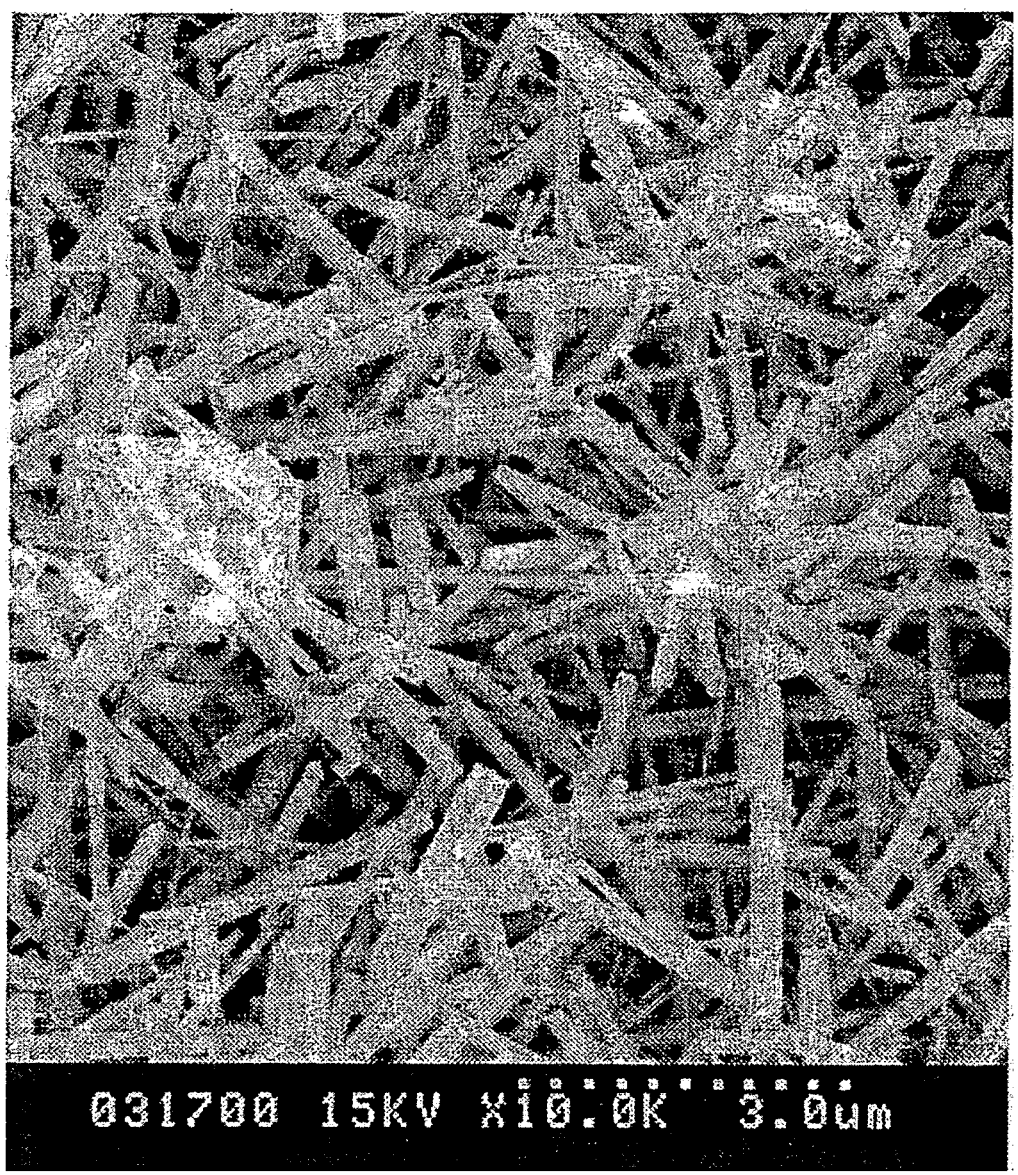
FIG. 4A is an enlarged view showing an SEM image of acicular crystals composed of Magneli-phase $W_{18}O_{49}$ ($WO_{2.72}$), which are the electroconductive particles obtained in Example 1.
Figure 4B:
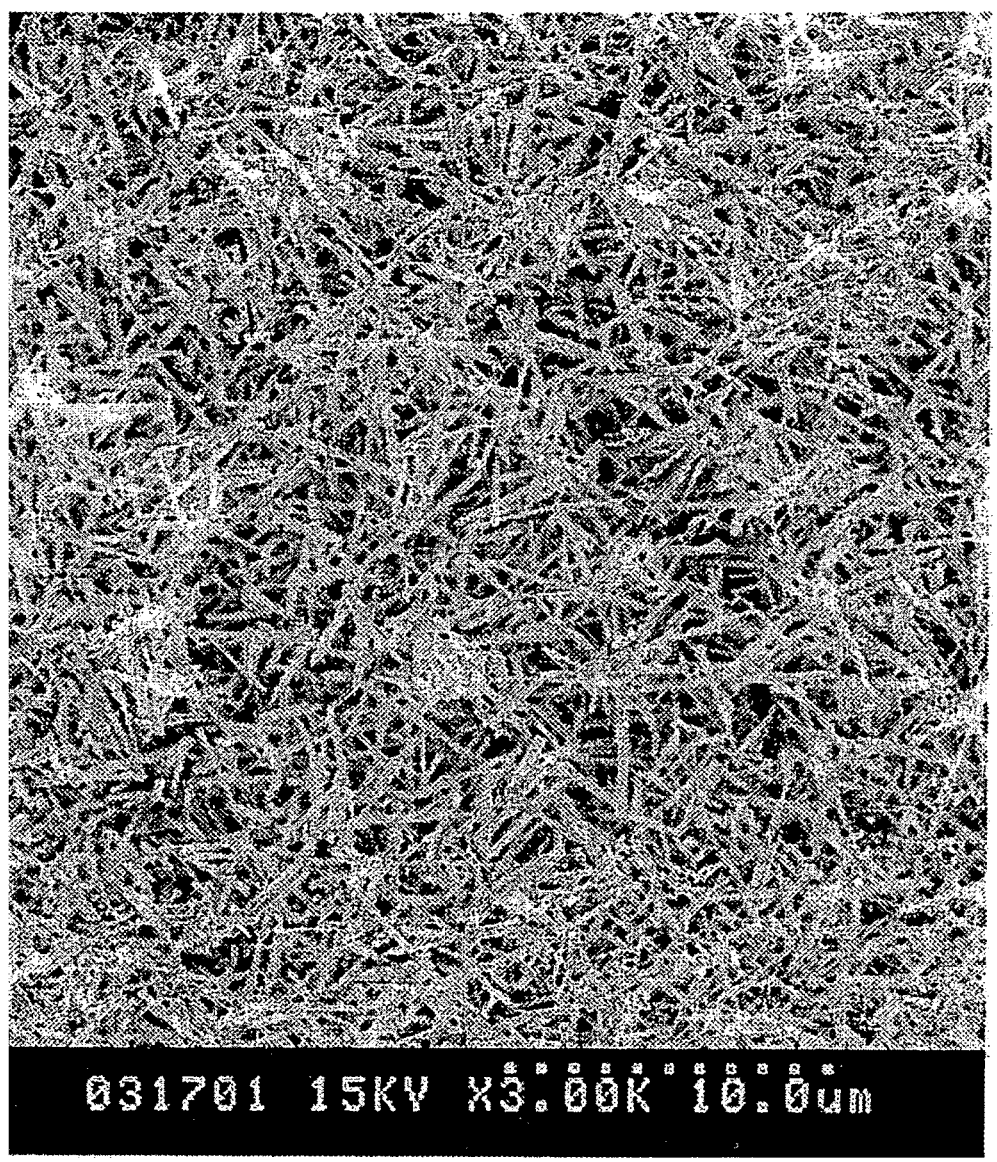
FIG. 4B is an overall view of FIG. 4A.
Figure 6A:
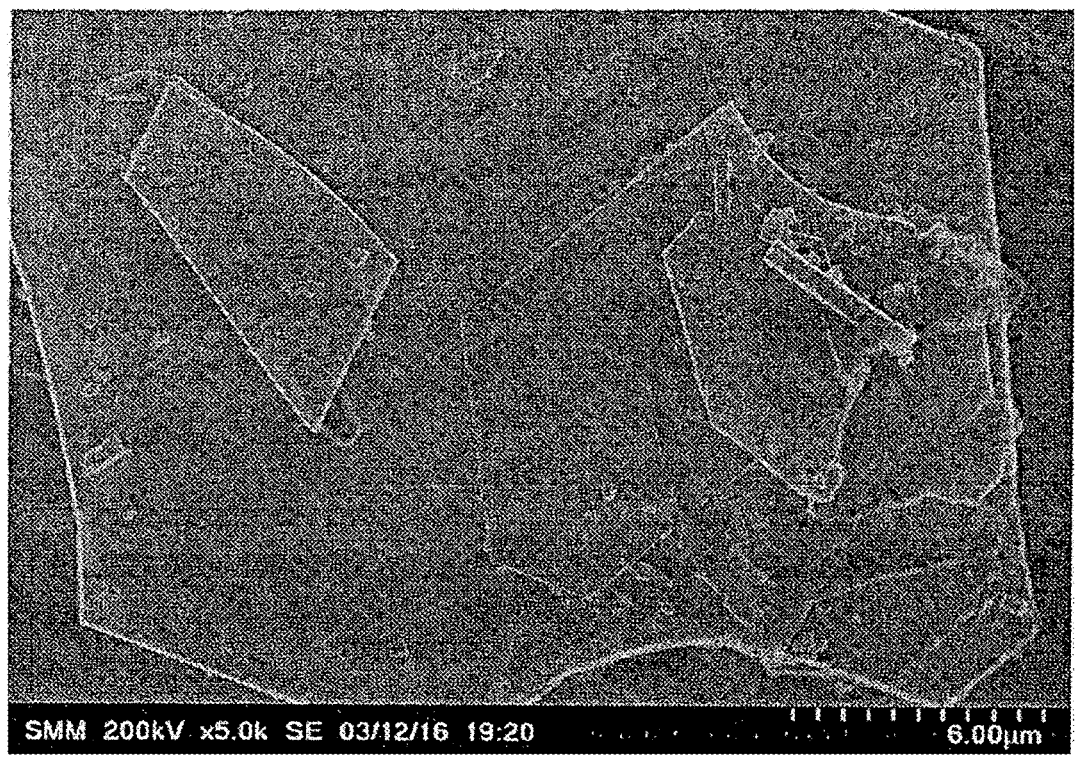
FIG. 6A is an enlarged view showing an SEM image of tabular crystals composed of hexagonal tungsten bronze $Cs_{0.35}WO_3$, which are the electroconductive particles obtained in example 4.
Figure 6B:
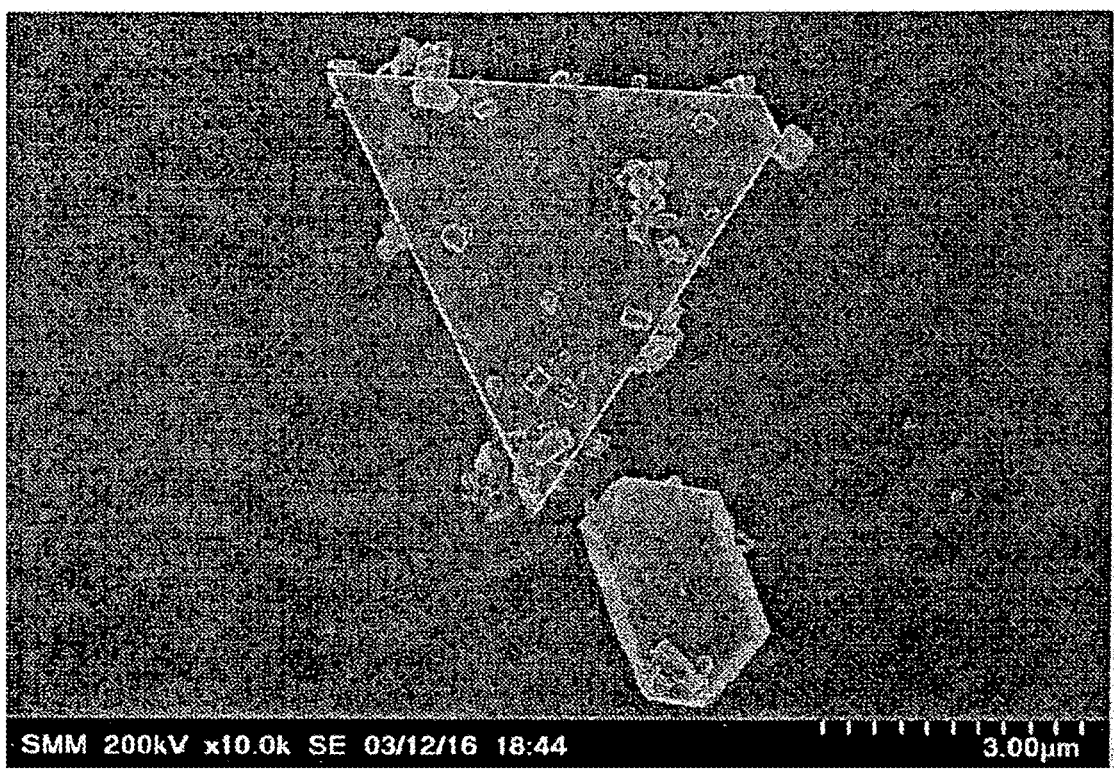
FIG. 6B is an enlarged view showing an SEM image of tabular crystals composed of hexagonal tungsten bronze $Cs_{0.35}WO_3$, which are the electroconductive particles obtained in Example 4.

The shape of the electroconductive particles of the present embodiment may be one or more shapes selected from granular, acicular, or tabular shapes. The tungsten oxide particles and composite tungsten oxide particles constituting the electroconductive particles can be easily formed into acicular shapes (e.g., refer to FIGS. 4A and 4B showing SEM images of the acicular crystals of $W_{18}O_{49}$ ($W_{2.72}$) of Example 1 described later), and better electroconductive characteristics can be obtained when a dispersed body is formed. The above-described tungsten bronze can form tabular shapes (e.g., refer to FIGS. 6A and 6B showing SEM images of the tabular crystals of hexagonal tungsten bronze $Cs_{0.35}WO_3$ ($W_{2.72}$) of Example 4 described later), and is effective for obtaining excellent electroconductive characteristics when a dispersed body is formed.

The electroconductive particles of the present invention do not require the use of expensive starting materials such as In and noble metals in comparison with the case in which ITO particles and noble metal particles are used. Therefore, the visible light transmitting particle-dispersed electrical conductor described below can be obtained at low cost.

2. Method for Manufacturing Electroconductive Particles

The electroconductive particles composed of a tungsten oxide expressed by the general formula WyOz (where W is tungsten, O is oxygen, and $2.2 \leq z/y \leq 2.999$), and/or the electroconductive particles composed of a composite tungsten oxide expressed by the general formula MxWyOz (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1.1$; and $2.2 \leq z/y \leq 3.0$) are obtained by heat treating a tungsten compound (hereinafter referred to as "tungsten compound starting material"), which is a starting material of the electroconductive particles, in an atmosphere of an inert gas and/or reducing gas. The electroconductive particles can be obtained at low cost by using a simple method.

Preferably used as the tungsten oxide starting material of the above-described electroconductive particles is one or more compounds selected from tungsten trioxide; tungsten dioxide; tungsten oxide hydrate; tungsten hexachloride; ammonium tungstate; tungsten oxide; tungsten oxide hydrate obtained by dissolving tungsten hexachloride in an alcohol and then drying the solution; tungsten oxide hydrate obtained by dissolving tungsten hexachloride in an alcohol, adding water to the solution to form a precipitate, and drying the precipitate; a tungsten compound obtained by drying an aqueous solution of ammonium tungstate; and a metal tungsten powder.

When the tungsten oxide electroconductive particles are produced, it is further preferable from the standpoint of facilitating the production step to use tungsten trioxide, tungsten oxide hydrate powder, tungsten oxide, or an aqueous solution of ammonium tungstate. When the composite tungsten oxide electroconductive particles are produced, it is preferable to use an aqueous solution of ammonium tungstate or an aqueous solution of tungsten hexachloride from the standpoint of producing a uniform mixture of the elements when the tungsten compound starting materials are in a solution. When the starting materials are not in a liquid state, tungsten oxide or the like is preferably used.

The tungsten compound starting materials are heat treated at a temperature ranging from 100° C. or greater to 850° C. or less in an atmosphere of a reducing gas, and subsequently heat treated as required at a temperature ranging from 550° C. or greater to 1,200° C. or less in an atmosphere of an inert gas, whereby the tungsten oxide particles and composite tungsten oxide particles having the above-described diameters (from 1 nm or greater to 10,000 µm or less) can be obtained.

The heat treatment conditions for manufacturing tungsten oxide particles are described below.

The heat treatment conditions in a reducing atmosphere preferably include, first, heat treating the tungsten compound starting material in a reducing atmosphere of from 100° C. or greater to 850° C. or less. A temperature of 100° C. or greater is preferred because the reductive reaction progresses more adequately. A temperature of 850° C. or less is preferred because reduction does not progress excessively. The reducing gas is not particularly limited, but $H_2$ is preferred. When $H_2$ is used as the reducing gas, $H_2$ as a component of the reducing atmosphere is preferably present in a volume ratio of 0.1% or greater and, more preferably, in a volume ratio of 2% or greater. Reduction can progress with good efficiency when $H_2$ is present in a volume ratio of 0.1% or greater.

Next, the resulting particles may be further subjected to heat treatment as required at a temperature ranging from 550° C. or greater to 1,200° C. or less in an atmosphere of an inert gas in order to improve the crystallinity and to remove adsorbed reducing gas. The heat treatment in the atmosphere of an inert gas is preferably carried out at 550° C. or greater. Tungsten compound starting materials that are heat treated at 550° C. or greater exhibit sufficient electrical conductivity. Ar, $N_2$, or another inert gas may be used.

A tungsten oxide expressed by the general formula $W_yO_z$ that satisfies the range $2.2 \leq z/y \leq 2.999$ and has a Magneli phase can be obtained.

The heat treatment conditions for manufacturing composite tungsten oxide particles are as follows.

A powder is manufactured by mixing compounds or simple substances composed of the above-described tungsten compound starting material and the element M (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I); or a powder is obtained by mixing a solution or liquid dispersion of the tungsten compound starting material and a solution or liquid dispersion of the compound containing the element M and drying the solution. The mixture ratio of the element M and the tungsten oxide starting material is one in which the composition ratio of element M and tungsten in the composite tungsten oxide is a prescribed value that satisfies the range $0.001 \leq x/y \leq 1$ when the composite tungsten oxide has the formula $M_xW_yO_z$.

Here, the starting materials are preferably mixed in a solution in order to manufacture a tungsten compound starting material in which the components are uniformly mixed at the molecular level. A tungsten compound starting material that has an element M is preferably soluble in water, an organic solvent, or another solvent. Examples include M-containing tungstates, chlorides, nitrates, sulfates, oxalates, oxides, carbonates, and hydroxides, but no limitation is imposed thereby, and a tungsten compound capable of forming a solution is preferred. Since evaporating a solvent from a dissolved state is complicated from the commercial standpoint, the mixing and reaction may be carried out in a solid state. In this case, the material that is used is preferably a carbonate or a hydroxide of an element M and tungstic acid because the emission of toxic gases or the like from the starting material compounds is not preferred from the commercial standpoint.

The heat treatment conditions are the same as the heating conditions for manufacturing the tungsten oxide particles described above. The following heat treatment conditions can be proposed to manufacture a composite tungsten oxide having good crystallinity. However, the heat treatment conditions differ depending on the starting material and the type of desired compound, and are not limited by the following methods.

When manufacturing a composite tungsten oxide having good crystallinity, the heat treatment conditions are preferably high, and the reduction temperature differs depending on the starting material and the temperature of $H_2$ during reduction, but 600° C. to 850° C. is preferred. The heat treatment temperature maintained in the subsequent inert gas environment is preferably 700° C. to 1,200° C.

3. Visible Light Transmitting Particle-Dispersed Electrical Conductor

The electroconductive particles of the present embodiment can be provided with visible-light transmittance by controlling the composition, grain size, and shape of the electroconductive particles as described above, and a visible light transmitting particle-dispersed electrical conductor can be formed at low cost in comparison with the case in which ITO particles and noble metal particles are used by bringing together and causing contact between a plurality of electroconductive particles to form an electrical conductor.

A method for applying these electroconductive particles entails suitably dispersing the electroconductive particles in a medium by using any of the dispersing methods described below, and forming an electrical conductor on a desired base material. This method entails dispersing electroconductive particles baked at a high temperature in advance in a base material, or binding the particles to the base material surface using a binder, whereby application can be made to resins and other base materials that have a low heat-resistance temperature. An electrical conductor can be manufactured at low cost without the use of a vacuum apparatus or other bulky equipment.

The visible light transmitting particle-dispersed electrical conductor of the present embodiment can be formed into the shape of a film, and the electroconductive particles prebaked at a high temperature can be bonded and formed on the surface of a base material by using a binder. No limitation is imposed by this binder, but a transparent resin or a transparent dielectric is preferred.

(a) Method for Dispersing Electroconductive Particles in a Medium and Forming a Film on the Surface of a Base Material A visible light transmitting particle-dispersed electrical conductor film in which electroconductive particles are dispersed in a medium can be formed by suitably dispersing the electroconductive particles of the present embodiment in a medium, adding a resin medium as required, applying the resulting dispersion to the surface of a base material, and vaporizing the solvent to cure the resin by a prescribed method. The coating method is not particularly limited as long as the resin containing the electroconductive particles can be uniformly applied to the surface of a base material. Examples include bar coating, gravure coating, spray coating, and dip coating.

The medium may be selected from, e.g., a UV-curable resin, a thermosetting resin, an electron beam-curable resin, a room temperature-curable resin, a thermoplastic resin, or another resin in accordance with the purpose. Specific examples of the resin include polyethylene resin, polyvinyl chloride resin, polyvinylidene chloride resin, polyvinyl alcohol resin, polystyrene resin, polypropylene resin, ethylene-vinyl acetate copolymer, polyester resin, polyethylene terephthalate resin, fluorine resin, polycarbonate resin, acrylic resin, and polyvinyl butyral resin. A binder that uses a metal alkoxide may also be used as the medium. Typical examples of metal alkoxides include those of Si, Ti, Al, and Zr. Binders that use these metal alkoxides may be subjected to hydrolysis and then heated to form an oxide film.

A visible light transmitting particle-dispersed electrical conductor film in which electroconductive particles are dispersed on a base material surface can be formed by dispersing the electroconductive particles of the present embodiment in a suitable solvent, applying the resulting dispersion to the surface of a base material, and vaporizing the solvent. However, since the electrical conductor film by itself has poor strength, a solution containing a resin or the like is preferably applied to the electrical conductor film, and the solvent is vaporized to form a protective film. The coating method is not particularly limited as long as the resin containing the electroconductive particles can be uniformly applied to the surface of a base material. Examples include bar coating, gravure coating, spray coating, and dip coating.

The method for dispersing the electroconductive particles is not particularly limited, and ultrasonic irradiation, a bead mill, a sand mill, or the like can be used, for example. Additives may be added to obtain a uniform dispersed body, and the pH may be adjusted.

The shape of the base material is not limited, and the base material may be formed in the shape of a film or board as desired. PET, acryl, urethane, polycarbonate, polyethylene, ethylene-vinyl acetate copolymer, vinyl chloride, fluorine resin, or the like may be used as the transparent base material in accordance with the intended purpose. Apart from resins, glass may be used.

(b) Method for Dispersing Particles in a Base Material

Another method that may be used for applying the electroconductive particles of the present embodiment is to disperse the electroconductive particles in a base material. In order to disperse the electroconductive particles in a base material, the electroconductive particles may be allowed to permeate from the surface of the base material, or the temperature of the electroconductive particles may be increased above the melting temperature of the base material, and the particles may then be melted and mixed with resin. The resulting resin containing the electroconductive particles may be molded into a film or a board by a prescribed method and used as an electroconductive material.

An example of a method for dispersing the electroconductive particles in a PET resin entails mixing PET resin and a liquid dispersion of the electroconductive particles, vaporizing the dispersion solvent, thereafter heating the material to about 300° C., which is the melting point of PET resin, to melt and mix the PET resin, and then cooling the material to produce a PET resin in which the electroconductive particles are dispersed.

(4) Particle Shape

The electroconductive particles of the tungsten oxide and the electroconductive particles of the composite tungsten oxide may be formed into acicular crystals such as those shown in FIG. 4 by using a suitable heat treatment. Acicular crystals have the effect of improving the electrical conductivity of the visible light transmitting particle-dispersed electrical conductor film in comparison with very fine-grained particles. The reason for this is that the resistance of the film is degraded in comparison with a bulk configuration due to the contact resistance between the particles, but when acicular crystals are used in the visible light transmitting particle-dispersed electrical conductor film, each of the acicular crystals becomes a current-carrying path. Therefore the contact resistance is low in comparison with cases in which the very fine-grained particles are linked to each other, and electron transport can be carried out with good efficiency. Accordingly, electrical conductivity is improved.

The electroconductive particles of hexagonal tungsten bronze, which are electroconductive particles of a composite tungsten oxide, can be formed into the tabular crystals shown in FIG. 6. Tabular crystals are particularly easy to form when the element M is added in an amount that is greater than 0.33. The resulting tabular crystals readily improve electrical conductivity because the surface resistance per unit surface area can be reduced in comparison with dispersed nanoparticles.

However, the acicular and tabular crystals described above have about the same size, light is therefore easily scattered, and transparency may be reduced. When transparency is to be improved, the acicular and tabular crystals must be pulverized into very small shapes, and the particle shapes are preferably changed in accordance with the intended purpose. The pulverizing method may be an ordinary pulverizing method.

5. Optical Characteristics of the Visible Light Transmitting Particle-Dispersed Electrical Conductor The optical characteristics of the visible light transmitting particle-dispersed electrical conductor of the present embodiment were measured using a spectrophotometer (U-4000 manufactured by Hitachi Ltd.), and the visible-light transmittance was calculated (based on JIS R3106).

Figure 2:
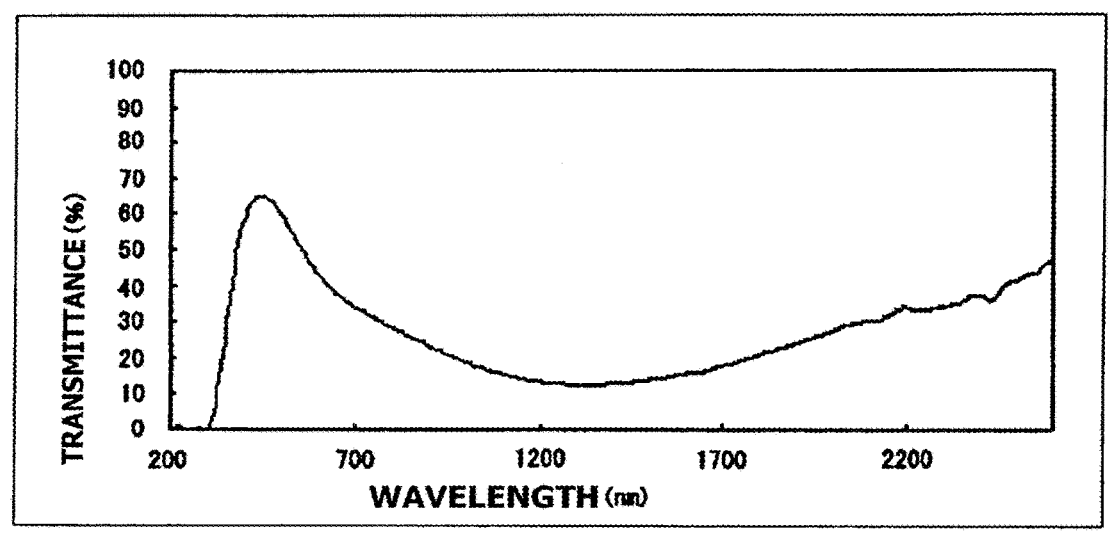
FIG. 2 is a graph showing a transmission profile of a visible light transmitting particle-dispersed electrical conductor formed from $W_{18}O_{49}$ electroconductive particles.

FIG. 2 shows, as an example of the transmittance measurement results, a transmission profile of a visible light transmitting particle-dispersed electrical conductor formed from $W_{18}O_{49}$ electroconductive particles. FIG. 2 is a graph in which the wavelength of the transmitted light is plotted along the horizontal axis, and the transmittance (%) of the light is plotted along the vertical axis. It is apparent from FIG. 2 that a visible light transmitting particle-dispersed electrical conductor formed from the $W_{18}O_{49}$ electroconductive particles transmits light having a wavelength of 380 nm to 780 nm, which is the visible light region (e.g., the transmittance of visible light having a wavelength of 500 nm is 60%).

Figure 3:
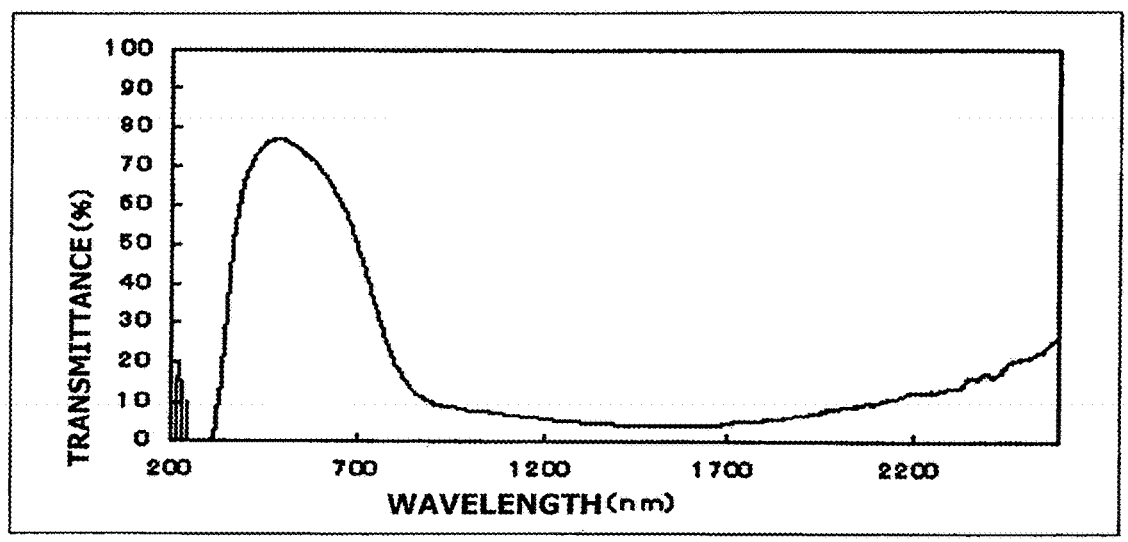
FIG. 3 is a graph showing a transmission profile of a visible light transmitting particle-dispersed electrical conductor formed from electroconductive particles composed of hexagonal composite tungsten oxide $Cs_{0.33}WO_3$.

FIG. 3 shows a transmission profile of $Cs_{0.33}WO_3$ as an example of a transmission profile of a visible light transmitting particle-dispersed electrical conductor formed from electroconductive particles composed of hexagonal composite tungsten oxide. FIG. 3 is a graph in which the wavelength of the transmitted light is plotted along the horizontal axis, and the transmittance (%) of the light is plotted along the vertical axis. It is apparent from FIG. 3 that a visible light transmitting particle-dispersed electrical conductor composed of $Cs_{0.33}WO_3$ transmits light having a wavelength of 380 nm to 780 nm, which is the visible light region, and transmittance in the visible light region is excellent.

The visible light transmitting particle-dispersed electrical conductor has industrial utility in that a visible light transmitting particle-dispersed electrical conductor can be formed at low cost by coating or the like without the use of sputtering, vapor deposition, or ion-plating, as well as chemical vapor deposition (CVD) or another dry method vacuum deposition method that uses a vacuum apparatus or other bulky equipment.

[2] Transparent Electroconductive Film and Method for Manufacturing the Same, Transparent Electroconductive Article, and Infrared-Shielding Article The best mode for carrying out the present invention is described below.

Generally, tungsten trioxide ($WO_3$) does not have effective conduction electrons and therefore has no electrical conductivity, although visible light is transmitted. The inventors discovered that by using the backbone structure of tungsten trioxide, a tungsten oxide in which conduction electrons are generated in the $WO_3$ by reducing the ratio of oxygen to tungsten to less than 3, or a composite tungsten oxide in which conduction electrons are generated by adding positive ions, can be provided with electrical conductivity by way of these conduction electrons while simultaneously transmitting visible light.

Elements A described above can be used as elements having the same properties as the above-described tungsten. Similar to tungsten oxide, oxides of these elements A have a so-called tungsten bronze structure composed of electropositive elements in the crystals. As a result, the inventors also discovered that even when some tungsten sites are substituted with an element A and are composited with tungsten oxide, or an electroconductive film is formed having the so-called tungsten bronze structure by using an element A in place of tungsten, the film can be provided with electrical conductivity by way of these conduction electrons while simultaneously transmitting visible light.

The inventors also discovered that the transparent electroconductive film can be obtained using a simple method in which a solution composed of a tungsten compound, which is a starting material of the subsequently described tungsten oxide and/or composite tungsten oxide, or a solution composed of an element A compound is used as the starting material solution, the starting material solution is applied to a base material, and the base material coated with the starting material solution is heat treated in an atmosphere of a reducing gas and/or inert gas to manufacture the transparent electroconductive film.

1-(A). Tungsten Oxide and Composite Tungsten Oxide

The transparent electroconductive film of the present embodiment includes a tungsten oxide expressed by the general formula WyOz (where W is tungsten, O is oxygen, and $2.2 \le z/y \le 2.999$), and/or a composite tungsten oxide expressed by the general formula MxWyOz (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \le x/y \le 1$, and $2.2 \le z/y \le 3.0$), wherein the maximum transmittance in the region of 400 nm or greater to 780 nm or less ranges from 10% or greater to less than 92%, and the surface resistance of the film is $1.0 \times 10^{10}$ Ω/square or less.

In the tungsten oxide expressed by the general formula WyOz (where W is tungsten, O is oxygen, and $2.2 \le z/y \le 2.999$), the tungsten/oxygen composition range is one in which the composition ratio of oxygen to tungsten is less than 3, and the range $2.2 \le z/y \le 2.999$ is preferred when the transparent electroconductive film have the formula WyOz. When the value of z/y is 2.2 or greater, formation of an unwanted $WO_2$ crystal phase in the film can be avoided and the material can be provided with chemical stability, and can therefore be used as an effective transparent electroconductive film. When the value of z/y is 2.999 or less, the required amount of free electrons can be generated to produce a transparent electroconductive film.

In the transparent electroconductive film of the present invention, the maximum transmittance measured in the wavelength region of 400 nm or greater to 780 nm or less ranges from 10% or greater to less than 92%. When the maximum transmittance is 10% or greater, the range of application in visible light-transmitting applications is broad. When the maximum transmittance is 92% or less, the technical aspects of manufacturing are facilitated. The optical measurements were carried out based on JIS R3106 (light source: A light) to calculate the visible-light transmittance.

The surface resistance of the transparent electroconductive film of the present invention is $1.0 \times 10^{10}$ Ω/square or less. When the surface resistance is as described above, the electroconductive film can be advantageously used in a broad range of applications. The surface resistance was measured using a surface resistance measuring device (Loresta MP MCP-T350) manufactured by Mitsubishi Chemical.

In the transparent electroconductive film of the present embodiment, the tungsten oxide preferably has a Magneli phase having a composition ratio expressed by the general formula WyOz (where W is tungsten, O is oxygen, and $2.45 \le z/y \le 2.999$).

Here, the electrical conduction mechanism of the transparent electroconductive film of the present invention is briefly described.

Tungsten trioxide has an octahedral structure composed of $WO_6$, and may be regarded as a single unit. W atoms are positioned in the octahedral structure, and oxygen is positioned at the apexes of the octahedral structure. In all octahedral structures, the apexes are shared with an adjacent octahedral structure. In this case, conduction electrons are not present in the structure. On the other hand, the Magneli phase expressed by $WO_{2.9}$ or another composition ratio is a structure in which the octahedral structure of $WO_6$ shares edges and apexes in an orderly fashion. $W_{18}O_{49}$ ($WO_{2.72}$) having the structure shown in FIG. 1(A) has an orderly structure in which the octahedral structure of $WO_6$ and the decahedral structure of $WO_{10}$ as a single unit share edges and apexes. Tungsten oxide having such a structure is believed to be provided with electrical conductivity via the contribution of electrons released by oxygen as conduction electrons.

The above-described structure of tungsten trioxide produces conduction electrons in a completely uniform, non-uniform, or amorphous structure, and electroconductive characteristics can be obtained.

Conduction electrons are generated in the $WO_3$ and electrical conductivity is obtained by adding an element M (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I) to the tungsten trioxide ($WO_3$). In other words, the ranges are preferably $0.001 \leq x/y \leq 1$, and $2.2 \leq z/y \leq 3.0$ in a composite tungsten oxide expressed by the general formula MxWyOz (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1$, and $2.2 \leq z/y \leq 3.0$).

When the above-noted ranges are satisfied, good electrical conductivity is obtained by the generation of conduction electrons. In the particular case that the ratio (z/y) of O to W is 2.2 or greater, application as a light-transmitting film can be facilitated without increasing light absorption in the visible light region, and such a situation is preferred.

The composite tungsten oxide expressed by the formula MxWyOz preferably has an amorphous structure, or a cubic, tetragonal, or hexagonal tungsten bronze structure.

The term "cubic structure" used in this specification is used as a representative of tungsten bronze structures classified as a cubic tungsten bronze structure type or a perovskite tungsten bronze structure type in the general classification of the tungsten bronze structure. The term "tetragonal structure" used in this specification is used as a representative of the tungsten bronze structures classified as a tetragonal tungsten bronze structure type in the general classification of the tungsten bronze structure. The term "hexagonal structure" used in this specification is used as a representative of the tungsten bronze structures classified as a hexagonal tungsten bronze structure type in the general classification of the tungsten bronze structure.

With this composite tungsten oxide, the element M is positioned in the gaps formed between shared apexes of an octahedral structure, as shown in FIGS. 1B to 1D. It is believed that conduction electrons are produced by the addition of the elements M. The structure of a composite tungsten oxide is typically cubic, tetragonal, or hexagonal, and these structures are shown in FIGS. 1B, 1C and 1D, respectively. These composite tungsten oxides have a structure-based upper limit to the amount of addition element, and the maximum addition amount of the element M per mole of W is as follows: 1 mol in the case of a cubic system, about 0.5 mol in the case of a tetragonal system (this varies depending on the addition amount, but 0.5 mol can be easily produced on a commercial scale), and 0.33 mol in the case of a hexagonal system. However, these structures are difficult to define in a simple manner, and the range of maximum addition amounts of the addition element M described above is an example that particularly shows a basic range, and this invention is not limited to this range. Several types of structures may be adopted in the crystal structure by compositing materials. The above-described structure is a representative structure, and no limitation is imposed by the structure.

In a composite tungsten oxide, the optical characteristics vary depending on the above-described structure. Hexagonal systems in particular tend to have a light absorption region based on conduction electrons in the near-infrared region having longer wavelengths, and absorption in the visible light region is also low. Next, tetragonal systems and cubic systems tend to absorb light having shorter wavelengths by means of conduction electrons, and absorption in the visible light region is also high. Accordingly, a composite tungsten oxide, which has a hexagonal structure, is preferred for the above-stated reasons as the transparent electroconductive film capable of transmitting more visible light. However, as long as the oxide has the basic configuration described above, electrical conductivity and infrared-shielding characteristics can be obtained even if the structure is an amorphous structure.

It is commonly known that a hexagonal system is formed when an element M having a large ion radius is added to a composite tungsten oxide. Specifically, when any of the elements Cs, K, Rb, Tl, Ba, In, Li, Ca, Sr, Fe, and Sn are added, a hexagonal system is readily formed, and such a situation is preferred. However, as long as the added element M is present in the gaps of the hexagonal structure, as shown in FIG. 1D, for example, a $WO_6$ unit can be formed using an element other than those noted above, and no limitation is imposed by these elements. Also, a composite tungsten oxide having these hexagonal structures may be a uniform crystal structure or an irregular crystal structure.

In this case, it is possible use both methods, i.e., to limit the above-described oxygen content and to add an element M for generating conduction electrons to the tungsten trioxide ($WO_3$). Also, when the transparent electroconductive film described above is used as an infrared-shielding film, a material that is suitable for the time and purpose, e.g., an element M, may be selected.

1-(B). Composite Oxide Nanoparticles that Include Element A

In addition to the tungsten oxide and composite tungsten oxide described in 1-(A), there is also a composite oxide expressed by the general formula $M_E A_G W_{(1-G)} O_J$ (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; A is one or more elements selected from Mo, Nb, Ta, Mn, V, Re, Pt, Pd, and Ti; W is tungsten; O is oxygen; $0 < E \leq 1.2$; $0 < G \leq 1$; and $2 \leq J \leq 3$). When G=1, however, the result is a composite oxide in which tungsten is not used and that is primarily composed of an element A.

Since effective free electrons are generally not present in $WO_3$ or in $MoO_3$, $Nb_2O_5$, $Ta_2O_5$, $V_2O_5$, $TiO_2$, and $MnO_2$, these compounds have no or minimal electrical conductivity, and have no or minimal absorption (reflection) of light in the near-infrared region by conduction electrons. However, when element M is added to these substances, and composite tungsten oxide nanoparticles expressed by the general formula $M_E A_G W_{(1-G)} O_J$ (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; A is one or more elements selected from Mo, Nb, Ta, Mn, V, Re, Pt, Pd, and Ti; W is tungsten; O is oxygen; $0<E\leq1.2$; $0<G\leq1$; and $2\leq J\leq3$) are used, the element M releases conduction electrons in the oxide structure of W or the element A, and the element M itself acts as a positive ion.

The released conduction electrons have the effect of absorbing (reflecting) light in the near-infrared region, and contribute to the electrical conductivity of the composite oxide nanoparticles. It is apparent that $PtO_X$, $PdO_X$, $ReO_3$, and the like exhibit electrical conductivity even without the addition of an element M, and adding the element M further increases the number of conduction electrons and improves conduction characteristics and absorption (reflection) in the near-infrared region.

The matrix structure obtained using an element A, tungsten, and oxygen may be constructed using oxygen and one element selected from tungsten and an element A, or may be constructed using oxygen and a plurality of elements. When an element M is added to the gaps of a structure composed of oxygen, tungsten, and the element A, conduction electrons are generated, and this approach is effective for conduction characteristics and near-infrared absorption.

In the formula $M_E A_G W_{(1-G)} O_J$, the range of E is preferably $0<E\leq1.2$. If $E>0$, conduction electrons are generated by the element M, and effective near-infrared absorption and conduction characteristics are demonstrated. If the value of E is 1.2 or less, the generation of impurities contained in the element M is avoided, degradation of the characteristics can be prevented, and such a situation is therefore preferred.

In the formula $M_E A_G W_{(1-G)} O_J$, the range of G is preferably $0<G\leq1$. Even when $G=0$, as long as an element M is present, conduction electrons are generated and effective near-infrared absorption and conduction characteristics are demonstrated. An element A other than tungsten is present in the composite oxide, whereby the optical characteristics of the composite oxide can be varied and conventionally unavailable features can otherwise be demonstrated. Therefore, G is preferably greater than 0. The preferred addition amount of the element A varies in accordance with the intended use, but 1 or less is preferred. When $G\leq1$, impurities contained in the element A are not generated due to the presence of excessive element A, and degradation of the composite oxide characteristics can therefore be prevented.

The case of $G<1$ is described first.

When the composite oxide nanoparticles of the composition $M_E A_G W_{(1-G)} O_J$ described above have a hexagonal crystal structure, the transmission characteristics of the composite oxide nanoparticles with respect to visible light are improved and the absorption characteristics of light in the near-infrared region are also improved. This will be described with reference to FIG. 1D, which is a schematic diagram of the hexagonal structure. In FIG. 1D, six octahedrons formed by W (or an element A) $O_6$ units are brought together and provided with hexagonal gaps. An element M is disposed in the gaps, constituting a single unit. A large number of these units are brought together to form a hexagonal crystal structure. This structure is referred to as a so-called tungsten bronze structure.

In order to achieve the effect of improving transmission characteristics in the visible light region and improving absorption characteristics in the near-infrared region, the composite oxide nanoparticles should at least contain some of the unit structures described in FIG. 1D (a structure in which six octahedrons formed by W (or an element A) $O_6$ units are brought together and provided with hexagonal gaps, and element M is disposed in the gaps), and the tungsten oxide composite nanoparticles may be either crystalline or amorphous.

Introducing positive ions of the element M into the hexagonal gaps is preferred because transmission characteristics of visible light are improved in comparison with other crystal structures, and absorption characteristics of light in the near-infrared region are also improved. From the standpoint of electroconductive applications, since the absorption of visible light by the composite oxide nanoparticles is low, visible-light transmittance is reduced only slightly even when a large amount of the nanoparticles is used, and this approach is effective for improving electrical conductivity in a visible-light-transmitting electroconductive material. Generally, when the element M having a large ion radius is added, a hexagonal crystal is formed. Specifically, when one or more elements selected from Cs, Rb, K, Tl, In, Ba, Li, Ca, Sr, Fe, and Sn are added, a hexagonal system is readily formed. As long as an element M is present in the hexagonal gaps formed by the W (or element A) $O_6$ units, another element may naturally be used and no limitation is imposed by the element.

When the composite tungsten oxide nanoparticles having a hexagonal structure have a uniform crystal structure in the tungsten bronze structure, the addition amount of the element M is preferably 0.2 or more and 0.5 or less, and more preferably about 0.33. It is believed that the element M is inserted into all of the hexagonal gaps in a tungsten bronze structure by setting the addition amount of the element M to be 0.33. In this case, the tungsten sites of the tungsten bronze structure are substituted with the element A, and the bronze structures of tungsten and element A may be present together or may be independent of each other.

In addition to the above-described hexagonal tungsten bronze structure, tetragonal and cubic tungsten bronze structures are also effective as infrared-shielding materials.

The absorption position of light in the near-infrared region tends to vary depending on the crystal structure. The absorption position of a cubic structure has a greater tendency to move toward the longer wavelengths than does a tetragonal structure, and a tetragonal structure has a greater tendency to do so than a hexagonal structure. Also, hexagonal structures have the lowest absorption characteristics for visible light, and tetragonal and cubic structures have increasingly greater absorption characteristics in the indicated order. Therefore, a hexagonal tungsten bronze structure is preferably used in applications in which more visible light is to be transmitted and more light in the near-infrared region is to be shielded. In this case, the tungsten sites of the tungsten bronze structure may be substituted using an element A, or a bronze structure of an element A may be also present. However, the tendencies of the optical characteristics described above will vary depending on the type and amount of added elements. The optimal solution may therefore be determined by experimentation, and the present invention is not limited thereby.

The case of $G=1$ is described next.

When $G=1$ in composite oxide nanoparticles having a composition expressed by the formula $M_E A_G W_{(1-G)} O_J$ described above, the composition becomes $M_E A O_J$ and does not contain tungsten. However, electrons are generated when an element M is added even in a material that does not include tungsten. Conduction characteristics can be provided by the generation of conduction electrons via the same mechanism as the case of $M_E A_G W_{(1-G)} O_J$ (where $G<1$) described above, and light in the near-infrared region is shielded. Therefore, the composition can be handled in the same manner as in the case in which tungsten is included in the composition (when G<1).

2-(A). Method for Manufacturing Transparent Electroconductive Film that Uses Tungsten Oxide, and Method for Manufacturing Transparent Electroconductive Film that Uses Composite Tungsten Oxide A transparent electroconductive film composed of a tungsten oxide expressed by the general formula WyOz (where W is tungsten, O is oxygen, and $2.2 \leq z/y \leq 2.999$), and/or a composite tungsten oxide expressed by the general formula MxWyOz (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1$, and $2.2 \leq z/y \leq 3.0$) can be obtained by using, as a starting tungsten material solution, a solution that contains a tungsten compound, which is a starting material of the tungsten oxide and/or the composite tungsten oxide; applying the tungsten compound starting material solution; and thereafter heat treating the base material coated with the tungsten compound starting material solution, in an atmosphere of an inert gas and/or reducing gas.

A preferable approach is to add a surfactant to the starting material solution and then apply the solution to a base material to uniformly form a thin film on a base material. Nonionic, anionic, cationic, amphoteric, or other surfactants may be used. In the particular case that an aqueous solution such as that of ammonium metatungstate is used, the surface tension of the water is considerable. Therefore, a surfactant must be added to reduce the surface tension so that the solution can be uniformly applied to a base material.

One or more solutions selected from aqueous solutions of ammonium tungstate and solutions obtained by dissolving tungsten hexachloride in an alcohol are preferably used as the tungsten compound starting material solution. If the starting material is a tungsten starting material, the material is easily dissolved in water or alcohol, and coating on a base material can be easily performed using an inexpensive coating method.

Preferably used as the tungsten compound starting material solution of the transparent electroconductive film is a mixed solution composed of a tungsten compound starting material solution (one or more solutions selected from aqueous solutions of ammonium tungstate and solutions obtained by dissolving tungsten hexachloride in an alcohol, or a solution obtained by adding a surfactant to this starting material) as a composite tungsten oxide starting material solution and an element M (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I).

Examples of the starting material of the addition element M include M-containing tungstates, chlorides, nitrates, sulfates, oxalates, oxides, carbonates, and hydroxides, but no limitation is imposed thereby as long as the material can form a solution.

The transparent electroconductive film of the present embodiment may be obtained by applying a tungsten compound starting material solution to a base material, and then heat treating the material in an atmosphere of an inert gas atmosphere and/or reducing gas. In this manner, when a tungsten compound starting material solution is applied to a base material, and the material is then heat treated in an atmosphere of an inert gas atmosphere and/or reducing gas, the heat treatment is preferably carried out in an atmosphere of a reducing gas at a temperature ranging from 100° C. or greater to 800° C. or less, and then carried out as required in an atmosphere of an inert gas at a temperature ranging from 550° C. or greater to 1,200° C. or less. The reducing gas is not particularly limited in this case, but $H_2$ is preferred. When $H_2$ is used as the reducing gas, $H_2$ as a component of the reducing atmosphere is preferably present in a volume ratio of 0.1% or greater and, and more preferably in a volume ratio of 2% or greater. Reduction can progress with good efficiency when $H_2$ is present in a volume ratio of 0.1% or greater. $N_2$ or argon gas is used as the inert gas.

The transparent electroconductive film of the present embodiment may be formed by vapor deposition or sputtering, and any manufacturing method may be used as long as the resulting film is a tungsten oxide or a composite tungsten oxide. When the transparent electroconductive film of the present embodiment is obtained by sputtering or vapor deposition, starting materials that are suitable for each method may be used. For example, vapor deposition pellets and a target suited for the desired transparent electroconductive film composition may be used.

2-(B). Method for manufacturing transparent electroconductive film that uses composite tungsten oxide nanoparticles that contain an element A The composite oxide expressed by the general formula $M_E A_G W_{(1-G)} O_J$ may be obtained by heat treating the starting material in an atmosphere of an inert gas and/or reducing gas.

The starting material of element A and tungsten is not particularly limited as long as tungsten or element A is included. Examples that may be used include one or more compounds selected from oxides, hydrated oxides, chlorides, ammonium salts, carbonates, nitrates, sulfates, oxalates, hydroxides, peroxides, and simple metals. Organic compounds or compounds containing two or more types of metal elements (e.g., sodium tungstate) may also be used. An advantageous commercial manufacturing method is one in which water or a solvent are mixed using various types of salts.

In the composite oxide nanoparticles expressed by the general formula $M_E A_G W_{(1-G)} O_J$, the starting material of the element M may include the element M, and the starting material of the element A may include the element A. No particular limitations are imposed. Preferred examples include one or more compounds selected from chlorides, ammonium salts, carbonates, nitrates, sulfates, oxalates, hydroxides, and peroxides. Also, organic complexes, or compounds containing two or more types of metal elements (e.g., sodium tungstate) may be used. An advantageous commercial manufacturing method is one in which impurities are not produced during heat reduction when carbonates, hydrates, or the like are used.

The starting materials of the tungsten W, element A, and element M that can form a solution (chlorides, nitrates, and the like) are preferably formed into a solution and mixed to obtain a starting material, whereby sufficient mixing can be achieved.

Here, the heat treatment condition maintained after the starting material of the element M, as well as tungsten and the starting material of the element A, have been mixed is preferably 250° C. or greater. A film obtained by heat treatment at 250° C. or greater has sufficient electrical conductivity and near-infrared absorbency.

Ar, $N_2$, or another inert gas may be used as the heat treatment atmosphere. Ammonia or hydrogen gas may be used as the reducing gas.

When hydrogen gas is used, hydrogen gas as a component of the reducing atmosphere is preferably present in a volume ratio of 0.1% or greater and, and more preferably in a volume ratio of 1% or greater. Reduction can progress with good efficiency when hydrogen gas is present in a volume ratio of 0.1% or greater.

3. Transparent Electroconductive Article and Infrared-Shielding Article

The transparent electroconductive film of the present embodiment is formed on a base material to obtain a transparent electroconductive article. The base material of the transparent electroconductive film is not particularly limited, but transparent glass and transparent resin film are common base materials.

The thickness of the transparent electroconductive film of the present embodiment can be varied in accordance with the intended use, but from 1 nm or greater to 5,000 nm or less is preferred. If the film thickness is 1 nm or greater, effective conduction characteristics can be achieved. If the film thickness is 5,000 nm or less, the transmittance of visible light is not reduced, and such a situation is preferred.

The transparent electroconductive film of the present embodiment exhibits absorbency and reflectivity from the near-infrared to infrared regions by conductive electrons. The film therefore has infrared- and near-infrared-shielding functions, and is advantageous as a visible-light-transmitting infrared-shielding article.

[3] Infrared-Shielding Nanoparticle Dispersion, Infrared-Shielding Body, Method for Manufacturing Infrared-Shielding Nanoparticles, and Infrared-Shielding Nanoparticles The infrared-shielding nanoparticle dispersion of the present embodiment is an infrared-shielding nanoparticle dispersion obtained by dispersing infrared-shielding nanoparticles in a medium, and the infrared-shielding nanoparticles include composite oxide nanoparticles expressed by the general formula $M_E A_G W_{(1-G)} O_J$ (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; A is one or more elements selected from Mo, Nb, Ta, Mn, V, Re, Pt, Pd, and Ti; W is tungsten; O is oxygen; $0<E \leq 1.2$; $0<G \leq 1$; and $2 \leq J \leq 3$). As described above, the infrared-shielding nanoparticles of the present embodiment do not contain tungsten when G=1, resulting in composite oxide nanoparticles that are primarily composed of the element A.

1. Composite Oxide Nanoparticles

Since effective free electrons are generally not present in $WO_3$ or in $MoO_3$, $Nb_2O_5$, $Ta_2O_5$, $V_2O_5$, $TiO_2$, and $MnO_2$, these compounds have no or minimal electrical conductivity, and have no or minimal absorption (reflection) in the near-infrared region due to conduction electrons. However, when an element M is added to these substances, and composite tungsten oxide nanoparticles expressed by the general formula $M_E A_G W_{(1-G)} O_J$ (where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; A is one or more elements selected from Mo, Nb, Ta, Mn, V, Re, Pt, Pd, and Ti; W is tungsten; O is oxygen; $0<E \leq 1.2$; $0<G \leq 1$; and $2 \leq J \leq 3$) are used, the element M releases conduction electrons in the oxide structure of W or the element A, and the element M itself acts as a positive ion.

The released conduction electrons have the effect of absorbing (reflecting) light in the near-infrared region, and contribute to the electrical conductivity of the composite oxide nanoparticles. It is apparent that $PtO_X$, $PdO_X$, $ReO_3$, and the like exhibit electrical conductivity even without the addition of an element M, and adding an element M further increases the number of conduction electrons and improves conduction characteristics and absorption (reflection) in the near-infrared region.

The matrix structure obtained using an element A, tungsten, and oxygen may be constructed using oxygen and one element selected from tungsten and an element A, or may be constructed using oxygen and a plurality of elements. When an element M is added to the gaps of a structure composed of oxygen, tungsten, and the element A, conduction electrons are generated, and this approach is effective for conduction characteristics and near-infrared absorption.

In the formula $M_E A_G W_{(1-G)} O_J$, the range of E is preferably $0<E \leq 1.2$. If E>0, conduction electrons are generated by the element M, and effective near-infrared absorption and conduction characteristics are demonstrated. If the value of E is 1.2 or less, the generation of impurities contained in the element M is avoided, degradation of the characteristics can be prevented, and such a situation is therefore preferred.

In the formula $M_E A_G W_{(1-G)} O_J$, the range of G is preferably $0<G \leq 1$. Even when G=0, as long as an element M is present, conduction electrons are generated and effective near-infrared absorption and conduction characteristics are demonstrated. An element A other than tungsten is present in the composite oxide, whereby the optical characteristics of the composite oxide can be varied and conventionally unavailable features can otherwise be demonstrated. Therefore, G is preferably greater than 0 depending on the intended use. The preferred addition amount of the element A varies in accordance with the intended use, but 1 or less is preferred. When $G \leq 1$, impurities contained in the element A are not generated due to the presence of excessive element A, and degradation of the composite oxide characteristics can therefore be prevented.

The case of G<1 is described first.

Figure 10:
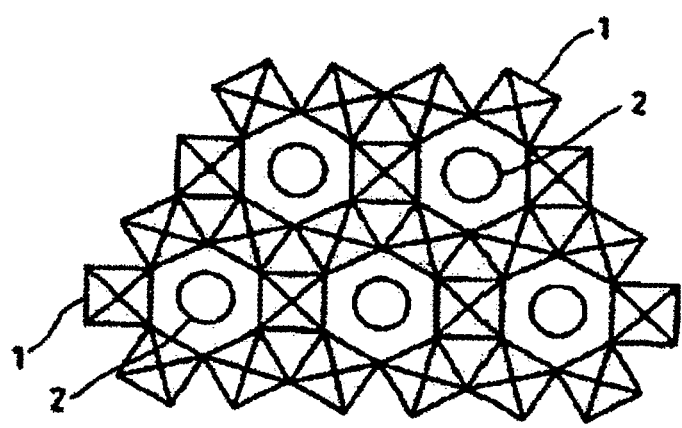
FIG. 10 is a schematic view showing the crystal structure of composite tungsten oxide nanoparticles having hexagonal crystals that contain the infrared-shielding nanoparticles of the present invention.

When the composite oxide nanoparticles of the composition $M_E A_G W_{(1-G)} O_J$ described above have a hexagonal crystal structure, the transmission characteristics of the composite oxide nanoparticles with respect to visible light are improved and the absorption characteristics of light in the near-infrared region are also improved. This will be described with reference to FIG. 10, which is a schematic diagram of the hexagonal structure. In FIG. 10, six octahedrons formed by W (or an element A) $O_6$ units are brought together and provided with hexagonal gaps, wherein W is indicated by the reference numeral 1. An element M, indicated by the reference numeral 2, is disposed in the gaps, constituting a single unit. A large number of these units are brought together to form a hexagonal crystal structure. This structure is referred to as a so-called hexagonal tungsten bronze structure.

In order to achieve the effect of improving transmission characteristics in the visible light region and improving absorption characteristics in the near-infrared region, the composite oxide nanoparticles should at least contain some of the unit structures described in FIG. 10 (a structure in which six octahedrons formed by W (or an element A) $O_6$ units are brought together and provided with hexagonal gaps, and element M is disposed in the gaps), and the composite oxide nanoparticles may be either crystalline or amorphous.

Introducing positive ions of the element M into the hexagonal gaps is preferred because transmission characteristics of visible light are improved in comparison with other crystal structures, and absorption characteristics of light in the near-infrared region are also improved. From the standpoint of electroconductive applications, since the absorption of visible light by the composite oxide nanoparticles is low, visible-light transmittance is reduced only slightly even when a large amount of the nanoparticles is used, and this approach is effective for improving electrical conductivity in a visible-light-transmitting electroconductive material. Generally, when the element M having a large ion radius is added, a hexagonal crystal is formed. Specifically, when one or more elements selected from Cs, Rb, K, Tl, In, Ba, Li, Ca, Sr, Fe, and Sn are added, a hexagonal system is readily formed. As long as an element M is present in the hexagonal gaps formed by the W (or element A) $O_6$ units, another element may naturally be used and no limitation is imposed by the element.

When the composite tungsten oxide nanoparticles having a hexagonal crystal structure have a uniform crystal structure in the tungsten bronze structure, the addition amount of the element M is preferably 0.2 or more and 0.5 or less, and more preferably about 0.33. It is believed that the element M is inserted into all of the hexagonal gaps in a tungsten bronze structure by setting the addition amount of the element M to be 0.33. In this case, the tungsten sites of the tungsten bronze structure are substituted with the element A, and the bronze structures of tungsten and element A may be present together or may be independent of each other.

In addition to the above-described hexagonal tungsten bronze structure, tetragonal and cubic tungsten bronze structures are also effective as infrared-shielding materials. The absorption position of light in the near-infrared region tends to vary depending on the crystal structure. The absorption position of a cubic structure has a greater tendency to move toward the longer wavelengths than does a tetragonal structure, and a tetragonal structure has a greater tendency to do so than a hexagonal structure. Also, hexagonal structures have the lowest absorption characteristics for visible light, and tetragonal and cubic structures have increasingly greater absorption characteristics in the indicated order. Therefore, a hexagonal tungsten bronze structure is preferably used in applications in which more visible light is to be transmitted and more light in the near-infrared region is to be shielded. In this case, the tungsten sites of the tungsten bronze structure may be substituted using an element A, or a bronze structure of an element A may be also present. However, the tendencies of the optical characteristics described above will vary depending on the type and amount of added elements. The optimal solution may therefore be determined by experimentation, and the present invention is not limited thereby.

The case of G=1 is described next.

When G=1 in composite oxide nanoparticles having a composition expressed by the formula $M_E A_G W_{(1-G)} O_J$ described above, the composition becomes $M_E A O_J$ and does not contain tungsten. However, electrons are generated when an element M is added even in a material that does not include tungsten. Absorption in the near-infrared region occurs via the same mechanism as in the case of $M_E A_G W_{(1-G)} O_J$ (where G<1) described above. Therefore, the composition can be handled in the same manner as in the case in which tungsten is included in the composition (when G<1).

The infrared-shielding nanoparticles that include composite oxide nanoparticles of the present embodiment absorb a considerable amount of light in the near-infrared region, and particularly in the vicinity of the wavelength 1,000 nm. Therefore, the transmission color tone is often between a blue color and a green color. The diameter of the infrared-shielding nanoparticles can be selected based on the intended use. First, when the particles are to be used in applications in which high transparency is to be retained, the particle diameter is preferably 800 nm or less. This is due to the fact that particles having a diameter of less than 800 nm do not perfectly shield light by scattering the light, visibility is retained in the visible light region, and transparency can be simultaneously retained with good efficiency. In the particular case that importance is placed on transparency in the visible light region, the scattering produced by the particles is preferably given further consideration.

When importance is placed on reducing scattering produced by the particles, the particle diameter of is 200 nm or less, and more preferably 100 nm or less. The reason for this is that if the diameter of the composite oxide nanoparticles is small, the scattering of light in the visible light wavelength region of 400 nm to 780 nm is reduced due to geometrical scattering or Mie scattering. Therefore, it is possible to avoid a situation in which the infrared-shielding nanoparticle dispersion becomes similar to clouded glass and clear transparency cannot be obtained. In other words, when the particle diameter of the composite oxide nanoparticles is 200 nm or less, the geometrical scattering or Mie scattering is reduced and a Rayleigh scattering region is formed. This is due to the fact that the scattered light is reduced in an inverse proportion to the particle diameter by a factor of 6 in this Rayleigh scattering region, and the scattering is reduced as the particles are made smaller and the transparency is enhanced. When the particle diameter is 100 nm or less, the amount of scattered light is very low, and such a situation is even more preferred. From the standpoint of avoiding the scattering of light, the particle diameter is preferably small. Also, if the particle diameter is 1 nm or greater, the particles are easy to manufacture on a commercial scale.

To improve the weather resistance of the infrared-shielding nanoparticles, the surfaces of the composite oxide nanoparticles constituting the infrared-shielding nanoparticles of the present embodiment are preferably covered by an oxide having one or more elements selected from Si, Ti, Zr, and Al. However, when the nanoparticles are to be used in electroconductive applications, resistance is increased due to higher contact resistance between the particles when the surface of the particles is covered by the oxide. Therefore, the nanoparticles are preferably not used in cases in which lower resistance is desired.

2. Method for Manufacturing Infrared-Shielding Nanoparticles

The composite oxide nanoparticles expressed by the general formula $M_E A_G W_{(1-G)} O_J$ may be obtained by heat treating the starting material in an atmosphere of an inert gas and/or reducing gas.

The starting material of the element A and tungsten is not particularly limited as long as tungsten or element A is included. Examples that may be used include one or more compounds selected from oxides, hydrated oxides, chlorides, ammonium salts, carbonates, nitrates, sulfates, oxalates, hydroxides, peroxides, and simple metals. Organic compounds or compounds containing two or more types of metal elements (e.g., sodium tungstate) may also be used. An advantageous commercial manufacturing method is one in which impurities that are difficult to remove during heat reduction are not produced when oxides, carbonates, hydrates, or the like are used.

In the composite oxide nanoparticles expressed by the general formula $M_E A_G W_{(1-G)} O_J$, the starting material of the element M may include the element M, and the starting material of the element A may include the element A. No particular limitations are imposed. However, preferred examples include one or more compounds selected from oxides, hydrates of oxides, chlorides, ammonium salts, carbonates, nitrates, sulfates, oxalates, hydroxides, peroxides, and simple metals. Also, organic complexes, or compounds containing two or more types of metal elements (e.g., sodium tungstate) may be used. An advantageous commercial manufacturing method is one in which impurities are not produced during heat reduction when oxides, carbonates, hydrates, or the like are used.

The starting materials of the tungsten W, element A, and element M that can form a solution (chlorides, nitrates, and the like) are preferably formed into a solution, mixed, and dried into a powder to obtain a starting material of composite oxide nanoparticles, whereby sufficient mixing can be achieved.

It is apparent that even if the starting material cannot be formed into a solution, the powder may be directly mixed to obtain a starting material of the composite oxide nanoparticles.

Here, the heat treatment condition maintained after the starting material of the element M, as well as tungsten and the starting material of the element A, have been mixed is preferably 250° C. or greater. Infrared-shielding material film nanoparticles obtained by heat treatment at 250° C. or greater have sufficient electrical conductivity and near-infrared absorbency.

Ar, $N_2$, or another inert gas may be used as the heat treatment atmosphere. Ammonia or hydrogen gas may be used as the reducing gas.

When hydrogen gas is used, hydrogen gas as a component of the reducing atmosphere is preferably present in a volume ratio of 0.1% or greater and, and more preferably in a volume ratio of 1% or greater. Reduction can progress with good efficiency when hydrogen gas is present in a volume ratio of 0.1% or greater.

From the standpoint of improving the weather resistance, the surface of the composite oxide nanoparticles obtained in the above-described step is preferably covered by an oxide having one or more metals selected from Si, Ti, Zr, and Al.

The covering method is not particularly limited, but it is possible to cover the surfaces of the infrared-shielding nanoparticles by adding an alkoxide of the above-noted metals to the solution in which the infrared-shielding nanoparticles have been dispersed.

3. Infrared-Shielding Nanoparticle Dispersion and Infrared-Shielding Body

A method for using the infrared-shielding nanoparticles of the present embodiment entails dispersing infrared-shielding nanoparticles in a suitable medium to obtain an infrared-shielding nanoparticle dispersion, and forming a film on the surface of a desired base material. It is possible to pre-bake the infrared-shielding nanoparticles at a high temperature, and knead the resulting infrared-shielding nanoparticles into a base material or bind the particles to the base material surface using a medium. Application can therefore be made to resins and other base materials that have a low heat-resistance temperature. For this reason, such a body can be manufactured at low cost without the use of bulky equipment when the film is formed on a base material.

Also, since the composite oxide nanoparticles that include the infrared-shielding nanoparticles of the present embodiment are composed of an electroconductive material, application can be made to optical and electroconductive uses when the material is used as a continuous film (dispersed body).

(A) Method for Dispersing Infrared-Shielding Nanoparticles in a Medium and Forming a Film on Base Material Surfaces A thin film in which the infrared-shielding nanoparticles are dispersed can be formed by dispersing the infrared-shielding nanoparticles of the present embodiment in an appropriate solvent, adding a resin medium, applying the resulting dispersion to the surface of a base material, and vaporizing the solvent to cure the resin by a prescribed method. The coating method is not particularly limited as long as the resin containing the infrared-shielding nanoparticles can be uniformly applied to the surface of a base material. Examples include bar coating, gravure coating, spray coating, and dip coating. Films in which the infrared-shielding nanoparticles are directly dispersed in a resin medium are environmentally and commercially preferred because the solvent does not have to be vaporized after the film has been applied to the surface of a base material.

Resin or glass may be used as the above-described medium.

The medium may be selected from, e.g., a UV-curable resin, a thermosetting resin, an electron beam-curable resin, a room temperature-curable resin, a thermoplastic resin, or another resin in accordance with the purpose. Specific examples of the resin include polyethylene resin, polyvinyl chloride resin, polyvinylidene chloride resin, polyvinyl alcohol resin, polystyrene resin, polypropylene resin, ethylene-vinyl acetate copolymer, polyester resin, polyethylene terephthalate resin, fluorine resin, polycarbonate resin, acrylic resin, and polyvinyl butyral resin. A medium that uses a metal alkoxide may also be used as the medium. Typical examples of metal alkoxides include those of Si, Ti, Al, and Zr. Media that use these metal alkoxides may be subjected to hydrolysis and then heated to form an oxide film.

The shape of the base material is not limited, and the base material may be formed in the shape of a film or board as desired. PET, acryl, urethane, polycarbonate, polyethylene, ethylene-vinyl acetate copolymer, vinyl chloride, fluorine resin, or the like may be used in accordance with the intended purpose. Apart from resins, glass may be used.

(b) Method for Dispersing Infrared-Shielding Nanoparticles in a Base Material

The infrared-shielding nanoparticles of the present embodiment may be dispersed in a based material. In order to disperse the infrared-shielding nanoparticles in a base material, the infrared-shielding material particles may be allowed to permeate from the surface of the base material, or the temperature of the particles may be increased above the melting temperature of the base material, and the particles may then be melted and mixed with resin. The resulting resin containing the infrared-shielding nanoparticles may be molded into a film or a board by a prescribed method and used as an infrared-shielding nanoparticle-molded body.

An example of a method for dispersing the infrared-shielding nanoparticles in a PET resin entails mixing PET resin and a liquid dispersion of the infrared-shielding nanoparticles, vaporizing the dispersion solvent, thereafter heating the PET resin to about 300° C., which is the melting point of PET resin, to melt and mix the PET resin, and then cooling the material to produce a PET resin in which the infrared-shielding nanoparticles are dispersed.

The method for dispersing the infrared-shielding nanoparticles is not particularly limited, and ultrasonic irradiation, a bead mill, a sand mill, or the like can be used, for example. Additives may be added to obtain a uniform dispersed body, and the pH may be adjusted.

(c) Infrared-Shielding Body

The infrared-shielding nanoparticles of the present embodiment may be formed into an infrared-shielding nanoparticle dispersion by applying the nanoparticles to a base material as described above and kneading the nanoparticles into the base material, or by using another method.

An infrared-shielding body can be obtained by forming the infrared-shielding nanoparticle dispersion into the form of a plate, film, or thin film.

The infrared-shielding nanoparticle dispersion contains electroconductive composite oxide nanoparticles, and when the dispersion is applied to a base material using the same method as that described above and kneaded into the base material, the electrical conductivity of the infrared-shielding nanoparticle dispersion spreads two-dimensionally or three-dimensionally via the contact of the composite oxide nanoparticles. As a result, the infrared-shielding nanoparticle dispersion is provided with electrical conductivity. A visible light-transmitting, electroconductive, infrared-shielding body can be obtained by forming the infrared-shielding nanoparticle dispersion into the form of a plate, film or thin film.

4. Optical and Electroconductive Characteristics of the Infrared-Shielding Nanoparticle Dispersion and Infrared-Shielding Body.

Since the infrared-shielding nanoparticles of the present invention have the above-described infrared-shielding ability, the infrared-shielding nanoparticle dispersion can be formed into a plate, film, or thin film to produce an infrared-shielding body. It is possible to obtain an infrared-shielding body that has an infrared-shielding function in which the V value is 10% or greater when the maximum transmittance of all light rays in the wavelength region of 400 nm to 700 nm is set to the V value, and the minimum transmittance of all light rays in the wavelength region of 700 nm to 2,600 nm is equal to or less than the value V, and is 65% or less.

The infrared-shielding function is described in further detail below using as an example the infrared-shielding nanoparticle ($Rb_{0.33}MoO_3$) dispersion film of example 24 described below.

Figure 11:
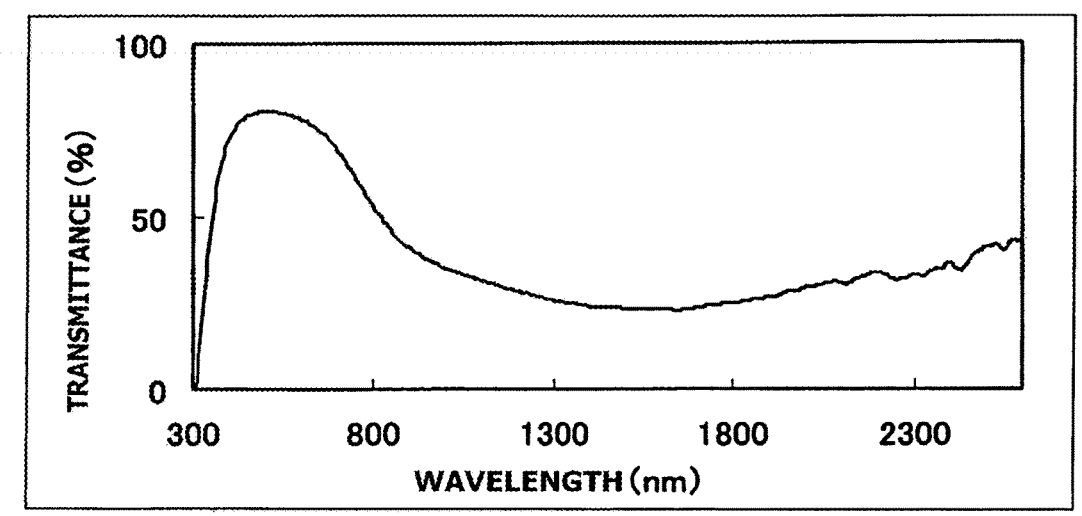
FIG. 11 is a transmission profile of light in a dispersion film composed of the infrared-shielding nanoparticles ($Rb_{0.33}MoO_3$) of Example 24.

FIG. 11 is a transmission profile of light in an infrared-shielding film, which is the infrared-shielding nanoparticle ($Rb_{0.33}MoO_3$) dispersion of example 24. It was determined that the value V, which is the maximum transmittance of light in the wavelength region of 400 nm and 700 nm, is 80.25% and that visible light is adequately transmitted, as shown in FIG. 11. It was also determined that the minimum transmittance of all light rays in the wavelength region of 700 nm to 2,600 nm is 22.65%, which is the V value or less, and that light in the near-infrared region is adequately shielded.

The infrared-shielding nanoparticle dispersion contains electroconductive composite oxide nanoparticles, and when the dispersion is applied to a base material using the same method as that described above and kneaded into the base material, the electrical conductivity of the infrared-shielding nanoparticle dispersion spreads two-dimensionally or three-dimensionally via the contact of the composite oxide nanoparticles. As a result, the infrared-shielding nanoparticle dispersion is provided with electrical conductivity. A visible light-transmitting, electroconductive infrared-shielding body can be obtained by forming the infrared-shielding nanoparticle dispersion into a plate, film, or thin film. It is possible to obtain a visible light-transmitting, electroconductive, infrared-shielding body in which the maximum transmittance of all light rays in the wavelength region of 400 nm to 700 nm is set to the V value or greater (defined as the V value), and the surface resistance is $1 \times 10^{10}$ Ω/square.

When transparency is required, the particle diameter must be 800 nm or less, as described above. The contact resistance per unit of volume increases when the particle diameter is made very small, and this situation is not preferred for reducing resistance. Also, the shape of the particles may be granular, tabular, or acicular (fibrous). In order to improve electrical conductivity, tabular or acicular shapes that can reduce the contact resistance are preferred.

EXAMPLES

The present invention is described in greater detail below using examples, but the present invention is not limited by the examples.

Examples 1 to 13, and Comparative Example 1 are principally related the above-described [1] visible light transmitting particle-dispersed electrical conductor, electroconductive particles, visible-light-transmitting electroconductive article, and method for manufacturing the same. The optical characteristics of the visible light transmitting particle-dispersed electrical conductor were measured using a spectrophotometer (U-400 manufactured by Hitachi Ltd.), and visible-light transmittance (based on JIS R3106) was calculated. The haze value was measured based on JIS K 7105 using a measuring apparatus HR-200 manufactured by Murakami Color Research Laboratory. The average dispersion particle diameter was measured using a measuring apparatus (ELS-800 (Otsuka Denki, K.K.)) that uses dynamic light scattering. The average of three measurements was used as the mean dispersion particle diameter. The evaluation of the conduction characteristics was performed by measuring the surface resistance of the fabricated films. The surface resistance of the films was measured using Hiresta IP MCP-HT260 manufactured by Mitsubishi Petrochemical Co.

The pressed powder resistance was carried out using the van der Pauw method (see Jikken Kagaku Koza 9: Electricity and Magnetism, Fourth edition, Jun. 5, 1991, Ed.: The Chemical Society of Japan, Publisher: Maruzen.) The samples were pressed pellets shaped as discoids having a diameter of 10 mm, and four terminal electrodes were disposed at 900 intervals on the disk surface. A current was allowed to flow between two adjacent terminals while applying 9.8 MPa of pressure, the voltage at the other two terminals was measured, and the resistance was calculated.

Example 1

Tungsten hexachloride was dissolved in ethanol, and the solution was dried at 130° C. to obtain a hydrate of tungsten oxide. This starting material was heated at 550° C. for one hour in a reducing atmosphere (volume ratio: argon/hydrogen=95/5), cooled to room temperature, and then heated at 800° C. for one hour in an argon atmosphere, thus producing the target tungsten oxide powder.

As a result of determining the crystal phase via X-ray diffraction, the resulting powder was determined to be a so-called Magneli phase $W_{18}O_{49}$ ($WO_{2.72}$). FIGS. 4A and 4B show the result of viewing the shape of the powder via SEM. In this case, FIG. 4A is an SEM image of $W_{18}O_{49}$ at a magnification of 10,000, and FIG. 4B is an SEM image at a magnification of 3,000.

At this time, acicular crystals were observed, as shown in FIGS. 4A and 4B. Also, the pressed powder resistance of the particles measured under a pressure of 9.8 MPa was 0.085 Ω·cm, and good electrical conductivity was confirmed.

Next, 20 parts by weight of the powder of the $WO_{2.72}$ electroconductive particles, 79 parts by weight of toluene, and 1 part by weight of a dispersing agent were mixed and irradiated with ultrasonic waves in order to disperse acicular crystals while allowing the crystals to retain their shape. A liquid dispersion was thus obtained. Next, 10 parts by weight of this liquid dispersion, and 0.1 parts by weight of a UV-curing resin as a hard coat were mixed. This solution was applied to glass using a bar coater to form a film. This film was dried for 30 seconds at 60° C., the solvent was allowed to evaporate, and the film was then cured using a high pressure mercury lamp to obtain a visible light transmitting particle-dispersed electrical conductor film (hereinafter simply abbreviated as "electrical conductor film").

The following results were obtained when the optical characteristics of the electrical conductor film were measured. The visible-light transmittance was 63%, and light in the visible region was adequately transmitted. The haze value was 3.5%, transparency was high, the transmitted color tone was a beautiful blue color, and the surface resistance was $7.6 \times 10^8$ Ω/square.

Example 2

An aqueous solution of ammonium metatungstate was dried at 130° C. to obtain a compound composed of tungsten oxide in the form of a powder. This starting material was heated at 550° C. for one hour in a reducing atmosphere (volume ratio: argon/hydrogen=97/3), cooled to room temperature, and then heated at 800° C. for one hour in an argon atmosphere to prepare tungsten oxide powder. As a result of determining the crystal phase via X-ray diffraction, a crystal phase $W_{18}O_{49}$ ($WO_{2.72}$) was observed. In this manner, the same electroconductive particles as in Example 1 were successfully fabricated even when ammonium metatungstate was used as the tungsten compound starting material. The pressed powder resistance of the powder electroconductive particles measured under a pressure of 9.8 MPa was 0.089 Ω·cm, and good electrical conductivity was confirmed.

Example 3

Figure 5:
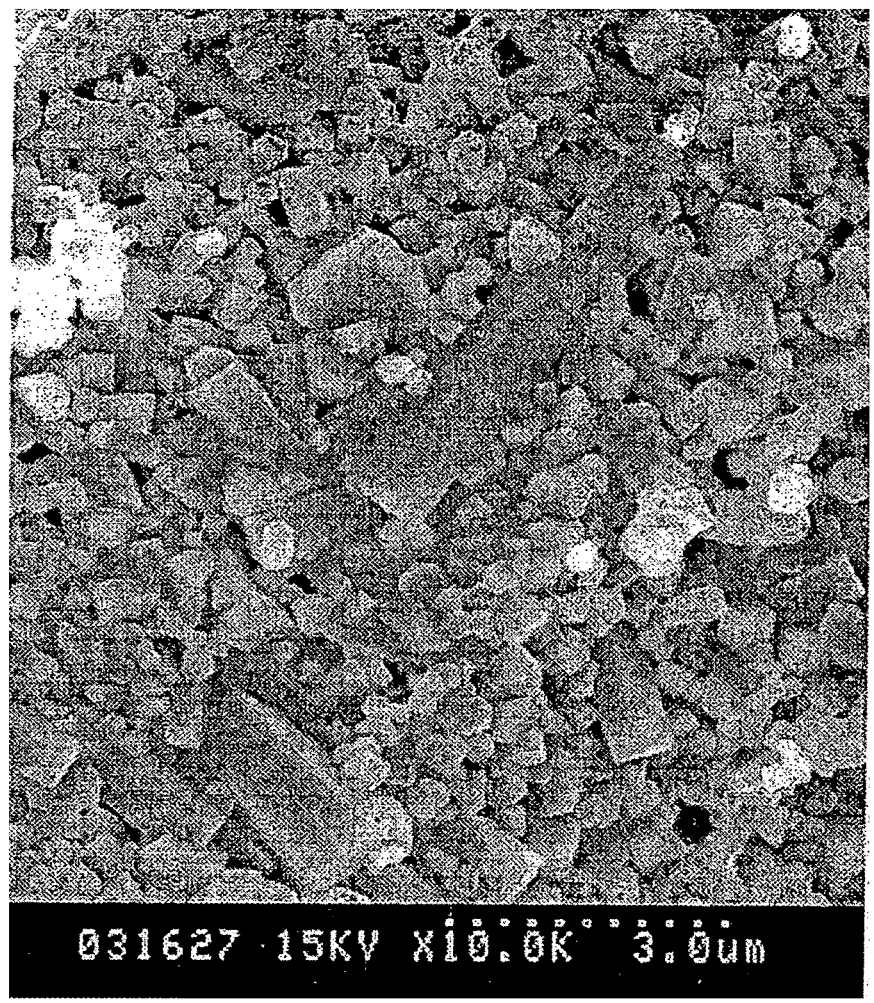
FIG. 5 is an SEM image of crystals shaped as hexagonal pillars composed of hexagonal tungsten bronze $Cs_{0.33}WO_3$, which are the electroconductive particles obtained in the Example 3.

Cesium carbonate and tungstic acid were mixed using a mortar in a Cs/W molar ratio of 0.33. This starting material was heated at 600° C. for two hours in a reducing atmosphere (volume ratio: argon/hydrogen=97/3), cooled to room temperature, and then heated at 800° C. for one hour in an argon atmosphere to prepare a powder composed of $Cs_{0.33}WO_3$ electroconductive particles. As a result of determining the crystal phase via X-ray diffraction, this $Cs_{0.33}WO_3$ was found to be hexagonal tungsten bronze. The resulting powder form of the electroconductive particles was viewed using an SEM. The results are shown in FIG. 5. FIG. 5 is an SEM image of $Cs_{0.33}WO_3$ at a magnification of 10,000.

At this time, crystals shaped as hexagonal pillars were observed, as shown in FIG. 5. The pressed powder resistance of the electroconductive particle powder measured under a pressure of 9.8 MPa was 0.013 Ω·cm, and good electrical conductivity was confirmed.

Next, 20 parts by weight of the powder of the $Cs_{0.33}WO_3$ electroconductive particles, 79 parts by weight of toluene, and 1 part by weight of a dispersing agent were mixed and dispersed using a media-agitating mill to prepare a liquid dispersion in which the average dispersion particle (*6) was 100 nm. Next, 10 parts by weight of this liquid dispersion, and 0.1 parts by weight of a UV-curing resin (solid content: 100%) as a hard coat were mixed. This solution was applied to glass using a bar coater to form a film. This film was dried for 30 seconds at 60° C., the solvent was allowed to evaporate, and the film was then cured using a high pressure mercury lamp to obtain an electrical conductor film.

The following results were obtained when the optical characteristics of the electrical conductor film were measured. The visible-light transmittance was 77%, and light in the visible region was adequately transmitted. The haze value was 0.2%, transparency was high, and the internal state could be clearly viewed from the exterior. The transmitted color tone was a beautiful blue color, and the surface resistance was $2.8 \times 10^9$ Ω/square.

Example 4

Cesium carbonate and tungstic acid were mixed using a mortar in a Cs/W ratio of 0.35. This starting material was heated at 600° C. for two hours in a reducing atmosphere (volume ratio: argon/hydrogen=97/3), cooled to room temperature, and then heated at 800° C. for one hour in an argon atmosphere to prepare a powder composed of $Cs_{0.35}WO_3$ electroconductive particles. As a result of determining the crystal phase via X-ray diffraction, this $Cs_{0.35}WO_3$ was observed to have a hexagonal crystal phase. The resulting powder was viewed using an SEM. The results are shown in FIGS. 6A and 6B. FIG. 6A is an SEM image of $Cs_{0.35}WO_3$ at a magnification of 5,000, and FIG. 6B is an SEM image at a magnification of 10,000.

At this time, tabular crystals were observed, as shown in FIG. 6. In this manner, it was determined that tabular crystals are generated by increasing the Cs addition amount above 0.33. The pressed powder resistance of the powder measured under a pressure of 9.8 MPa was 0.0096 Ω·cm, and good electrical conductivity was confirmed.

Example 5

Cesium carbonate and tungstic acid were mixed using a mortar in a Cs/W molar ratio of 0.33. This starting material was heated at 600° C. for two hours in a reducing atmosphere (volume ratio: argon/hydrogen=97/3) to prepare a powder composed of $Cs_{0.33}WO_3$ electroconductive particles. As a result of determining the crystal phase via X-ray diffraction, this $Cs_{0.33}WO_3$ was observed to have a hexagonal crystal phase. The pressed powder resistance of the particles measured under a pressure of 9.8 MPa was 0.013 Ω·cm, and good electrical conductivity was confirmed.

Next, 20 parts by weight of the powder of the $Cs_{0.33}WO_3$ electroconductive particles, 79 parts by weight of toluene, and 1 part by weight of a dispersing agent were mixed and dispersed using a media-agitating mill to prepare a liquid dispersion in which the average dispersion particle (*6) was 120 nm. Next, 10 parts by weight of this liquid dispersion, and 0.1 parts by weight of a UV-curing resin (solid content: 100%) as a hard coat were mixed. This solution was applied to glass using a bar coater to form a film. This film was dried for 30 seconds at 60° C., the solvent was allowed to evaporate, and the film was then cured using a high pressure mercury lamp to obtain an electrical conductor film.

The following results were obtained when the optical characteristics of the electrical conductor film were measured. The visible-light transmittance was 63%, and light in the visible region was adequately transmitted. The haze value was 0.8%, transparency was high, and the internal state could be clearly viewed from the exterior. The transmitted color tone was a beautiful blue color, and the surface resistance was $3.6 \times 10^8$ Ω/square.

Example 6

Rubidium carbonate and tungstic acid were mixed using a mortar in an Rb/W ratio of 0.33. This starting material was heated at 600° C. for two hours in a reducing atmosphere (volume ratio: argon/hydrogen=97/3), cooled to room temperature, and then heated at 800° C. for one hour in an argon atmosphere to prepare a powder composed of $Rb_{0.33}WO_3$ electroconductive particles. As a result of determining the crystal phase via X-ray diffraction, this $Rb_{0.33}WO_3$ was observed to have a hexagonal crystal phase. The resulting powder of the electroconductive particles was viewed by SEM, and microcrystals shaped as hexagonal pillars were observed. The pressed powder resistance of the particles measured under a pressure of 9.8 MPa was 0.0086 Ω·cm, and good electrical conductivity was confirmed.

Next, 20 parts by weight of the powder of the $Rb_{0.33}WO_3$ electroconductive particles, 79 parts by weight of toluene, and 1 part by weight of a dispersing agent were mixed and dispersed using a media-agitating mill to prepare a liquid dispersion in which the average dispersion particle diameter was 80 nm. Next, 10 parts by weight of this liquid dispersion, and 0.1 parts by weight of a UV-curing resin (solid content: 100%) as a hard coat were mixed. This solution was applied to glass using a bar coater to form a film. This film was dried for 30 seconds at 60° C., the solvent was allowed to evaporate, and the film was then cured using a high pressure mercury lamp to obtain an electrical conductor film.

The following results were obtained when the optical characteristics of the electrical conductor film were measured. The visible-light transmittance was 76%, and light in the visible region was adequately transmitted. The haze value was 0.2%, transparency was high, and the internal state could be clearly viewed from the exterior. The transmitted color tone was a beautiful blue color, and the surface resistance was $4.2 \times 10^8$ Ω/square.

Example 7

Figure 7A:
FIG. 7A is an overall view showing an SEM image of fibrous crystal composed of hexagonal tungsten bronze $Rb_{0.35}WO_3$, which are the electroconductive particles obtained in Example 7.
Figure 7B:
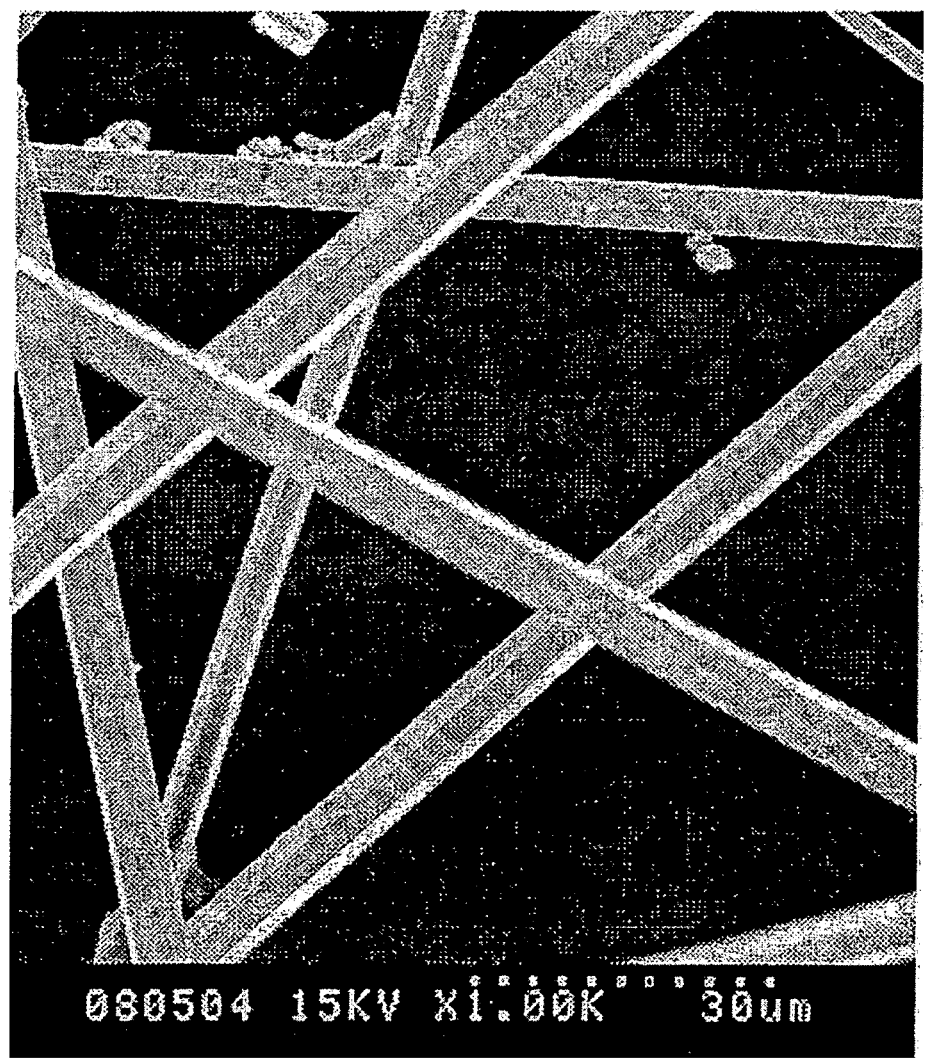
FIG. 7B is an enlarged view of FIG. 7A.

Rubidium carbonate and tungstic acid were mixed using a mortar in an Rb/W ratio of 0.33. This starting material was heated at 600° C. for two hours in a reducing atmosphere (volume ratio: argon/hydrogen=97/3), cooled to room temperature, and then heated at 800° C. for one hour in an argon atmosphere to prepare a powder composed of $Rb_{0.33}WO_3$ electroconductive particles. As a result of determining the crystal phase via X-ray diffraction, this $Rb_{0.33}WO_3$ was observed to have a hexagonal crystal phase. The resulting powder was viewed using an SEM. The results are shown in FIGS. 7A and 7B. FIG. 7A is an SEM image of $Rb_{0.33}WO_3$ at a magnification of 200, and FIG. 7B is an SEM image at a magnification of 1,000.

At this time, fibrous crystals shaped as hexagonal pillars were observed, as shown in FIGS. 7A and 7B.

The pressed powder resistance of the powder was measured and found to be 0.0046 Ω·cm, and good electrical conductivity was confirmed.

Next, 20 parts by weight of the powder of the $Rb_{0.33}WO_3$, 79 parts by weight of toluene, and 1 part by weight of a dispersing agent were mixed and dispersed using ultrasonic irradiation to prepare a fibrous-particle liquid dispersion. Next, 10 parts by weight of this liquid dispersion, and 0.1 parts by weight of a UV-curing resin (solid content: 100%) as a hard coat were mixed. This solution was applied to glass using a bar coater to form a film. This film was dried for 30 seconds at 60° C., the solvent was allowed to evaporate, and the film was then cured using a high pressure mercury lamp to obtain an electrical conductor film.

When the optical characteristics of the electrical conductor film were measured, the visible-light transmittance was found to be 56%, and light in the visible region was adequately transmitted. The haze value was 8.2%, transparency was high, and the internal state could be clearly viewed from the exterior. The transmitted color tone was a beautiful blue color, and the surface resistance was $3.1 \times 10^6$ Ω/square.

Example 8

Potassium carbonate and tungstic acid were mixed using a mortar in a K/W ratio of 0.33. This starting material was heated at 600° C. for two hours in a reducing atmosphere (volume ratio: argon/hydrogen=97/3), cooled to room temperature, and then heated at 800° C. for one hour in an argon atmosphere to prepare a powder composed of $K_{0.33}WO_3$ electroconductive particles. As a result of determining the crystal phase via X-ray diffraction, this $K_{0.33}WO_3$ was observed to have a hexagonal crystal phase. The resulting powder form of the electroconductive particles was viewed using an SEM, and microcrystals shaped as hexagonal pillars were observed. The pressed powder resistance of the powder electroconductive particles measured under a pressure of 9.8 MPa was 0.049 Ω·cm, and good electrical conductivity was confirmed.

Next, 20 parts by weight of the powder of the $K_{0.33}WO_3$ electroconductive particles, 79 parts by weight of toluene, and 1 part by weight of a dispersing agent were mixed and dispersed using a media-agitating mill to prepare a liquid dispersion in which the average dispersion particle (*6) was 80 nm. Next, 10 parts by weight of this liquid dispersion, and 0.1 parts by weight of a UV-curing resin (solid content: 100%) as a hard coat were mixed. This solution was applied to glass using a bar coater to form a film. This film was dried for 30 seconds at 60° C., the solvent was allowed to evaporate, and the film was then cured using a high pressure mercury lamp to obtain an electrical conductor film.

When the optical characteristics of the electrical conductor film were measured, the visible-light transmittance was found to be 62%, and light in the visible region was adequately transmitted. The haze value was 0.9%, transparency was high, and the internal state could be clearly viewed from the exterior. The transmitted color tone was a beautiful blue color, and the surface resistance was $7.3 \times 10^9$ Ω/square.

Example 9

Barium carbonate and tungstic acid were mixed using a mortar in a Ba/W ratio of 0.33. This starting material was heated at 550° C. for two hours in a reducing atmosphere (volume ratio: argon/hydrogen=97/3), cooled to room temperature, and then heated at 700° C. for one hour in an argon atmosphere to prepare a powder composed of $Ba_{0.33}WO_3$ electroconductive particles. As a result of determining the crystal phase via X-ray diffraction, this $Ba_{0.33}WO_3$ was observed to have a hexagonal crystal phase. The resulting powder form of the electroconductive particles was viewed using an SEM, and microcrystals shaped as hexagonal pillars were observed. The pressed powder resistance of the powder electroconductive particles measured under a pressure of 9.8 MPa was 0.068 Ω·cm, and good electrical conductivity was confirmed.

Next, 20 parts by weight of the powder of the $Ba_{0.33}WO_3$ electroconductive particles, 79 parts by weight of toluene, and 1 part by weight of a dispersing agent were mixed and dispersed using a media-agitating mill to prepare a liquid dispersion in which the average dispersion particle (*6) was 95 nm. Next, 10 parts by weight of this liquid dispersion, and 0.1 parts by weight of a UV-curing resin (solid content: 100%) as a hard coat were mixed. This solution was applied to glass using a bar coater to form a film. This film was dried for 30 seconds at 60° C., the solvent was allowed to evaporate, and the film was then cured using a high pressure mercury lamp to obtain an electrical conductor film.

The following results were obtained when the optical characteristics of the electrical conductor film were measured. The visible-light transmittance was 55%, and light in the visible region was adequately transmitted. The haze value was 1.3%, transparency was high, and the internal state could be clearly viewed from the exterior. The transmitted color tone was a beautiful blue color, and the surface resistance was $3.6 \times 10^{10}$ Ω/square.

Example 10

Thallium chloride was dissolved in an aqueous solution of ammonium metatungstate and mixed to achieve a Tl/W ratio of 0.33. This starting material was heated at 600° C. for two hours in a reducing atmosphere (volume ratio: argon/hydrogen=97/3), cooled to room temperature, and then heated at 800° C. for one hour in an argon atmosphere to prepare a powder composed of $Tl_{0.33}WO_3$ electroconductive particles.

As a result of determining the crystal phase via X-ray diffraction, this $Tl_{0.33}WO_3$ was observed to have a hexagonal crystal phase. The resulting powder form of the electroconductive particles was viewed using an SEM, and microcrystals shaped as hexagonal pillars were observed. The pressed powder resistance of the powder electroconductive particles measured under a pressure of 9.8 MPa was 0.096 Ω·cm, and good electrical conductivity was confirmed.

Next, 20 parts by weight of the powder of the $Tl_{0.33}WO_3$ electroconductive particles, 79 parts by weight of toluene, and 1 part by weight of a dispersing agent were mixed and dispersed using a media-agitating mill to prepare a liquid dispersion in which the average dispersion particle (*6) was 85 nm. Next, 10 parts by weight of this liquid dispersion, and 0.1 parts by weight of a UV-curing resin (solid content: 100%) as a hard coat were mixed. This solution was applied to glass using a bar coater to form a film. This film was dried for 30 seconds at 60° C., the solvent was allowed to evaporate, and the film was then cured using a high pressure mercury lamp to obtain an electrical conductor film.

The following results were obtained when the optical characteristics of the electrical conductor film were measured. The visible-light transmittance was 72%, and light in the visible region was adequately transmitted. The haze value was 1.1%, transparency was high, and the internal state could be clearly viewed from the exterior. The transmitted color tone was a beautiful blue color, and the surface resistance was $6.2 \times 10^{11}$ Ω/square.

Example 11

Indium chloride was dissolved in an aqueous solution of ammonium metatungstate and mixed to achieve an In/W ratio of 0.33. This starting material was heated at 500° C. for one hour in a reducing atmosphere (volume ratio: argon/hydrogen=97/3), cooled to room temperature, and then heated at 700° C. for one hour in an argon atmosphere to prepare a powder composed of $In_{0.33}WO_3$ electroconductive particles.

As a result of determining the crystal phase via X-ray diffraction, this $In_{0.33}WO_3$ was observed to have a hexagonal crystal phase. The resulting powder form of the electroconductive particles was viewed using an SEM, and microcrystals shaped as hexagonal pillars were observed. The pressed powder resistance of the powder electroconductive particles measured under a pressure of 9.8 MPa was 0.032 Ω·cm, and good electrical conductivity was confirmed.

Next, 20 parts by weight of the powder of the $In_{0.33}WO_3$ electroconductive particles, 79 parts by weight of toluene, and 1 part by weight of a dispersing agent were mixed and dispersed using a media-agitating mill to prepare a liquid dispersion in which the average dispersion particle (*6) was 110 nm. Next, 10 parts by weight of this liquid dispersion, and 0.1 parts by weight of a UV-curing resin (solid content: 100%) as a hard coat were mixed. This solution was applied to glass using a bar coater to form a film. This film was dried for 30 seconds at 60° C., the solvent was allowed to evaporate, and the film was then cured using a high pressure mercury lamp to obtain an electrical conductor film.

The following results were obtained when the optical characteristics of the electrical conductor film were measured. The visible-light transmittance was 75%, and light in the visible region was adequately transmitted. The haze value was 1.3%, transparency was high, and the internal state could be clearly viewed from the exterior. The transmitted color tone was a beautiful blue color, and the surface resistance was $3.5 \times 10^9$ Ω/square.

Example 12

Potassium carbonate and tungstic acid were mixed using a mortar in a K/W ratio of 0.55. This starting material was heated at 600° C. for two hours in a reducing atmosphere (volume ratio: argon/hydrogen=97/3), cooled to room temperature, and then heated at 800° C. for one hour in an argon atmosphere to prepare a powder composed of $K_{0.55}WO_3$ electroconductive particles. As a result of determining the crystal phase via X-ray diffraction, this $K_{0.55}WO_3$ was observed to have a tetragonal crystal phase. The resulting powder form of the electroconductive particles was viewed using an SEM, and rectangular parallelepiped microcrystals were observed. The pressed powder resistance of the powder electroconductive particles measured under a pressure of 9.8 MPa was 0.12 Ω·cm, and good electrical conductivity was confirmed.

Next, 20 parts by weight of the powder of the $K_{0.55}WO_3$ electroconductive particles, 79 parts by weight of toluene, and 1 part by weight of a dispersing agent were mixed and dispersed using a media-agitating mill to prepare a liquid dispersion in which the average dispersion particle (*6) was 95 nm. Next, 10 parts by weight of this liquid dispersion, and 0.1 parts by weight of a UV-curing resin (solid content: 100%) as a hard coat were mixed. This solution was applied to glass using a bar coater to form a film. This film was dried for 30 seconds at 60° C., the solvent was allowed to evaporate, and the film was then cured using a high pressure mercury lamp to obtain an electrical conductor film.

When the optical characteristics of the electrical conductor film were measured, the visible-light transmittance was found to be 62%, and light in the visible region was adequately transmitted. The haze value was 1.2%, transparency was high, and the internal state could be clearly viewed from the exterior. The transmitted color tone was a beautiful blue color, and the surface resistance was $5.7 \times 10^{11}$ Ω/square.

Example 13

Sodium carbonate and tungstic acid were mixed using a mortar in a Na/W ratio of 0.50. This starting material was heated at 600° C. for two hours in a reducing atmosphere (volume ratio: argon/hydrogen=97/3), cooled to room temperature, and then heated at 800° C. for one hour in an argon atmosphere to prepare a powder composed of $Na_{0.50}WO_3$ electroconductive particles. As a result of determining the crystal phase via X-ray diffraction, this $Na_{0.50}WO_3$ was observed to have a tetragonal crystal phase. The pressed powder resistance of the powder electroconductive particles measured under a pressure of 9.8 MPa was 0.18 Ω·cm, and good electrical conductivity was confirmed.

Next, 20 parts by weight of the powder of the $Na_{0.50}WO_3$ electroconductive particles, 79 parts by weight of toluene, and 1 part by weight of a dispersing agent were mixed and dispersed using a media-agitating mill to prepare a liquid dispersion in which the average dispersion particle (*6) was 50 nm. Next, 10 parts by weight of this liquid dispersion, and 0.1 parts by weight of a UV-curing resin (solid content: 100%) as a hard coat were mixed. This solution was applied to glass using a bar coater to form a film. This film was dried for 30 seconds at 60° C., the solvent was allowed to evaporate, and the film was then cured using a high pressure mercury lamp to obtain an electrical conductor film.

When the optical characteristics of the electrical conductor film were measured, the visible-light transmittance was found to be 52%, and light in the visible region was adequately transmitted. The haze value was 0.6%, transparency was high, and the internal state could be clearly viewed from the exterior. The transmitted color tone was a beautiful blue color, and the surface resistance was $4.8 \times 10^{11}$ Ω/square.

Comparative Example 1

Commercially available tungsten trioxide powder (20 parts by weight), 79.5 parts by weight of toluene, and 1.0 part by weight of a dispersing agent were mixed and dispersed using a media-agitating mill to prepare a liquid dispersion in which the average dispersion particle (*6) was 80 nm. Next, 20 parts by weight of this liquid dispersion, and 0.1 parts by weight of a UV-curing resin (solid content: 100%) as a hard coat were mixed. This solution was applied to glass using a bar coater to form a film. This film was dried for 30 seconds at 60° C., the solvent was allowed to evaporate, and the film was then cured using a high pressure mercury lamp to obtain an electrical conductor film.

When the optical characteristics of the film were measured, the visible-light transmittance was found to be 89% and most of the light in the visible region was transmitted, but the surface resistance could not be measured, and the dispersion was difficult to use as an electrical conductor film.

Embodiments of the present invention were described above, but the present invention is not limited by these embodiments.

A list of the measurement results of examples 1 to 13 and Comparative Example 1 is shown in TABLE 1.

TABLE 1

| | Starting material | Product | Particle shape | Pressed powder resistance (Ω · cm) | Dispersion particle diameter (nm) | Visible-light transmittance (%) | Haze (%) | Surface resistance (Ω/square) |
|---|---|---|---|---|---|---|---|---|
| Example 1 | $WCl_6$ | $W_{18}O_{49}$ | Acicular | 0.085 | — | 63 | 3.5 | 7.60E+08 |
| Example 2 | meta-ammonium water tungstate | $W_{18}O_{49}$ | — | 0.089 | — | — | — | — |
| Example 3 | $Cs_2CO_3/WO_3H_2O$ | $Cs_{0.33}WO_3$ | Hexagonal-pillar | 0.013 | 100 | 77 | 0.2 | 2.80E+09 |
| Example 4 | $Cs_2CO_3/WO_3H_2O$ | $Cs_{0.35}WO_3$ | Tabular | 0.0096 | — | — | — | — |
| Example 5 | $Cs_2CO_3/WO_3H_2O$ | $Cs_{0.33}WO_3$ | Hexagonal-pillar | 0.013 | 120 | 63 | 0.8 | 3.60E+08 |
| Example 6 | $Rb_2CO_3/WO_3H_2O$ | $Rb_{0.33}WO_3$ | Hexagonal-pillar | 0.0086 | 80 | 76 | 0.2 | 4.20E+08 |
| Example 7 | $Rb_2CO_3/WO_3H_2O$ | $Rb_{0.33}WO_3$ | Fibrous | 0.0046 | — | 56 | 8.2 | 3.10E+06 |
| Example 8 | $K_2CO_3/WO_3H_2O$ | $K_{0.33}WO_3$ | Hexagonal-pillar | 0.049 | 80 | 62 | 0.9 | 7.30E+09 |
| Example 9 | $Ba_2CO_3/WO_3H_2O$ | $Ba_{0.33}WO_3$ | Hexagonal-pillar | 0.068 | 95 | 55 | 1.3 | 3.60E+10 |
| Example 10 | TlCl/meta-ammonium water tungstate | $Tl_{0.33}WO_3$ | Hexagonal-pillar | 0.096 | 85 | 72 | 1.1 | 6.20E+11 |
| Example 11 | $In_3Cl$/meta-ammonium water tungstate | $In_{0.33}WO_3$ | Hexagonal-pillar | 0.032 | 110 | 75 | 1.3 | 3.50E+09 |
| Example 12 | $K_2CO_3/WO_3H_2O$ | $K_{0.55}WO_3$ | Rectangular parallelepiped | 0.12 | 95 | 62 | 1.2 | 5.70E+11 |
| Example 13 | $Na_2CO_3/WO_3H_2O$ | $Na_{0.5}WO_3$ | — | 0.18 | 50 | 52 | 0.6 | 4.80E+11 |
| Comparative Example 1 | | $WO_3$ | | | 80 | 89 | — | Unable to measure |

Examples 14 to 23, and Comparative Example 2 are principally related the above-described [2] transparent electroconductive film and method for manufacturing the same, transparent electroconductive article, and infrared-shielding article. Optical measurements were carried out based on JIS 3106 (light source: A light), and the visible-light transmittance was calculated. The conduction characteristics were measured using a surface resistance measuring instrument (Loresta MP MCP-T350) manufactured by Mitsubishi Chemical.

(Example 14) 9.28 g of an aqueous solution of ammonium metatungstate (0.02 mol/9.28 g) and an aqueous solution (an aqueous solution obtained by dissolving 0.080 g of rubidium chloride in 80 g of water) of rubidium chloride (RbCl) were mixed in a Rb/W atomic ratio of 0.33. A surfactant (FZ2105 (Adeka)) was added to the solution in a concentration of 0.002% relative to the entire solution to obtain a film-forming solution. The film-forming solution was applied by dipping to one side of a transparent quartz plate (thickness: 2 mm). The plate was heat treated for 10 minutes at 550° C. in an atmosphere of 5% hydrogen (the balance being nitrogen) to obtain a transparent electroconductive film on a substrate. The film thickness was about 110 nm.

Figure 8:
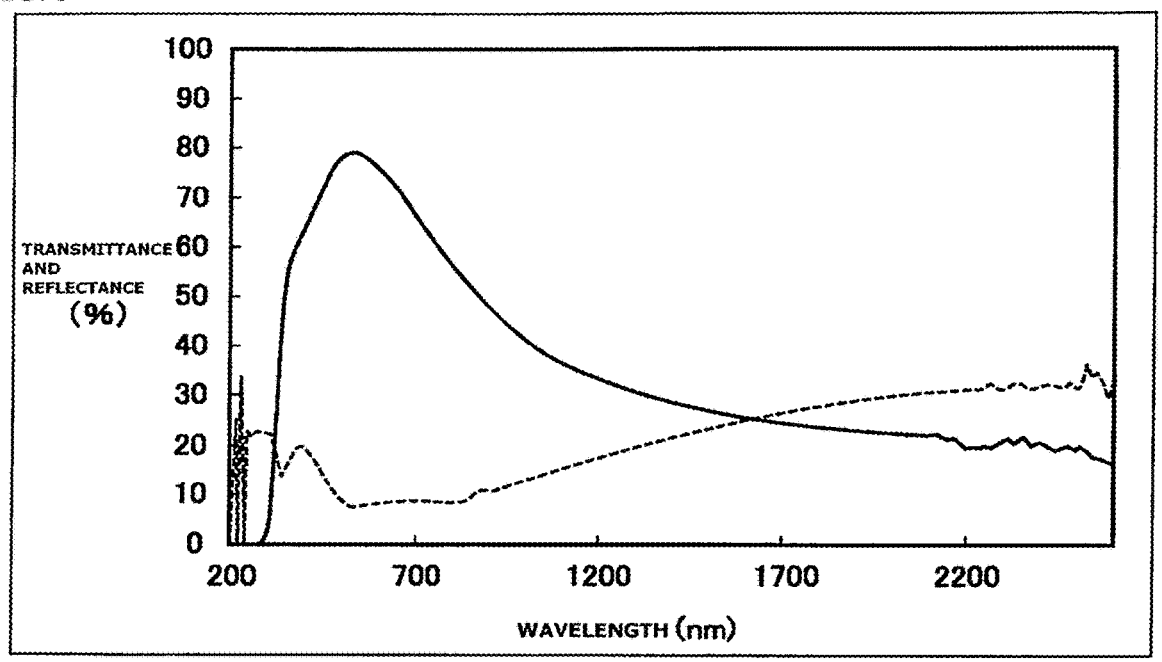
FIG. 8 is a graph showing transmission and reflection profiles of the $Rb_{0.33}WO_3$ film of Example 14.

The film was measured by XRD and found to be hexagonal Rb tungsten bronze. The transmittance and reflectivity of the resulting film were measured. FIG. 8 shows transmission and reflection profiles of the film. FIG. 8 is a graph in which the wavelength of the transmitted light is plotted along the horizontal axis, and the transmittance and reflectivity of the light is plotted along the vertical axis. The measurement results of the transmittance are plotted as a solid line, and the measurement results of the reflectivity are plotted as a broken line.

Based on the measurement results, the transmittance of visible light of this film was 77.38%, transparency was high, infrared light having a wavelength of 800 nm and above was reflected or absorbed, and the film was found to be effective as an infrared-shielding material. The solar light transmittance of the film was 57%. Hence, 43% of the passing solar light was shielded. The surface resistance of the film was $6.9 \times 10^3$ Ω/square, and the electrical conductivity was determined to be high.

Example 15

The baked film obtained in example 14 was dip coated again on one side using the same method and the film-forming solution of example 14. The plate was heat treated for 10 minutes at 550° C. in an atmosphere of 5% hydrogen (the balance being nitrogen) to obtain a transparent electroconductive film on a substrate. The film thickness was about 200 nm.

Figure 9:
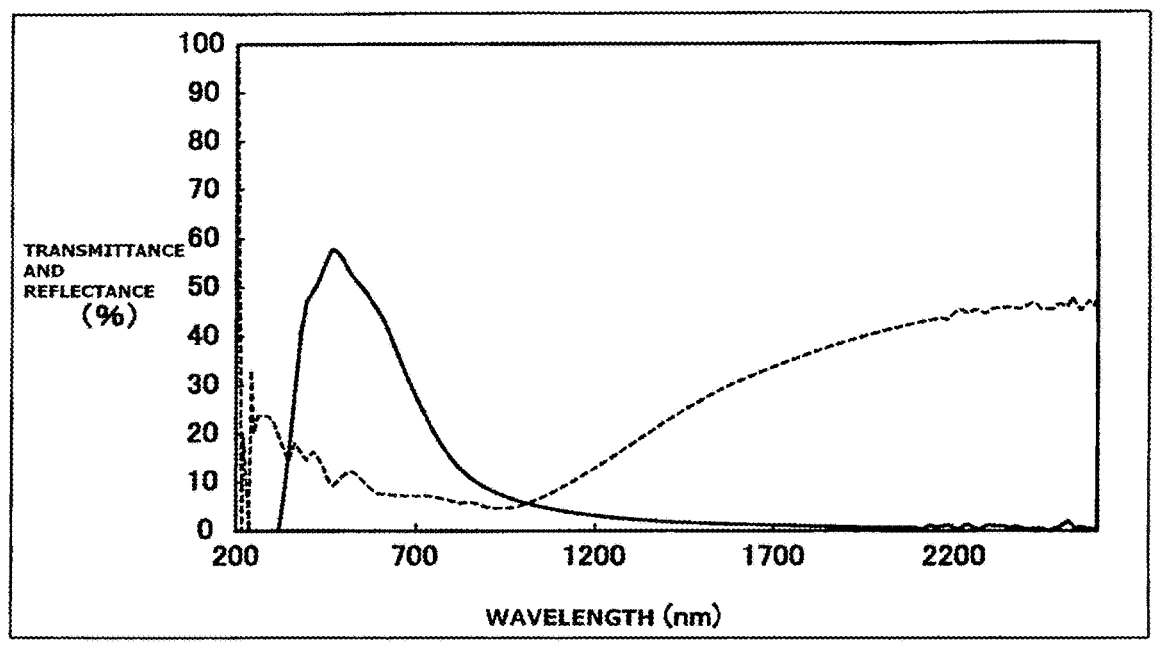
FIG. 9 is a graph showing transmission and reflection profiles of the $Rb_{0.33}WO_3$ film of Example 15.

The transmittance and reflectivity of the resulting film were measured. FIG. 9 shows transmission and reflection profiles of the film. FIG. 9 is also a graph in which the wavelength of the transmitted light is plotted along the horizontal axis, and the transmittance and reflectivity of the light is plotted along the vertical axis in the same manner as FIG. 8. The measurement results of the transmittance are plotted as a solid line, and the measurement results of the reflectivity are plotted as a broken line.

Based on the measurement results, the transmittance of visible light of this film was 58.86%, transparency was high, infrared light having a wavelength of 800 nm and above was reflected or absorbed, and the film was found to be effective as an infrared-shielding material. The solar light transmittance of the film was 26%. Hence, 74% of the passing solar light was shielded. The surface resistance of the film was $2.6 \times 10^2$ Ω/square, and the electrical conductivity was determined to be higher than that of example 14.

Example 16

9.28 g of an aqueous solution of ammonium metatungstate (0.02 mol/9.28 g) and an aqueous solution (an aqueous solution obtained by dissolving 1.11 g of cesium chloride in 80 g of water) of cesium chloride (CsCl) were mixed in a Cs/W atomic ratio of 0.33. A surfactant (FZ2105 (Adeka)) was added to the solution in a concentration of 0.002% relative to the entire solution to obtain a film-forming solution. The film-forming solution was applied by dipping to one side of a transparent quartz plate (thickness: 2 mm). The plate was heat treated for 10 minutes at 550° C. in an atmosphere of 5% hydrogen (the balance being nitrogen) to obtain a transparent electroconductive film on a substrate. The film thickness was about 120 nm.

The transmittance of visible light of the resulting film was 78.16%, and the surface resistance of the film was $1.2 \times 10^4$ Ω/square. The transparency and electrical conductivity of the film was high. The solar light transmittance of the film was 61%. Hence, 39% of the passing solar light was shielded.

Example 17

9.28 g of an aqueous solution of ammonium metatungstate (0.02 mol/9.28 g) and 80 g of water were mixed. A surfactant (FZ2105 (Adeka)) was added to the solution in a concentration of 0.002% relative to the entire solution to obtain a film-forming solution. The film-forming solution was applied by dipping to one side of a transparent quartz plate (thickness: 2 mm). The plate was heat treated for 10 minutes at 550° C. in an atmosphere of 5% hydrogen (the balance being nitrogen), and thereafter heat treated for 10 minutes at 800° C. in a nitrogen atmosphere to obtain a transparent electroconductive film on a substrate. The film thickness was about 100 nm.

The film was measured by XRD and found to be $W_{18}O_{49}$. The transmittance of visible light of the resulting film was 52.16%, and the surface resistance of the film was $7.3 \times 10^5$ W/square. The film had high transparency and electrical conductivity. The solar light transmittance of the film was 37%. Hence, 63% of the passing solar light was shielded.

Example 18

Tungsten hexachloride was dissolved in ethanol, and the tungsten concentration in the solution in this case was 0.02 mol/90 g. The solution was applied by dipping to one side of a transparent quartz plate (thickness: 2 mm). The plate was heat treated for 10 minutes at 550° C. in an atmosphere of 5% hydrogen (the balance being nitrogen), and thereafter heat treated for 10 minutes at 800° C. in a nitrogen atmosphere to obtain a transparent electroconductive film on a substrate. The film thickness was about 80 nm.

The film was measured by XRD and found to be $W_{18}O_{49}$. The transmittance of visible light of the resulting film was 67.16%, and the surface resistance of the film was $2.1 \times 10^6$ W/square. The film had high transparency and electrical conductivity.

Example 19

9.28 g of an aqueous solution of ammonium metatungstate (0.02 mol/9.28 g) and an aqueous solution of indium chloride were mixed in an In/W atomic ratio of 0.33. A surfactant (FZ2105 (Adeka)) was added to the solution in a concentration of 0.002% relative to the entire solution to obtain a film-forming solution. The film-forming solution was applied by dipping to one side of a transparent quartz plate (thickness: 2 mm). The plate was heat treated for 10 minutes at 500° C. in an atmosphere of 5% hydrogen (the balance being nitrogen) to obtain a transparent electroconductive film on a substrate. The film thickness was about 100 nm.

The film was measured by XRD and found to be hexagonal In tungsten bronze. The optical characteristics of the resulting film were measured. The transmittance of visible light of this film was 75.22%, transparency was high, infrared light having a wavelength of 800 nm and above was reflected or absorbed, and the film was found to be effective as an infrared-shielding material. The solar light transmittance of the film was 69%. Hence, 31% of the passing solar light was shielded.

The surface resistance of the film was $2.3 \times 10^4$ Ω/square, and the electrical conductivity was determined to be high.

Example 20

9.28 g of an aqueous solution of ammonium metatungstate (0.02 mol/9.28 g) and an aqueous solution of stannic chloride were mixed in an Sn/W atomic ratio of 0.33. A surfactant (FZ2105 (Adeka)) was added to the solution in a concentration of 0.002% relative to the entire solution to obtain a film-forming solution. The film-forming solution was applied by dipping to one side of a transparent quartz plate (thickness: 2 mm). The plate was heat treated for 10 minutes at 500° C. in an atmosphere of 5% hydrogen (the balance being nitrogen) to obtain a transparent electroconductive film on a substrate. The film thickness was about 100 nm.

The film was measured by XRD and found to be hexagonal Sn tungsten bronze. The optical characteristics of the resulting film were measured. The transmittance of visible light of this film was 72.52%, transparency was high, infrared light having a wavelength of 800 nm and above was reflected or absorbed, and the film was found to be effective as an infrared-shielding material. The solar light transmittance of the film was 67%. Hence, 33% of the passing solar light was shielded.

The surface resistance of the film was $6.7 \times 10^4$ Ω/square, and the electrical conductivity was determined to be high.

Example 21

9.28 g of an aqueous solution of ammonium metatungstate (0.02 mol/9.28 g), an aqueous solution of rubidium chloride, and an aqueous solution of tantalum chloride were mixed in a W:Ta:Rb atomic ratio of 0.9:0.1:0.33. A surfactant (FZ2105 (Adeka)) was added to the solution in a concentration of 0.002% relative to the entire solution to obtain a film-forming solution. The film-forming solution was applied by dipping to one side of a transparent quartz plate (thickness: 2 mm). The plate was heat treated for 10 minutes at 550° C. in an atmosphere of 5% hydrogen (the balance being nitrogen) to obtain a transparent electroconductive film on a substrate. The film thickness was about 100 nm.

The film was measured by XRD and found to be primarily hexagonal tungsten bronze. The optical characteristics of the resulting film were measured. The transmittance of visible light of this film was 75.36%, transparency was high, infrared light having a wavelength of 800 nm and above was reflected or absorbed, and the film was found to be effective as an infrared-shielding material. The solar light transmittance of the film was 58%. Hence, 42% of the passing solar light was shielded.

The surface resistance of the film was $9.1 \times 10^4$ Ω/square, and the electrical conductivity was determined to be high.

Example 22

9.28 g of an aqueous solution of ammonium metatungstate (0.02 mol/9.28 g), an aqueous solution of rubidium chloride, and an aqueous solution of niobium chloride were mixed in a W:Nb:Rb atomic ratio of 0.9:0.1:0.33. A surfactant (FZ2105 (Adeka)) was added to the solution in a concentration of 0.002% relative to the entire solution to obtain a film-forming solution. The film-forming solution was applied by dipping to one side of a transparent quartz plate (thickness: 2 mm). The plate was heat treated for 10 minutes at 550° C. in an atmosphere of 5% hydrogen (the balance being nitrogen) to obtain a transparent electroconductive film on a substrate. The film thickness was about 110 nm.

The film was measured by XRD and found to be primarily hexagonal tungsten bronze. The optical characteristics of the resulting film were measured. The transmittance of visible light of this film was 71.25%, transparency was high, infrared light having a wavelength of 800 nm and above was reflected or absorbed, and the film was found to be effective as an infrared-shielding material. The solar light transmittance of the film was 52%. Hence, 48% of the passing solar light was shielded.

The surface resistance of the film was $1.3 \times 10^4$ Ω/square, and the electrical conductivity was determined to be high.

Example 23

An aqueous solution of molybdenum chloride and rubidium chloride was mixed in a W:Rb atomic ratio of 1:0.33. A surfactant (FZ2105 (Adeka)) was added to the solution in a concentration of 0.002% relative to the entire solution to obtain a film-forming solution. The film-forming solution was applied by dipping to one side of a transparent quartz plate (thickness: 2 mm). The plate was heat treated for 10 minutes at 500° C. in an atmosphere of 5% hydrogen (the balance being nitrogen) to obtain a transparent electroconductive film on a substrate. The film thickness was about 150 nm.

The film was measured by XRD and found to be molybdenum bronze. The optical characteristics of the resulting film were measured. The transmittance of visible light of this film was 55.21%, transparency was high, infrared light having a wavelength of 700 nm and above was reflected or absorbed, and the film was found to be effective as an infrared-shielding material. The solar light transmittance of the film was 40%. Hence, 60% of the passing solar light was shielded.

The surface resistance of the film was $1.5 \times 10^5$ Ω/square, and the electrical conductivity was determined to be high.

Comparative Example 2

9.28 g of an aqueous solution of ammonium metatungstate (0.02 mol/9.28 g) was mixed with 80 g of water. A surfactant (FZ2105 (Adeka)) was added to the solution in a concentration of 0.002% relative to the entire solution to obtain a film-forming solution. The film-forming solution was applied by dipping to one side of a transparent quartz plate (thickness: 2 mm). The plate was heat treated for 10 minutes at 550° C. in the atmosphere and thereafter heat treated for 10 minutes at 800° C. in the atmosphere to obtain a transparent electroconductive film on a substrate. The film thickness was about 100 nm.

The film was measured by XRD and found to be $WO_3$. The transmittance of visible light of this film was 87.52%, the surface resistance of the film was so high as to be unmeasurable, and the film was found to be devoid of electrical conductivity.

Examples 24 to 35 and Comparative Examples 3 to 5 are principally related the above-described [3] infrared-shielding nanoparticle dispersion, infrared-shielding body, method for manufacturing infrared-shielding nanoparticles, and infrared-shielding nanoparticles. Optical measurements were carried out based on JISA 5759 (1998) (light source: A light) for window glass films used in construction, and the visible-light transmittance and solar light transmittance were calculated. However, the measurement samples were not applied to glass and the film samples themselves were used.

The haze value was measured based on JISK 7105.

The average dispersion particle diameter was measured using a measuring apparatus (ELS-800 (Otsuka Denki, K.K.)) that uses dynamic light scattering, and the average value was used.

The conduction characteristics were evaluated by measuring the surface resistance of the fabricated films using Hiresta IP MCP-HT260 manufactured by Mitsubishi Petrochemical Co.

The optical characteristics of the base material PET film were as follows: The HPE-50 (Teijin) used in the examples had a visible-light transmittance of 88%, a solar light transmittance of 88%, and a haze value of 0.9 to 0.8%.

Example 24

Starting materials $Rb_2CO_3$ and $MoO_3.H_2O$ were mixed using a mortar to obtain the desired composition $Rb_{0.33}MoO_3$. The composition was reduced for one hour at 450° C. in an atmosphere (flow) of hydrogen and nitrogen in a volume ratio of 3:7, and thereafter heat treated for one hour at 800° C. in an $N_2$ atmosphere to obtain an $Rb_{0.33}MoO_3$ powder.

Next, 20 parts by weight of this powder, 75 parts by weight of toluene, and 5 parts by weight of a dispersing agent were mixed and dispersed to prepare a liquid dispersion in which the average dispersion particle diameter was 80 nm. Next, 10 parts by weight of this liquid dispersion, and 100 parts by weight of a UV-curing resin (solid content 100%) as a hard coat were mixed to obtain a liquid infrared-shielding nanoparticle dispersion. This liquid infrared-shielding nanoparticle dispersion was applied to a PET resin film (HPE-50) using a bar coater to form a film. This film was dried for 30 seconds at 60° C., the solvent was allowed to evaporate, and the film was then cured using a high pressure mercury lamp to obtain an infrared-shielding film.

The optical characteristics of the infrared-shielding film are shown in TABLE 2. The transmittance peak in TABLE 2 shows the maximum transmittance of all light rays in the wavelength region of 400 nm to 700 nm, and the transmittance bottom is the minimum transmittance of all light rays in the wavelength region of 700 nm to 2,600 nm.

The resulting infrared-shielding film had very high transparency, and the internal state could be clearly viewed from the exterior. The transmitted color tone was a beautiful blue color. It is apparent from FIG. 11, which is a transmission profile of light in the infrared-shielding film, that the value V, which is the maximum transmittance of light rays in the wavelength region of 400 nm to 700 nm as described above, was 80.25%, and that the visible light was adequately transmitted. The minimum transmittance of all light rays in the wavelength region of 700 nm to 1,200 nm was 22.65% below the V value. The average value (solar light transmittance) was 57.0%, and the near-infrared-shielding performance was high.

However, the above-described visible-light transmittance and solar light transmittance vary depending on the amount of infrared-shielding material dispersed per unit of surface area. Therefore, the visible-light transmittance and solar light transmittance both vary in relation to the dispersed amount of infrared-shielding material. The same applies in the following examples and comparative examples.

Example 25

Starting materials $Rb_2CO_3$, $MoO_3.H_2O$, and $WO_3.H_2O$ were mixed using a mortar to obtain the desired composition $Rb_{0.33}Mo_{0.3}W_{0.7}O_3$. The composition was reduced for one hour at 450° C. in an atmosphere (flow) of hydrogen and nitrogen in a volume ratio of 3:7, and thereafter heat treated for one hour at 800° C. in an $N_2$ atmosphere to obtain an $Rb_{0.33}Mo_{0.3}W_7O_3$ powder. The powder was dispersed using the same method as that used in Example 24 to form a film and obtain an infrared-shielding film.

The optical characteristics of the infrared-shielding film are shown in TABLE 2.

The resulting infrared-shielding film had very high transparency, and the internal state could be clearly viewed from the exterior. The transmitted color tone was a beautiful blue color.

Example 26

Starting materials $Rb_2CO_3$, $MoO_3.H_2O$, and $WO_3.H_2O$ were mixed using a mortar to obtain the desired composition $Rb_{0.33}Mo_{0.5}W_{0.5}O_3$. The composition was reduced for one hour at 450° C. in an atmosphere (flow) of hydrogen and nitrogen in a volume ratio of 3:7, and thereafter heat treated for one hour at 800° C. in an $N_2$ atmosphere to obtain an $Rb_{0.33}Mo_{0.5}W_{0.5}O_3$ powder. The powder was dispersed using the same method as that used in example 24 to form a film and obtain an infrared-shielding film.

The optical characteristics of the infrared-shielding film are shown in TABLE 2.

The resulting infrared-shielding film had very high transparency, and the internal state could be clearly viewed from the exterior. The transmitted color tone was a beautiful blue color.

Example 27

Starting materials $Na_2CO_3$ and $MoO_3.H_2O$ were mixed using a mortar to obtain the desired composition $Na_{0.33}MoO_3$. The composition was reduced for one hour at 550° C. in an atmosphere (flow) of hydrogen and nitrogen in a volume ratio of 3:7 to obtain an $Na_{0.33}MoO_3$ powder. The powder was dispersed using the same method as that used in Example 24 to form a film and obtain an infrared-shielding film.

The optical characteristics of the infrared-shielding film are shown in TABLE 2.

The resulting infrared-shielding film had very high transparency, and the internal state could be clearly viewed from the exterior. The transmitted color tone was a beautiful blue color.

Example 28

Starting materials $Rb_2CO_3$ and $MoO_3.H_2O$ were mixed using a mortar to obtain the desired composition $Rb_{0.44}MoO_3$. The composition was reduced for one hour at 550° C. in an atmosphere (flow) of hydrogen and nitrogen in a volume ratio of 3:7, and thereafter heat treated for one hour at 800° C. in an $N_2$ atmosphere to obtain an $Rb_{0.44}MoO_3$ powder. The powder was dispersed using the same method as that used in Example 24 to form a film and obtain an infrared-shielding film.

The optical characteristics of the infrared-shielding film are shown in TABLE 2.

The resulting infrared-shielding film had very high transparency, and the internal state could be clearly viewed from the exterior. The transmitted color tone was a beautiful blue color.

Example 29

Starting materials $K_2CO_3$ and $MoO_3.H_2O$ were mixed using a mortar to obtain the desired composition $K_{0.33}MoO_3$. The composition was reduced for one hour at 550° C. in an atmosphere (flow) of hydrogen and nitrogen in a volume ratio of 3:7, and thereafter heat treated for one hour at 800° C. in an $N_2$ atmosphere to obtain a $K_{0.33}MoO_3$ powder. The powder was dispersed using the same method as that used in Example 24 to form a film and obtain an infrared-shielding film.

The optical characteristics of the infrared-shielding film are shown in TABLE 2.

The resulting infrared-shielding film had very high transparency, and the internal state could be clearly viewed from the exterior. The transmitted color tone was a beautiful blue color.

Example 30

Starting materials $Rb_2CO_3$, $MoO_3.H_2O$, and $WO_3.H_2O$ were mixed using a mortar to obtain the desired composition $Rb_{0.33}Mo_{0.05}W_{0.5}O_3$. The composition was reduced for one hour at 550° C. in an atmosphere (flow) of hydrogen and nitrogen in a volume ratio of 3:7, and thereafter heat treated for one hour at 800° C. in an $N_2$ atmosphere to obtain an $Rb_{0.33}Mo_{0.05}W_{0.95}O_3$ powder. The powder was dispersed using the same method as that used in Example 24 to form a film and obtain an infrared-shielding film.

The optical characteristics of the infrared-shielding film are shown in TABLE 2.

The resulting infrared-shielding film had very high transparency, and the internal state could be clearly viewed from the exterior. The transmitted color tone was a beautiful blue color.

Example 31

Starting materials $Rb_2CO_3$, $MoO_3.H_2O$, and $WO_3.H_2O$ were mixed using a mortar to obtain the desired composition $Rb_{0.33}Mo_{0.1}W_{0.9}O_3$. The composition was reduced for one hour at 550° C. in an atmosphere (flow) of hydrogen and nitrogen in a volume ratio of 3:7, and thereafter heat treated for one hour at 800° C. in an $N_2$ atmosphere to obtain an $Rb_{0.33}Mo_{0.1}W_{0.9}O_3$ powder. The powder was dispersed using the same method as that used in Example 24 to form a film and obtain an infrared-shielding film.

The optical characteristics of the infrared-shielding film are shown in TABLE 2.

The resulting infrared-shielding film had very high transparency, and the internal state could be clearly viewed from the exterior. The transmitted color tone was a beautiful blue color.

Example 32

Starting materials $Rb_2CO_3$, $NbCl_5$, and $WO_3.H_2O$ were mixed using a mortar to obtain the desired composition $Rb_{0.33}Nb_{0.1}W_{0.9}O_3$. The composition was reduced for one hour at 550° C. in an atmosphere (flow) of hydrogen and nitrogen in a volume ratio of 3:7, and thereafter heat treated for one hour at 800° C. in an $N_2$ atmosphere to obtain an $Rb_{0.33}Nb_{0.1}W_{0.9}O_3$ powder. The powder was dispersed using the same method as that used in Example 24 to form a film and obtain an infrared-shielding film.

The optical characteristics of the infrared-shielding film are shown in TABLE 2.

The resulting infrared-shielding film had very high transparency, and the internal state could be clearly viewed from the exterior. The transmitted color tone was a beautiful blue color.

Example 33

Starting materials $Rb_2CO_3$, $TaCl_5$, and $WO_3.H_2O$ were mixed using a mortar to obtain the desired composition $Rb_{0.33}Ta_{0.1}W_{0.9}O_3$. The composition was reduced for one hour at 550° C. in an atmosphere (flow) of hydrogen and nitrogen in a volume ratio of 3:7, and thereafter heat treated for one hour at 800° C. in an $N_2$ atmosphere to obtain an $Rb_{0.33}Ta_{0.1}W_{0.9}O_3$ powder. The powder was dispersed using the same method as that used in Example 24 to form a film and obtain an infrared-shielding film.

The optical characteristics of the infrared-shielding film are shown in TABLE 2.

The resulting infrared-shielding film had very high transparency, and the internal state could be clearly viewed from the exterior. The transmitted color tone was a beautiful blue color.

Example 34

Starting materials $Na_2CO_3$, $MoO_3.H_2O$, and $WO_3.H_2O$ were mixed using a mortar to obtain the desired composition $Na_{0.8}Mo_{0.05}W_{0.95}O_3$. The composition was reduced for one hour at 450° C. in an atmosphere (flow) of hydrogen and nitrogen in a volume ratio of 3:7, and thereafter heat treated for one hour at 700° C. in an $N_2$ atmosphere to obtain an $Na_{0.8}Mo_{0.05}W_{0.95}O_3$ powder. The powder was dispersed using the same method as that used in Example 24 to form a film and obtain an infrared-shielding film.

The optical characteristics of the infrared-shielding film are shown in TABLE 2.

The resulting infrared-shielding film had very high transparency, and the internal state could be clearly viewed from the exterior. The transmitted color tone was a beautiful blue color.

Example 35

Starting materials $Rb_2CO_3$ and $MoO_3.H_2O$ were mixed using a mortar to obtain the desired composition $Rb_{0.33}MoO_3$. The composition was reduced for one hour at 550° C. in an atmosphere (flow) of hydrogen and nitrogen in a volume ratio of 3:7, and thereafter heat treated for one hour at 800° C. in an $N_2$ atmosphere to obtain an $Rb_{0.33}MoO_3$ powder.

Next, 20 parts by weight of this powder, and 80 parts by weight of isopropyl alcohol were mixed and dispersed to prepare a liquid dispersion in which the average dispersion particle diameter was 200 nm. Next, 100 parts by weight of this liquid dispersion, and 2 parts by weight of a UV-curing resin (solid content 100%) as a hard coat were mixed to obtain a liquid infrared-shielding nanoparticle dispersion. This liquid infrared-shielding nanoparticle dispersion was applied to a PET resin film (HPE-50) using a bar coater to form a film. This film was dried for 30 seconds at 60° C., the solvent was allowed to evaporate, and the film was then cured using a high pressure mercury lamp to obtain an infrared-shielding film.

The optical characteristics of the infrared-shielding film are shown in TABLE 2.

The resulting infrared-shielding film had very high transparency, and the internal state could be clearly viewed from the exterior. The transmitted color tone was a beautiful blue color. The film had electrical conductivity, as shown in FIG. 2.

Comparative Example 3

The optical characteristics of PET films which had a thickness of 50 μm and in which the base materials of Examples 24 to 35 were used were measured. The visible-light transmittance was 88.1%, and visible light was adequately transmitted, but the solar light transmittance was 88.1%. Thus, only about 12% of directly incident solar light rays were shielded, and the heat-blocking effect was poor.

Comparative Example 4

$WO_3.H_2O$ powder was heat treated for one hour at 800° C. in the atmosphere to obtain a $WO_3$ powder.

Next, 20 parts by weight of the powder, 75 parts by weight of toluene, and 5 parts by weight of a dispersing agent were mixed and dispersed to obtain a liquid dispersion in which the average dispersion particle diameter was 80 nm. Next, 10 parts by weight of this liquid dispersion, and 100 parts by weight of a UV-curing resin (solid content 100%) as a hard coat were mixed to obtain a liquid infrared-shielding nanoparticle dispersion. This liquid infrared-shielding nanoparticle dispersion was applied to a PET resin film (HPE-50) using a bar coater to form a film. This film was dried for 30 seconds at 60° C., the solvent was vaporized, and the film was then cured using a high pressure mercury lamp to obtain an infrared-shielding film.

The optical characteristics were measured. The visible-light transmittance was 85.2%, and visible light was adequately transmitted, but the solar light transmittance was 84.1%. Thus, only about 16% of directly incident solar light were shielded and the heat-blocking effect was poor.

The resulting infrared-shielding film had very high transparency, and the internal state could be clearly viewed from the exterior. However, transmittance in the near-infrared region was high, and the material could not function as an infrared-shielding material. Also, the surface resistance was $10^{15}$ Ω/square or greater, and the material did not have electrical conductivity.

Comparative Example 5

$Na_2CO_3$, $MoO_3.H_2O$, and $WO_3.H_2O$ were mixed using a mortar in an Na:Mo:W molar ratio of 1.5:0.1:0.9. The composition was reduced for one hour at 550° C. in an atmosphere (flow) of hydrogen and nitrogen in a volume ratio of 3:7, and thereafter heat treated for one hour at 800° C. in an $N_2$ atmosphere. Many unintended compounds composed of Na and O were generated in the resulting powder in addition to the intended compound composed of Na, Mo, W, and O ($Na_{0.8}Mo_{0.05}W_{0.95}O_3$). Therefore, subsequent measurements were not made.

TABLE 2

| | Composition | Starting material | Visible light transmittance (%) | Solar light transmittance (%) | Haze (%) | Transmittance peak (%) | Transmittance bottom (%) | Surface resistance (Ω/square) |
|---|---|---|---|---|---|---|---|---|
| Example 24 | $Rb_{0.33}MoO_3$ | $Rb_2CO_3$, $MoO_3 \cdot H_2O$ | 79.1 | 57 | 1.1 | 80.3 | 22.7 | — |
| Example 25 | $Rb_{0.33}Mo_{0.3}W_{0.7}O_3$ | $Rb_2CO_3$, $MoO_3 \cdot H_2O$, $WO_3 \cdot H_2O$ | 75.2 | 65.2 | 1 | 79.9 | 59.4 | — |
| Example 26 | $Rb_{0.33}Mo_{0.5}W_{0.5}O_3$ | $Rb_2CO_3$, $MoO_3 \cdot H_2O$, $WO_3 \cdot H_2O$ | 71.2 | 63.9 | 1 | 75.5 | 56.8 | — |
| Example 27 | $Na_{0.33}MoO_3$ | $Na_2CO_3$, $MoO_3 \cdot H_2O$ | 56.5 | 42.6 | 1 | 67.9 | 28 | — |
| Example 28 | $Rb_{0.44}MoO_3$ | $Rb_2CO_3$, $MoO_3 \cdot H_2O$ | 80.1 | 52.3 | 1 | 82.1 | 35.2 | — |
| Example 29 | $K_{0.33}MoO_3$ | $K_2CO_3$, $MoO_3 \cdot H_2O$ | 78.6 | 45.1 | 1 | 79.1 | 11.7 | — |
| Example 30 | $Rb_{0.33}Mo_{0.05}W_{0.95}O_3$ | $Rb_2CO_3$, $MoO_3 \cdot H_2O$, $WO_3 \cdot H_2O$ | 64.5 | 39.9 | 1 | 71 | 6.9 | — |
| Example 31 | $Rb_{0.33}Mo_{0.1}W_{0.9}O_3$ | $Rb_2CO_3$, $MoO_3 \cdot H_2O$, $WO_3 \cdot H_2O$ | 71.7 | 52.8 | 1 | 75.6 | 24.6 | — |
| Example 32 | $Rb_{0.33}Nb_{0.1}W_{0.9}O_3$ | $Rb_2CO_3$, $NbCl_5$, $WO_3 \cdot H_2O$ | 70.1 | 43.1 | 1 | 75 | 12.3 | — |
| Example 33 | $Rb_{0.33}Ta_{0.1}W_{0.9}O_3$ | $Rb_2CO_3$, $TaCl_5$, $WO_3 \cdot H_2O$ | 77.6 | 58.6 | 1.1 | 80.5 | 27.8 | — |
| Example 34 | $Na_{0.8}Mo_{0.05}W_{0.95}O_3$ | $Na_2CO_3$, $MoO_3 \cdot H_2O$, $WO_3 \cdot H_2O$ | 65.8 | 43.3 | 1 | 68.1 | 6.3 | — |
| Example 35 | $Rb_{0.33}MoO_3$ | $Rb_2CO_3$, $MoO_3 \cdot H_2O$ | 62.8 | 40.5 | 2.1 | 60.2 | 2.4 | $8 \times 10^8$ |
| Comparative Example 3 | PET film | — | 88.1 | 88.1 | — | — | — | — |
| Comparative Example 4 | $WO_3$ | $WO_3 \cdot H_2O$ | 85.2 | 84.1 | — | — | — | $10^{15}$ or greater |
| Comparative Example 5 | $Na_{0.8}Mo_{0.05}W_{0.95}O_3$ + other NaO compounds | $Na_2CO_3$, $MoO_3 \cdot H_2O$, $WO_3 \cdot H_2O$ | — | — | — | — | — | — |

The invention claimed is:

1. A visible light transmitting particle-dispersed electrical conductor, which is a plural aggregate of electroconductive particles composed of a composite tungsten oxide expressed by a general formula MxWyOz, wherein M is one or more elements selected from H, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; 0.001≤x/y≤1.1; and 2.2≤z/y<3.0, and wherein
 a particle diameter is 1 nm or greater,
 the particles have visible light transmitting characteristics,
 pressed powder resistance of the particles measured under a pressure of 9.8 MPa is 1.0 Ω·m or less, and
 a shape of the electroconductive particles is one or more shapes selected from hexagonal-pillar, fibrous, rectangular, granular, acicular, and tabular,
 the electroconductive particles contain tabular crystals;
 the thickness of the tabular crystals ranges from 1 nm or greater to 100 μm or less;
 the maximum diagonal length of the tabular surfaces in the tabular crystals ranges from 5 nm or greater to 500 μm or less; and
 the ratio of the maximum diagonal length and the thickness of the tabular crystals (maximum diagonal length/thickness) is 5 or greater.

2. The visible light transmitting particle-dispersed electrical conductor according to claim 1, wherein
 the electroconductive particles contain acicular crystals,
 a ratio of major and minor axes (major axis/minor axis) in the acicular crystals is 5 or greater, and
 a length of the major axis ranges from 5 nm or greater to 10,000 μm or less.

3. The visible light transmitting particle-dispersed electrical conductor of claim 1, wherein
 the electroconductive particles are entirely composed of tabular crystals.

4. The visible light transmitting particle-dispersed electrical conductor according to claim 1, wherein crystal structure of the electroconductive particles of the composite tungsten oxide expressed by the formula MxWyOz has an amorphous structure, or a cubic, tetragonal, or hexagonal tungsten bronze structure.

5. The visible light transmitting particle-dispersed electrical conductor according to claim 4, wherein the added element M in the electroconductive particles of the composite tungsten oxide expressed by the formula MxWyOz is one or more elements selected from Cs, Rb, K, Tl, Ba, In, Li, Ca, Sr, Fe, and Sn.

6. The visible light transmitting particle-dispersed electrical conductor according to claim 1, wherein the visible light transmitting particle-dispersed electrical conductor is film-shaped.

7. The visible light transmitting particle-dispersed electrical conductor according to claim 1, wherein the visible light transmitting particle-dispersed electrical conductor contains a binder.

8. The visible light transmitting particle-dispersed electrical conductor according to claim 7, wherein the binder is a transparent resin or a transparent dielectric.

9. Electroconductive particles, characterized by being used in the visible light transmitting particle-dispersed electrical conductor of claim 1.

10. A visible-light-transmitting electroconductive article, wherein the visible light transmitting particle-dispersed electrical conductor of claim 1 is formed on a base material.

* * * * *